(12) United States Patent
Oh et al.

(10) Patent No.: US 11,297,298 B2
(45) Date of Patent: Apr. 5, 2022

(54) METHOD FOR TRANSMITTING AND RECEIVING 360-DEGREE VIDEO INCLUDING CAMERA LENS INFORMATION, AND DEVICE THEREFOR

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/757,531

(22) PCT Filed: Feb. 22, 2019

(86) PCT No.: PCT/KR2019/002205
§ 371 (c)(1),
(2) Date: Apr. 20, 2020

(87) PCT Pub. No.: WO2019/168304
PCT Pub. Date: Sep. 6, 2019

(65) Prior Publication Data
US 2021/0195163 A1 Jun. 24, 2021

Related U.S. Application Data

(60) Provisional application No. 62/635,551, filed on Feb. 27, 2018.

(51) Int. Cl.
*H04N 13/194* (2018.01)
*H04N 19/46* (2014.01)
(Continued)

(52) U.S. Cl.
CPC ......... *H04N 13/194* (2018.05); *H04N 13/117* (2018.05); *H04N 13/178* (2018.05);
(Continued)

(58) Field of Classification Search
CPC .. H04N 13/194; H04N 13/178; H04N 13/117; H04N 2213/005; H04N 2213/008;
(Continued)

(56) References Cited

U.S. PATENT DOCUMENTS 9,883,101 B1   1/2018 Aloumanis et al.
2014/0132594 A1  5/2014 Gharpure et al.
(Continued)

FOREIGN PATENT DOCUMENTS

CN   107040783 A   8/2017
CN   107113414 A   8/2017
(Continued)

OTHER PUBLICATIONS

XP030023896: "Text of ISO/IEC FDIS 23090-2 Omnidirectional Media Format," 120. MPEG Meeting: MACAU; ISO/IEC JTC 1/SC29 WG11, Dec. 15, 2017, Information technology—Coded representation of immersive media (MPEG-I)—Part 2: Omnidirectional media format, (181 Pages).
(Continued)

*Primary Examiner* — Tung T Vo
(74) *Attorney, Agent, or Firm* — Dentons US LLP

(57) ABSTRACT

A method for processing 360-degree image data by a device for receiving a 360-degree video according to the present invention comprises the steps of: receiving 360-degree image data; obtaining information relating to an encoded picture and metadata from the 360-degree image data, wherein the metadata includes camera lens information; decoding a picture including a target circular area on the basis of the information relating to the encoded picture; and rendering the target circular area by processing same on the basis of the camera lens information.

9 Claims, 19 Drawing Sheets

(51) Int. Cl.
*H04N 19/597* (2014.01)
*H04N 13/117* (2018.01)
*H04N 13/178* (2018.01)

(52) U.S. Cl.
CPC ........... *H04N 19/46* (2014.11); *H04N 19/597* (2014.11); *H04N 2213/005* (2013.01); *H04N 2213/008* (2013.01)

(58) Field of Classification Search
CPC .... H04N 19/597; H04N 19/46; H04N 19/467; H04N 19/70; H04N 13/161; H04N 13/282
USPC ........................................................ 348/43
See application file for complete search history.

(56) References Cited

U.S. PATENT DOCUMENTS

| | | | |
|---|---|---|---|
| 2016/0373734 | A1 | 12/2016 | Cole et al. |
| 2017/0316600 | A1 | 11/2017 | Jeong et al. |
| 2017/0332107 | A1* | 11/2017 | Abbas .................... H04N 19/82 |
| 2017/0347044 | A1* | 11/2017 | Douady-Pleven ........ G06T 7/00 |
| 2018/0167613 | A1* | 6/2018 | Hannuksela ....... H04N 21/6587 |
| 2018/0182065 | A1* | 6/2018 | Yoshida ............. H04N 5/23238 |
| 2018/0352254 | A1* | 12/2018 | Alpaslan ............. H04N 13/161 |
| 2019/0313021 | A1* | 10/2019 | Hannuksela ........... H04N 19/00 |
| 2020/0245032 | A1* | 7/2020 | Murtaza ................. G06F 3/167 |
| 2020/0260063 | A1* | 8/2020 | Hannuksela ......... H04N 13/161 |
| 2020/0288171 | A1* | 9/2020 | Hannuksela ......... H04N 19/597 |

FOREIGN PATENT DOCUMENTS

| | | |
|---|---|---|
| EP | 3624446 A1 | 3/2020 |
| EP | 3745719 A1 | 12/2020 |
| KR | 10-2015-0010752 A | 1/2015 |
| KR | 10-2016-0094384 A | 8/2016 |
| KR | 10-1734655 B1 | 5/2017 |
| KR | 10-2017-0096459 A | 8/2017 |
| KR | 1020170123667 A | 11/2017 |
| KR | 10-2018-0013391 A | 2/2018 |
| WO | 2017/142353 A1 | 8/2017 |
| WO | 17/200721 A1 | 11/2017 |

OTHER PUBLICATIONS

XP032900861: Eichenseer et al., "A Data Set Providing Synthetic and Real-World Fisheye Video Sequences," 2016 IEEE International Conference on Acousitics, Speech and Signal Processing, Mar. 20, 2016, Multimedia Communications and Signal Processing, Erlangen, Germany, 2016 (5 Pages).

XP030023111:Choi et al., "WD of ISO/IEC 23000-20 Omnidirectional Media Application Format," Nov. 14, 2016, Motion Picture Expert Group or ISO/IEC JTC1/SC29/WG11,No. n16439, Coding of Moving Pictures and Audio, Oct. 2016, Chengdu, CN, (55 Pages).

XP033325761: Skupin et al., "Standarization Status of 360 degree Video Coding and Delivery," VCIP 2017, Dec. 10-13, 2017, St. Petersburg, U.S.A. (4 Pages).

* cited by examiner

FIG. 13
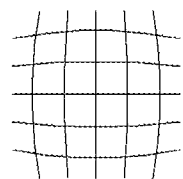
(a)
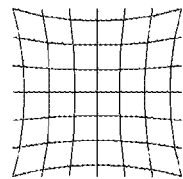
(b)
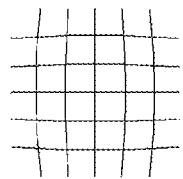
(c)

FIG. 14
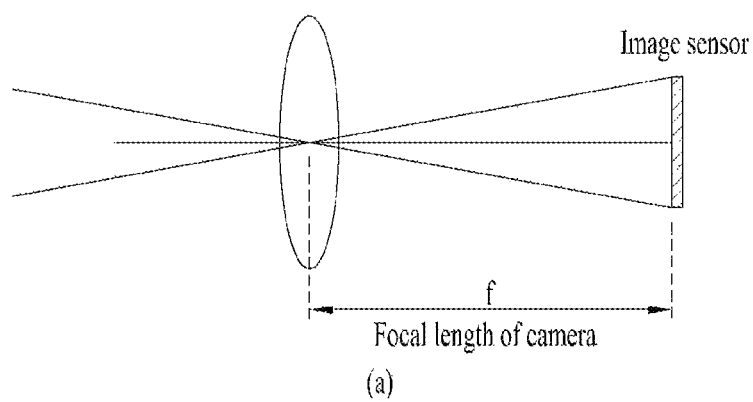
(a)
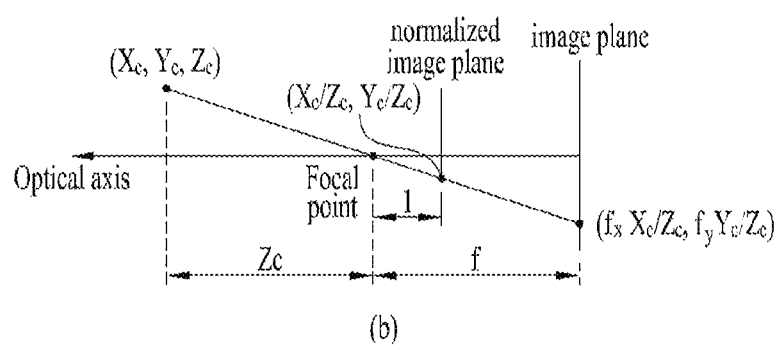
(b)
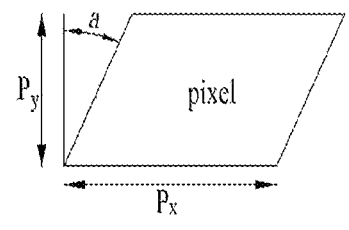
(c)

METHOD FOR TRANSMITTING AND RECEIVING 360-DEGREE VIDEO INCLUDING CAMERA LENS INFORMATION, AND DEVICE THEREFOR

This application is a National Stage Application of International Application No. PCT/KR2019/002205, filed on Feb. 22, 2019, which claims the benefit of U.S. Provisional Application No. 62/635,551, filed on Feb. 28, 2018, all of which are hereby incorporated by reference in their entirety for all purposes as if fully set forth herein.

TECHNICAL FIELD

The present disclosure relates to a 360-degree video, and more particularly, to a method for transmitting and receiving a 360-degree video for 3DoF+ content including camera lens information, and a device therefor.

BACKGROUND ART

A virtual reality (VR) system allows a user to experience an electronically projected environment. The system for providing VR content may be further improved to provide higher quality images and stereophonic sound. The VR system may allow a user to interactively consume VR content.

3DoF+ (three degrees of freedom+) content allows users to have more diverse sensory experiences through 360-degree videos of multiple viewpoints by providing 3DoF or 360-degree videos that are newly created according to inter-position movement of the user.

DISCLOSURE

Technical Problem

An object of the present disclosure is to provide a method and device for increasing the efficiency of VR video data transmission for providing a VR system.

Another object of the present disclosure is to provide a method and device for transmitting VR video data and metadata about the VR video data.

Another object of the present disclosure is to provide a method and device for transmitting VR video data and metadata about camera lens information of the VR video data.

Another object of the present disclosure is to provide a method and device for increasing the efficiency of 360-degree video data transmission for providing a 3DoF+ system.

Another object of the present disclosure is to provide a method and device for transmitting metadata about a position and/or angle for a viewpoint/head position/eye view for providing a 3DoF+ system.

Another object of the present disclosure is to provide a method and device for correcting distortion by reflecting characteristics of a lens based on information related to distortion correction.

Another object of the present disclosure is to provide a method and device for correcting distortion by reflecting characteristics of a lens based on information indicating a radial distortion type.

Technical Solution

In one aspect of the present disclosure, provided herein is a method of processing 360-degree image data by a 360-degree video transmission device. The method may include acquiring a target circular region including a 360-degree image captured by a camera having at least one lens, mapping the target circular region to a picture, encoding the picture mapped to the target circular region, generating metadata for the 360-degree image, and processing the encoded picture and the metadata for storage or transmission, wherein the metadata may contain camera lens information.

In another aspect of the present disclosure, provided herein is a 360-degree video transmission apparatus for processing 360-degree video data. The 360-degree video transmission apparatus may include a data input unit configured to acquire a target circular region including a 360-degree image captured by a camera having at least one lens, a projection processor configured to map the target circular region to a picture, a data encoder configured to encode the picture mapped to the target circular region, a metadata processor configured to generate metadata for the 360-degree image, and a transmission processor configured to process the encoded picture and the metadata so as to be stored or transmitted, wherein the metadata may contain camera lens information.

In another aspect of the present disclosure, provided herein is a method of processing 360-degree image data by a 360-degree video reception apparatus. The apparatus may include receiving 360-degree image data, acquiring information and metadata about an encoded picture from the 360-degree image data, the metadata containing camera lens information, decoding a picture including a target circular region based on the information about the encoded picture, and processing and rendering the target circular region based on the camera lens information.

In another aspect of the present disclosure, provided herein is a 360-degree video reception apparatus for processing 360-degree video data. The apparatus may include a receiver configured to receive 360-degree image data, a reception processor configured to acquire information and metadata about an encoded picture from the 360-degree image data, the metadata containing camera lens information, a data decoder configured to decode a picture including a target circular region based on the information about the encoded picture, and a renderer configured to process and render the target circular region based on the camera lens information.

Advantageous Effects

According to the present disclosure, 3DoF+ content may be efficiently transmitted in an environment that supports next-generation hybrid broadcasting provided using a terrestrial broadcasting network and the Internet network.

According to the present disclosure, a user may be provided with an interactive experience in consuming 3DoF+ content.

According to the present disclosure, when a user consumes 3DoF+ content, signaling may be performed such that a 3DoF+ content producer's intention is accurately reflected.

According to the present disclosure, in delivering 3DoF+ content, a transmission capacity may be efficiently increased and necessary information may be delivered.

According to the present disclosure, a circular region for a target viewpoint, a target head position, and/or a target eye view may be derived from 360-degree image data for 3DoF+ content based on camera lens information and rendered. Thereby, users may be provided with an interactive experience in consuming 3DoF+ content.

According to the present disclosure, a polynomial function may be derived by reflecting the characteristics of a lens based on the projection function related information and/or the distortion correction function related information included in the camera lens information, and distortion occurring in a picture onto which the 360-degree image is projected may be corrected based on the polynomial function. Thereby, the 360-degree image data may be more accurately mapped to a 3D space.

DESCRIPTION OF DRAWINGS

FIG. 13 exemplarily shows various types of radial distortion.

FIG. 14 illustrates an example of capturing a 360-degree video through a camera lens.

MODE

Figure 1:
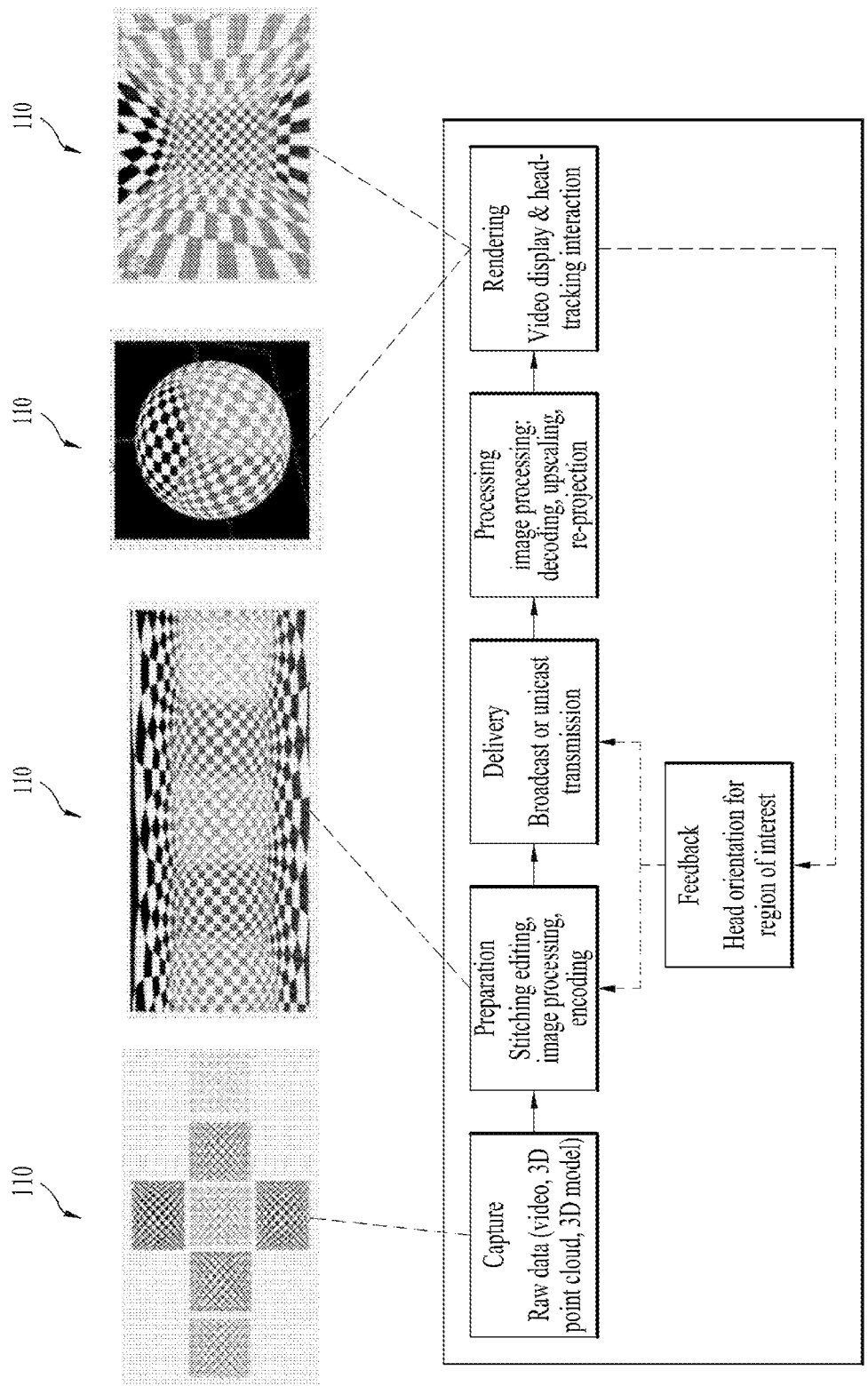
FIG. 1 is a diagram showing an overall architecture for providing 360-degree video according to the present disclosure.

The present disclosure may be subjected to various changes and may have various embodiments, and specific embodiments will be described in detail with reference to the accompanying drawings. However, this is not intended to limit the disclosure to the specific embodiments. Terms used in this specification are merely adopted to explain specific embodiments, and are not intended to limit the technical spirit of the present disclosure. A singular expression includes a plural expression unless the context clearly indicates otherwise. In In this specification, the term "include" or "have" is intended to indicate that characteristics, figures, steps, operations, constituents, and components disclosed in the specification or combinations thereof exist, and should be understood as not precluding the existence or addition of one or more other characteristics, figures, steps, operations, constituents, components, or combinations thereof.

Though individual elements described in the present disclosure are independently shown in the drawings for convenience of description of different functions, this does not mean that the elements are implemented in hardware or software elements separate from each other. For example, two or more of the elements may be combined to form one element, or one element may be divided into a plurality of elements. Embodiments in which respective elements are integrated and/or separated are also within the scope of the present disclosure without departing from the essence of the present disclosure.

Hereinafter, exemplary embodiments of the present disclosure will be described in detail with reference to the accompanying drawings. The same reference numerals will be used for the same components in the drawings, and redundant descriptions of the same components are omitted.

FIG. 1 is a diagram showing an overall architecture for providing 360-degree video according to the present disclosure.

The present disclosure proposes a method of providing 360 content in order to provide virtual reality (VR) to users. VR may refer to a technique or an environment for replicating a real or virtual environment. VR may artificially provide sensuous experiences to users and thus users may experience electronically projected environments therethrough.

360 content may refer to all content for realizing and providing VR, and may include 360-degree video and/or 360 audio. 360-degree video may refer to video or image content which is needed to provide VR and is captured or reproduced in all directions (360 degrees) at the same time. Hereinafter, 360-degree video may refer to 360-degree video. 360-degree video may refer to a video or image presented in various types of 3D space according to a 3D model. For example, 360-degree video may be presented on a spherical surface. 360 audio may be audio content for providing VR and may refer to spatial audio content which may make an audio generation source recognized as being located on a specific space of the 3D space. 360 content may be generated, processed and transmitted to users, and the users may consume VR experiences using the 360 content.

The present disclosure proposes a method of effectively providing 360-degree video. To provide 360-degree video, a 360-degree video may be captured first using one or more cameras. The captured 360-degree video may be transmitted through a series of processes, and the data received on the receiving side may be processed into the original 360-degree video and rendered. Then, the 360-degree video may be provided to a user.

Specifically, the entire processes for providing 360-degree video may include a capture process, a preparation process, a transmission process, a processing process, a rendering process and/or a feedback process.

The capture process may refer to a process of capturing images or videos for multiple viewpoints through one or more cameras. Image/video data as shown in part 110 of FIG. 1 may be generated through the capture process. Each plane in part 110 of FIG. 1 may refer to an image/video for each viewpoint. The captured images/videos may be called raw data. In the capture process, metadata related to capture may be generated.

A special camera for VR may be used for capture. According to an embodiment, when a 360-degree video for a virtual space generated using a computer is to be provided, the capture operation using an actual camera may not be performed. In this case, the capture process may be replaced by a process of simply generating related data.

The preparation process may be a process of processing the captured images/videos and the metadata generated in the capture process. The captured images/videos may be subjected to stitching, projection, region-wise packing and/or encoding in the preparation process.

First, the images/videos may be subjected to the stitching process. The stitching process may be a process of connecting the captured images/videos to create a single panoramic image/video or a spherical image/video.

Then, the stitched images/videos may be subjected to the projection process. In the projection process, the stitched images/videos may be projected onto a 2D image. The 2D image may be referred to as a 2D image frame depending on the context. Projecting onto a 2D image may be referred to as mapping to the 2D image. The projected image/video data may take the form of a 2D image as shown in part 120 of FIG. 1.

The video data projected onto the 2D image may be subjected to the region-wise packing process in order to increase video coding efficiency. Region-wise packing may refer to a process of dividing the video data projected onto the 2D image into regions and processing the regions. Here, the regions may refer to regions obtained by dividing the 2D image onto which 360-degree video data is projected. According to an embodiment, such regions may be distinguished by dividing the 2D image equally or randomly. According to an embodiment, the regions may be divided according to a projection scheme. The region-wise packing process may be an optional process and may thus be omitted from the preparation process.

According to an embodiment, this processing process may include a process of rotating the regions or rearranging the regions on the 2D image in order to increase video coding efficiency. For example, the regions may be rotated such that specific sides of the regions are positioned close to each other. Thereby, efficiency may be increased in coding.

According to an embodiment, the processing process may include a process of increasing or decreasing the resolution of a specific region in order to differentiate the resolutions for regions of the 360-degree video. For example, the resolution of regions corresponding to a relatively important area of the 360-degree video may be increased over the resolution of the other regions. The video data projected onto the 2D image or the region-wise packed video data may be subjected to the encoding process that employs a video codec.

According to an embodiment, the preparation process may further include an editing process. In the editing process, the image/video data may be edited before or after the projection. In the preparation process, metadata for stitching/projection/encoding/editing may be generated. In addition, metadata about the initial viewpoint or the region of interest (ROI) of the video data projected onto the 2D image may be generated.

The transmission process may be a process of processing and transmitting the image/video data and the metadata obtained through the preparation process. Processing according to any transport protocol may be performed for transmission. The data that has been processed for transmission may be delivered over a broadcast network and/or broadband. The data may be delivered to a reception side on an on-demand basis. The receiving side may receive the data through various paths.

The processing process may refer to a process of decoding the received data and re-projecting the projected image/video data onto a 3D model. In this process, the image/video data projected onto 2D images may be re-projected onto a 3D space. This process may be referred to as mapping projection depending on the context. Here, the shape of the 3D space to which the data is mapped may depend on the 3D model. For example, 3D models may include a sphere, a cube, a cylinder and a pyramid.

According to an embodiment, the processing process may further include an editing process and an up-scaling process. In the editing process, the image/video data may be edited before or after the re-projection. When the image/video data has a reduced size, the size of the image/video data may be increased by up-scaling the samples in the up-scaling process. The size may be reduced through down-scaling, when necessary.

The rendering process may refer to a process of rendering and displaying the image/video data re-projected onto the 3D space. The re-projection and rendering may be collectively expressed as rendering on a 3D model. The image/video re-projected (or rendered) on the 3D model may take the form as shown in part 130 of FIG. 1. The part 130 of FIG. 1 corresponds to a case where the image/video data is re-projected onto a 3D model of sphere. A user may view a part of the regions of the rendered image/video through a VR display or the like. Here, the region viewed by the user may take the form as shown in part 140 of FIG. 1.

The feedback process may refer to a process of delivering various types of feedback information which may be acquired in the display process to a transmitting side. Through the feedback process, interactivity may be provided in 360-degree video consumption. According to an embodiment, head orientation information, viewport information indicating a region currently viewed by a user, and the like may be delivered to the transmitting side in the feedback process. According to an embodiment, the user may interact with content realized in a VR environment. In this case, information related to the interaction may be delivered to the transmitting side or a service provider in the feedback process. In an embodiment, the feedback process may be skipped.

The head orientation information may refer to information about the position, angle and motion of a user's head. Based on this information, information about a region currently viewed by the user in the 360-degree video, that is, viewport information may be calculated.

The viewport information may be information about a region currently viewed by a user in the 360-degree video. Gaze analysis may be performed using this information to check how the user consumes 360-degree video and how long the user gazes at a region of the 360-degree video. The gaze analysis may be performed at the receiving side and a result of the analysis may be delivered to the transmitting side on a feedback channel. A device such as a VR display may extract a viewport region based on the position/orientation of the user's head, vertical or horizontal Field Of View (FOV) information supported by the device, and the like.

According to an embodiment, the aforementioned feedback information may be consumed on the receiving side as well as being delivered to the transmitting side. That is, decoding, re-projection and rendering processes of the receiving side may be performed using the aforementioned feedback information. For example, only 360-degree video corresponding to the region currently viewed by the user may be preferentially decoded and rendered using the head orientation information and/or the viewport information.

Here, the viewport or the viewport region may refer to a region of 360-degree video currently viewed by the user. A viewpoint may be a point which is viewed by the user in a 360-degree video and may represent a center point of the viewport region. That is, a viewport is a region centered on a viewpoint, and the size and shape of the region may be determined by FOV, which will be described later.

In the above-described architecture for providing 360-degree video, image/video data which is subjected to a series of capture/projection/encoding/transmission/decoding/re-projection/rendering processes may be called 360-degree video data. The term "360-degree video data" may be used as a concept including metadata or signaling information related to such image/video data.

To store and transmit media data such as the audio or video data described above, a standardized media file format may be defined. According to an embodiment, a media file may have a file format based on ISO base media file format (ISOBMFF).

Figure 2:
FIGS. 2 and 3 illustrate the structure of a media file according to an embodiment of the present disclosure.
Figure 3:
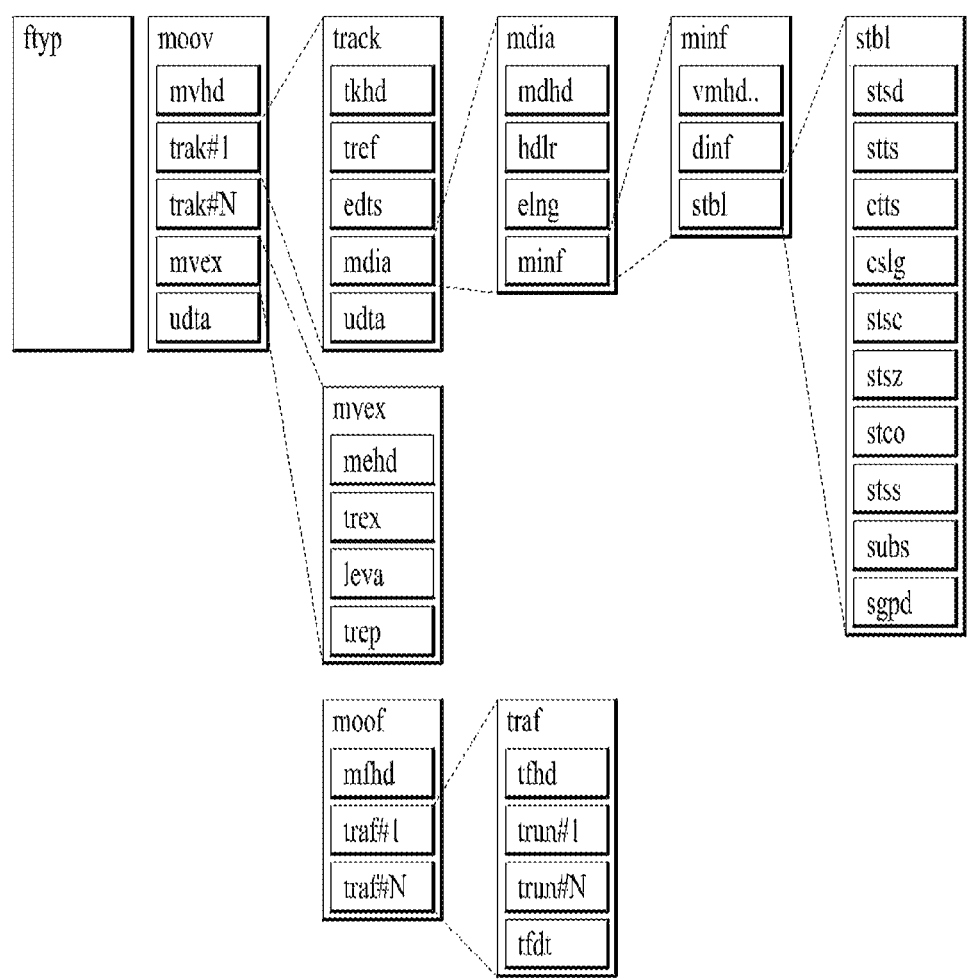

FIGS. 2 and 3 illustrate the structure of a media file according to an embodiment of the present disclosure.

A media file according to the present disclosure may include at least one box. Here, the box may be a data block or an object containing media data or metadata related to the media data. The boxes may be arranged in a hierarchical structure. Thus, the data may be classified according to the boxes and the media file may take a form suitable for storage and/or transmission of large media data. In addition, the media file may have a structure which facilitates access to media information as in the case where the user moves to a specific point in the media content.

The media file according to the present disclosure may include an ftyp box, a moov box and/or an mdat box.

The ftyp box (file type box) may provide information related to a file type or compatibility of a media file. The ftyp box may include configuration version information about the media data of the media file. A decoder may identify the media file with reference to the ftyp box.

The moov box (movie box) may include metadata about the media data of the media file. The moov box may serve as a container for all metadata. The moov box may be a box at the highest level among the metadata related boxes. According to an embodiment, only one moov box may be present in the media file.

The mdat box (media data box) may a box that actually contains the media data of the media file. The media data may contain audio samples and/or video samples and the mdat box may serve as a container to contain such media samples.

According to an embodiment, the moov box may include an mvhd box, a trak box and/or an mvex box as sub-boxes.

The mvhd box (movie header box) may contain media presentation related information about the media data included in the media file. That is, the mvhd box may contain information such as a media generation time, change time, time standard and period of the media presentation.

The trak box (track box) may provide information related to a track of the media data. The trak box may contain information such as stream related information about an audio track or a video track, presentation related information, and access related information. Multiple trak boxes may be provided depending on the number of tracks.

According to an embodiment, the trak box may include a tkhd box (track header box) as a sub-box. The tkhd box may contain information about a track indicated by the trak box. The tkhd box may contain information such as a generation time, change time and track identifier of the track.

The mvex box (movie extend box) may indicate that the media file may include a moof box, which will be described later. The moov boxes may need to be scanned to recognize all media samples of a specific track.

According to an embodiment, the media file according to the present disclosure may be divided into multiple fragments (200). Accordingly, the media file may be segmented and stored or transmitted. The media data (mdat box) of the media file may be divided into multiple fragments and each of the fragments may include a moof box and a divided mdat box. According to an embodiment, the information of the ftyp box and/or the moov box may be needed to use the fragments.

The moof box (movie fragment box) may provide metadata about the media data of a corresponding fragment. The moof box may be a box at the highest layer among the boxes related to the metadata of the corresponding fragment.

The mdat box (media data box) may contain actual media data as described above. The mdat box may contain media samples of the media data corresponding to each fragment.

According to an embodiment, the above-described moof box may include an mfhd box and/or a traf box as sub-boxes.

The mfhd box (movie fragment header box) may contain information related to correlation of multiple divided fragments. The mfhd box may include a sequence number to indicate the sequential position of the media data of the corresponding fragment among the divided data. In addition, it may be checked whether there is missing data among the divided data, based on the mfhd box.

The traf box (track fragment box) may contain information about a corresponding track fragment. The traf box may provide metadata about a divided track fragment included in the fragment. The traf box may provide metadata for decoding/reproducing media samples in the track fragment. Multiple traf boxes may be provided depending on the number of track fragments.

According to an embodiment, the traf box described above may include a tfhd box and/or a trun box as sub-boxes.

The tfhd box (track fragment header box) may contain header information about the corresponding track fragment. The tfhd box may provide information such as a default sample size, period, offset and identifier for the media samples of the track fragment indicated by the traf box.

The trun box (track fragment run box) may contain information related to the corresponding track fragment. The trun box may contain information such as a period, size and reproduction timing of each media sample.

The media file or the fragments of the media file may be processed into segments and transmitted. The segments may include an initialization segment and/or a media segment.

The file of the illustrated embodiment 210 may be a file containing information related to initialization of the media decoder except the media data. This file may correspond to the above-described initialization segment. The initialization segment may include the ftyp box and/or the moov box described above.

The file of the illustrated embodiment 220 may be a file including the above-described fragments. For example, this file may correspond to the above-described media segment.

The media segment may include the moof box and/or the mdat box described above. The media segment may further include an styp box and/or an sidx box.

The styp box (segment type box) may provide information for identifying media data of a divided fragment. The styp box may perform the same function as the above-described ftyp box for a divided fragment. According to an embodiment, the styp box may have the same format as the ftyp box.

The sidx box (segment index box) may provide information indicating an index for a divided fragment. Accordingly, the sequential position of the divided fragment may be indicated.

An ssix box may be further provided according to an embodiment 230. When a segment is further divided into sub-segments, the ssix box (sub-segment index box) may provide information indicating indexes of the sub-segments.

The boxes in a media file may further contain extended information on the basis of a box as shown in an embodiment 250 or a FullBox. In this embodiment, the size field and a largesize field may indicate the length of a corresponding box in bytes. The version field may indicate the version of a corresponding box format. The Type field may indicate the type or identifier of the box. The flags field may indicate a flag related to the box.

The fields (attributes) for 360-degree video according to the present disclosure may be carried in a DASH-based adaptive streaming model.

Figure 4:
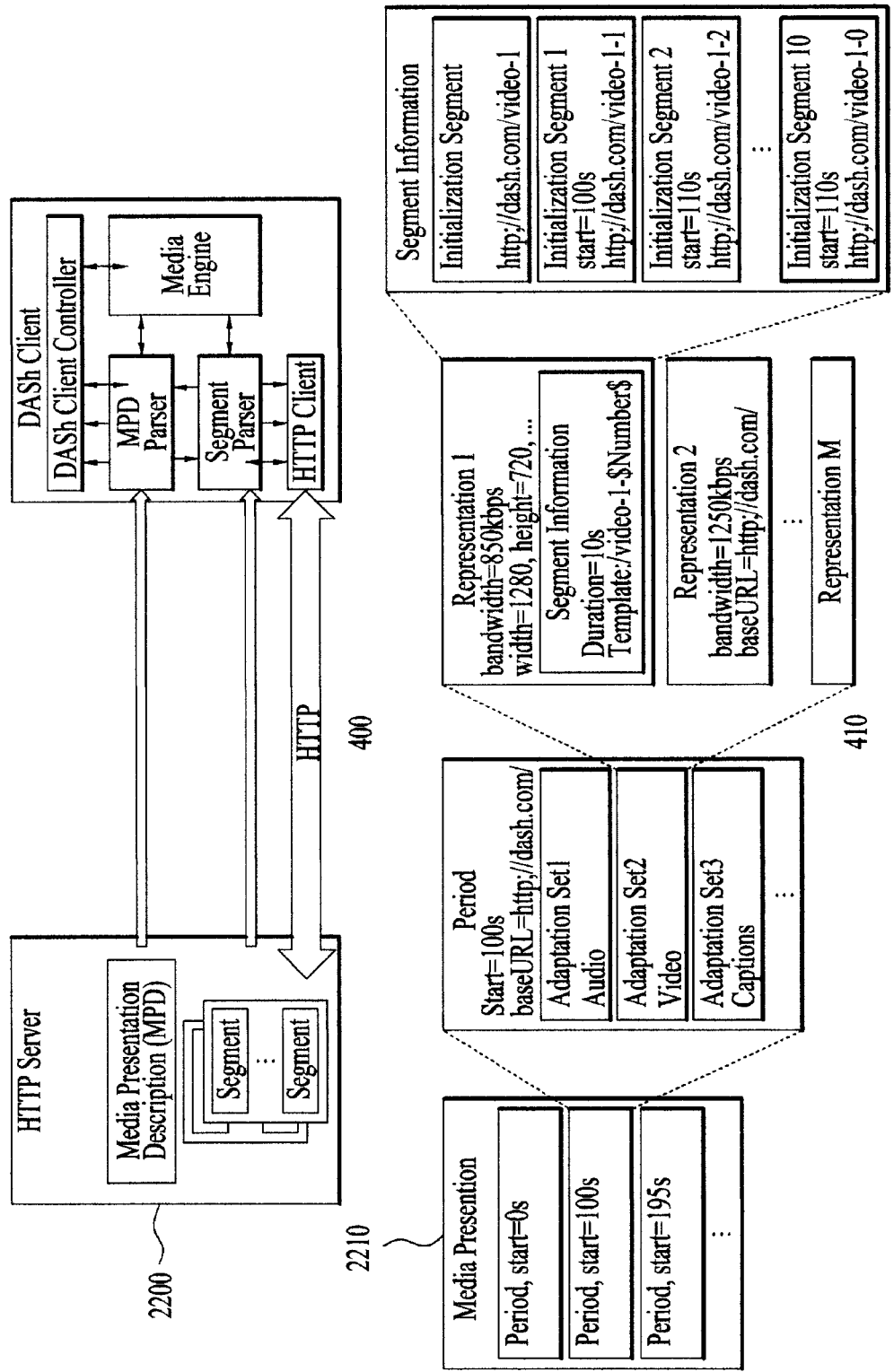
FIG. 4 illustrates an example of the overall operation of a DASH-based adaptive streaming model.

FIG. 4 illustrates an example of the overall operation of a DASH-based adaptive streaming model. A DASH-based adaptive streaming model according to an embodiment 400 shown in the figure describes operations between an HTTP server and a DASH client. Here, DASH (dynamic adaptive streaming over HTTP) is a protocol for supporting HTTP-based adaptive streaming and may dynamically support streaming depending on the network condition. Accordingly, AV content may be seamlessly played back.

First, the DASH client may acquire an MPD. The MPD may be delivered from a service provider such as the HTTP server. The DASH client may make a request to the server for segments described in the MPD, based on the information for accessing the segments. The request may be made based on the network condition.

The DASH client may acquire the segments, process the segments through a media engine and display the processed segments on a screen. The DASH client may request and acquire necessary segments by reflecting the playback time and/or the network condition in real time (Adaptive Streaming). Accordingly, content may be seamlessly played back.

The MPD (media presentation description) is a file containing detailed information allowing the DASH client to dynamically acquire segments, and may be represented in an XML format.

A DASH client controller may generate a command for requesting the MPD and/or segments considering the network condition. In addition, the DASH client controller may control an internal block such as the media engine to use the acquired information.

An MPD parser may parse the acquired MPD in real time. Accordingly, the DASH client controller may generate a command for acquiring necessary segments.

A segment parser may parse the acquired segment in real time. Internal blocks such as the media engine may perform a specific operation according to the information contained in the segment.

The HTTP client may make a request to the HTTP server for a necessary MPD and/or segments. In addition, the HTTP client may deliver the MPD and/or segments acquired from the server to the MPD parser or the segment parser.

The media engine may display content on the screen based on the media data included in the segments. In this operation, the information of the MPD may be used.

The DASH data model may have a hierarchical structure 410. Media presentation may be described by the MPD. The MPD may describe a time sequence of multiple periods for the media presentation. A period may represent one section of media content.

In one period, data may be included in adaptation sets. An adaptation set may be a set of multiple media content components which may be exchanged. An adaption may include a set of representations. A representation may correspond to a media content component. In one representation, content may be temporally divided into multiple segments, which may be intended for appropriate accessibility and delivery. To access each segment, URL of each segment may be provided.

The MPD may provide information related to media presentation. A period element, an adaptation set element, and a representation element may describe a corresponding period, a corresponding adaptation set, and a corresponding representation, respectively. A representation may be divided into sub-representations. A sub-representation element may describe a corresponding sub-representation.

Here, common attributes/elements may be defined. The common attributes/elements may be applied to (included in) sub-representations. The common attributes/elements may include EssentialProperty and/or SupplementalProperty.

The EssentialProperty may be information including elements regarded as essential elements in processing the corresponding media presentation related data. The SupplementalProperty may be information including elements which may be used in processing the corresponding media presentation related data. In an embodiment, descriptors which will be described later may be defined in the EssentialProperty and/or the SupplementalProperty when delivered through an MPD.

The present disclosure is directed to providing a method of providing 3 Degrees of Freedom+(3DoF+) content as well as the method of providing 360-degree content described above to allow users to experience immersive media.

While the conventional 3DoF-based VR system described above (i.e., the conventional 360-degree content-based system described above) provides a user with a visual/aural experience for different viewing orientations at a fixed position of the user, whereas the 3DoF+ based VR system aims to provide the user with an extended visual/aural experience for viewing orientations at different viewpoints and different viewing positions. That is, the 3DoF+ based VR system may represent a system configured to provide 360-degree content that is rendered to multiple viewing positions at multiple viewpoints.

The concept of viewpoints and viewing positions that are supplementarily defined in the 3DoF+ VR system may be explained as shown in the following figure.

Figure 5:
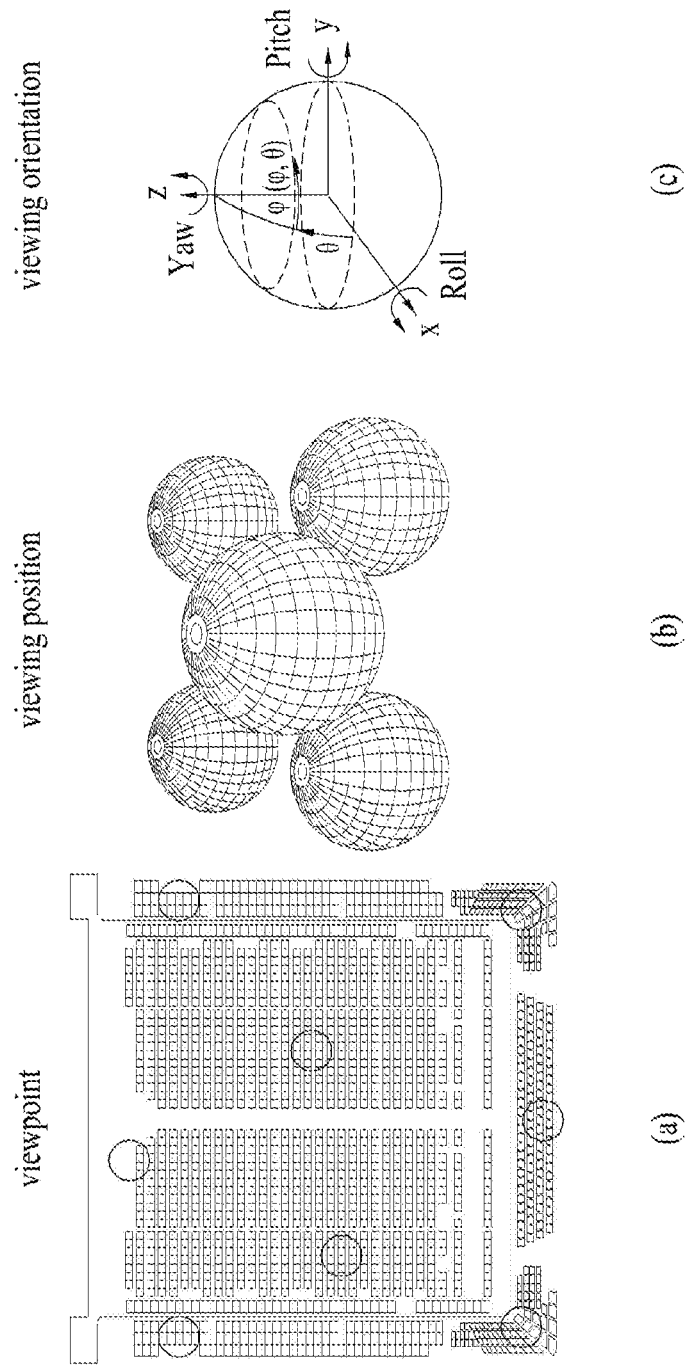
FIG. 5 exemplarily shows the 3DoF+ VR system.

FIG. 5 exemplarily shows the 3DoF+ VR system.

Specifically, FIG. 5 exemplarily illustrates multiple viewpoints to which 360-degree content is provided by the 3DoF+ VR system. For example, as shown in FIG. 5(a), multiple specific locations in a specific space (such as a theater) may be considered as viewpoints provided with the 360-degree content. In this case, it may be assumed that video/audio provided to the respective viewpoints in the same specific space has the same time flow.

360-degree content for multiple viewing positions may be rendered at a specific viewpoint. Accordingly, different visual/aural experiences may be provided according to change in the user's viewing position (head motion) at the specific viewpoint. Here, the 360-degree content may be referred to as 3DoF+ content. The 3DoF+ content may include 3DoF+ video and 3DoF+ audio.

For example, the value of the camera_id_type[i] field in the 3DoF+ content shown in FIG. 5 may be specified as 1. Here, the camera_id_type[i] field may indicate the purpose, embodiment, or type of the i-th camera. The camera_id_type [i] field will be described in detail later.

When the value of the camera_id_type[i] field is 1, another head position supporting a 3DoF+ application at a specific viewpoint may be defined. Thereby, a head motion parallax may be supported.

In addition, the value of the camera_id_type[i] field may be specified as 2. When the value of the camera_id_type[i] field is 2, a head position and a head direction (head orientation') may be provided. In addition, in supporting a binocular disparity in a 3DoF+ application, a left or right eye view sub-picture may be specified by setting 3 as a value of the camera_id_type[i] field. That is, when the value of the camera_id_type[i] field is 3, the camera_id_type[i] field may indicate a left or right eye view sub-picture for which binocular disparity is supported.

Based on camera lens information such as the camera_id [i] field for the 3DoF+ content and a corresponding camera_id_type[i] field, the picture may be processed before a post-processor such as a stitching or rendering processor analyzes the picture. The stitching or rendering processor may select a sub-picture according to a specific purpose, based on the camera lens information described above. For example, one view for a monoscopic display may be displayed based on the camera lens information described above, and may be optionally processed according to a specific viewpoint or head position.

Another example of application of the camera lens information may be generating a panoramic image. A panoramic image may be generated based on images captured through multiple cameras at the same time or images captured at multiple locations with a single camera. In addition, for a light field video captured through multiple cameras in an array, the location and lens property of each of the cameras may be specified based on the camera lens information.

FIG. 5 exemplarily illustrates 3D spaces of multiple viewing positions at a specific viewpoint. The 3D space may be a sphere. Since different visual/aural experiences may be provided according to change in the user's viewing position (head motion) at the specific viewpoint, video/voice/text information reflecting the relative positions of the respective viewing positions may be provided.

In addition, at a specific viewing position of a specific viewpoint, visual/aural information about various orientations, such as the existing 360-degree content, may be delivered. That is, 360-degree content for the specific viewing position of the specific viewpoint may be rendered in a 3D space. In this case, not only the main source including video/voice/text, etc., but also various additional sources may be integrated and provided, and information about the additional sources may be delivered in association with or independently of the user's viewing orientation.

FIG. 5 exemplarily shows a 3D space in which a 360-degree video of a viewing position is rendered. As shown in FIG. 5, each point on the spherical surface may be represented by r (radius of the sphere), θ (the direction and degree of rotation about the z axis), and φ (the direction and degree of rotation of the x-y plane toward the z axis) using a spherical coordinate system. In an embodiment, the spherical surface may correspond to the world coordinate system, or the principal point of the front camera may be assumed to be the point (r, 0, 0) of the spherical surface.

The position of each point on the spherical surface may be expressed based on the concept of the aircraft principal axes. For example, the position of each point on the spherical surface may be expressed in terms of pitch, yaw and roll.

An aircraft may rotate freely in three dimensions. The three-dimensional axes are called a pitch axis, a yaw axis, and a roll axis, respectively. In this specification, these axes may be simply expressed as pitch, yaw, and roll or as a pitch direction, a yaw direction, a roll direction. The pitch axis may refer to an axis around which the front nose of the airplane rotates upward/downward. In the illustrated concept of aircraft principal axes, the pitch axis may refer to an axis extending from one wing to the other wing of the aircraft. The yaw axis may refer to an axis around which the front nose of the aircraft rotates leftward/rightward. In the illustrated concept of aircraft principal axes, the yaw axis may refer to an axis extending from the top to the bottom of the aircraft. In the illustrated concept of aircraft principal axes, the roll axis may refer to an axis extending from the front nose to the tail of the aircraft, and rotation in the roll direction may refer to rotation about the roll axis. As described above, a 3D space in the present disclosure may be described based on the concept of pitch, yaw, and roll. In an embodiment, a method based on the concept of X, Y, and Z axes or a spherical coordinate system may be used.

Figure 6:
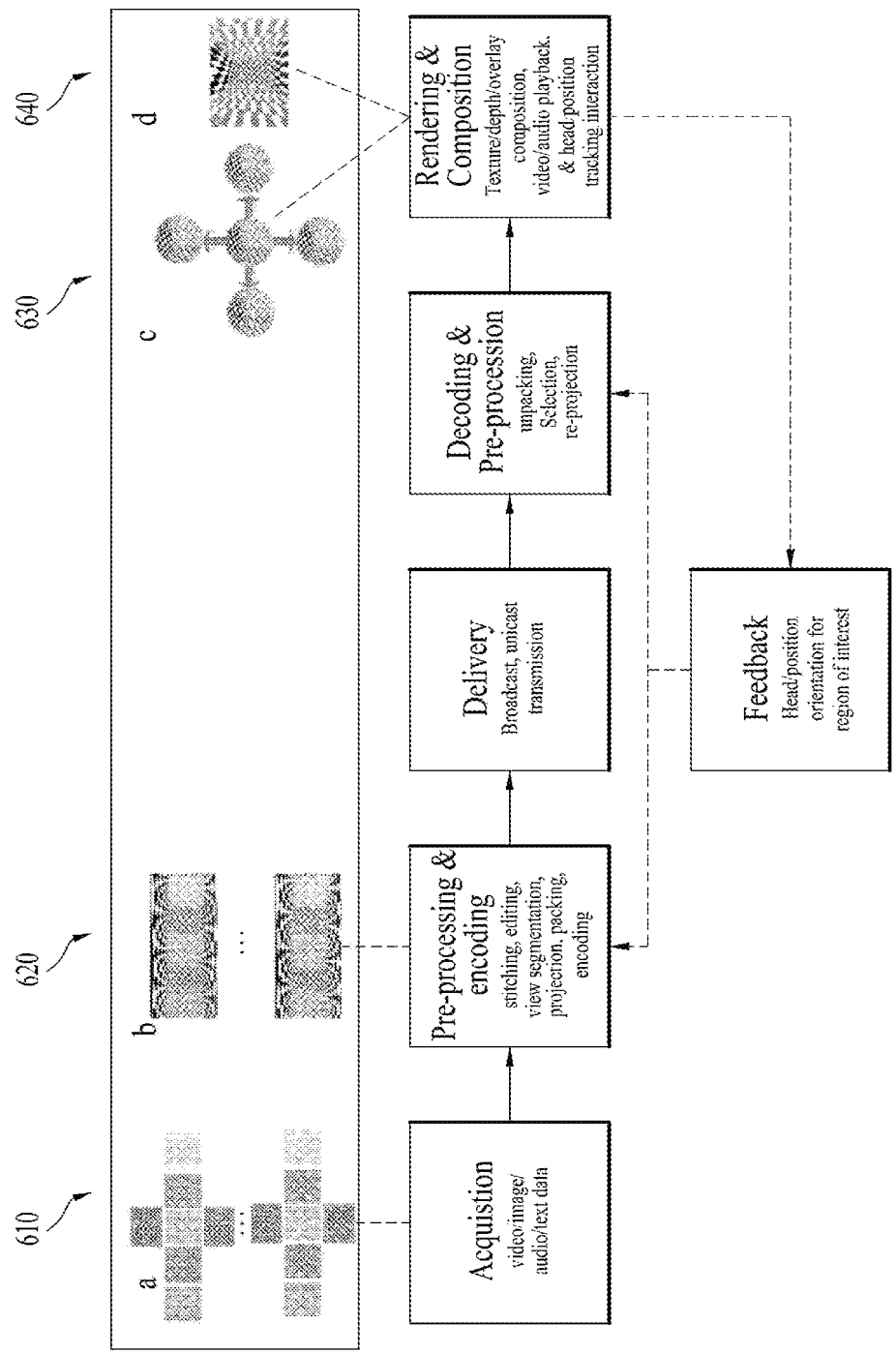
FIG. 6 is a diagram showing an overall architecture for providing 3DoF+ video according to the present disclosure.

FIG. 6 is a diagram showing an overall architecture for providing 3DoF+ video according to the present disclosure.

Referring to FIG. 6, 3DoF+ video data and/or 3DoF+ audio data may be acquired (Acquisition). Specifically, a High Density Camera Array (HDCA), a Lenslet (microlens) camera, or the like may be used to capture 3DoF+ content, or a new device designed for 3DoF+ video capture may be used. Multiple image/video data sets, such as the acquired image 610 shown in FIG. 6, may be generated according to the camera locations for capture. That is, multiple pieces of image/audio information may be acquired according to the head motion at multiple locations. In this case, the image information may include depth information as well as texture information. As in the case of the acquired image 610 shown in FIG. 6, multiple pieces of information about different viewing positions may be acquired according to different capture locations (viewpoints). In addition, in the process of capturing 3DoF+ content, metadata indicating internal/external setup values of the camera may be generated. For an image generated by a computer, not by a camera, the capture process may be skipped.

Once the image acquisition process is performed, a composition process may be performed. The composition process may be defined as a synthesis process performed to include the image 610 acquired through the image/audio input device, and a picture (video/image, etc.), sound (audio/effect sound, etc.), text (subtitles, etc.) input through an external media device in the user experience.

The pre-processing process of the acquired image 610 may be a process of processing the captured image/video and the metadata delivered in the capture process. The pre-processing process may include all types of pre-processing steps for processing content before transmission, including a stitching process, a color correction process, a projection process, and a view segmentation process of segmenting a view into a primary view and a secondary view to increase coding efficiency, and an encoding process.

Specifically, the stitching process may be a process of creating a panoramic or spherical image/video centered on each camera location by connecting images captured at the locations of the respective cameras in 360-degree directions.

Thereafter, the stitched image/video may be subjected to the projection process. The projection process may refer to a process of deriving a projected picture 620 by projecting each stitched image onto a 2D image. Here, the projection may be expressed as mapping to a 2D image. An image mapped at each camera location may be segmented into a primary view and a secondary view, and different resolutions may be applied for the respective views to improve video coding efficiency. The efficiency of coding may be increased even within the primary view by changing the arrangement or resolution of the mapped images. The image segmentation process according to the views may be referred to as a view segmentation process. The secondary view may not be present depending on the capture environment. The secondary view may refer to an image/video that needs to be played back while the user moves from a primary view to another primary view, and may have a lower resolution than the primary view. However, it may have the same resolution as the primary view when necessary. In some cases, a secondary view may be newly generated as virtual information by the receiver.

In an embodiment, the pre-processing process may further include an editing process. The editing process may represent a process of removing a boundary between regions of a 360-degree video, reducing a difference in color/brightness, or adding a visual effect to an image. In addition, the pre-processing process may include a packing process of re-arranging an image according to the regions, and an encoding process of compressing image information. Like the projected picture 620, a projected picture may be generated based on multiple projection images of different viewing positions according to different capture locations (viewpoints).

In addition, in the pre-processing process, editing of the image/video data may be further performed before or after the projection, and metadata may be generated. Further, in the pre-processing process, metadata about an initial viewing position at which a provided image/video should be played back first, an initial position of a user, a region of interest (ROI), and the like may be generated.

The media delivery process (Delivery) illustrated in FIG. 6 may represent a process of processing and delivering image/video data and metadata obtained in the pre-processing process. For delivery of the image/video data and the metadata, processing according to any transport protocol may be performed, and the pre-processed data may be delivered over a broadcast network and/or broadband. In addition, the pre-processed data may be delivered to the receiving side on an on-demand basis.

The processing process may include all processes performed before image creation to play back images/videos, including a process of decoding the received image/video data and metadata, a re-projection process of mapping or projecting the image/video data of the decoded projected picture onto a three-dimensional (3D) model, and a process of creating and synthesizing a virtual viewing position. The mapped 3D model or projection map may be a sphere, cube, cylinder, or pyramid like a conventional 360-degree video. Alternatively, the 3D model or the projection map may take a modified form of an existing 360-degree video projection map. In some cases, it may be a free-type projection map.

Here, the process of generating and synthesizing a virtual view may represent a process of generating and synthesizing image/video data that should be played back when the user moves between the primary view and the secondary view or between primary views. In order to generate a virtual view, a process of processing the metadata transferred from the capture process and pre-processing process may be required. In some cases, only a part of the 360 image/video may be generated/synthesized in the virtual view.

According to an embodiment, the processing process may further include an editing process, an up scaling process, and a down scaling process. In the editing process, an additional editing process required before playback may be applied after the processing process. When necessary, up scaling or downscaling of the received image/video may be performed.

The rendering process may represent a process of rendering the image/video re-projected after being transmitted or generated such that the image/video may be displayed. The rendering and re-projection processes may be collectively referred to as rendering. Accordingly, the re-projection process may be included in the rendering process. Multiple re-projection results may be produced in the form such as part 630 of FIG. 6, in a manner that a user-centered 360-degree video/image and 360-degree videos/images centered on each of the locations to which the user moves according to the movement direction are created. The user may view a part of the area of the 360-degree video/image according to the device to display the video/image, and the area that the user views may be derived in the form of part 640 of FIG. 6. In addition, when the user moves, the 360-degree video/image may not be fully rendered, but only an image corresponding to the position the user is viewing may be rendered. In addition, the 360-degree video reception apparatus may receive metadata about the user's position and movement and additionally render a video/image of a location to which the user is to move (i.e., a location to which the user is expected to move).

The feedback process may represent a process of delivering, to the transmitting side, various kinds of feedback information that may be acquired in the display process. Through the feedback process, interactivity may occur between the 360-degree content and the user. According to an embodiment, information about the user's head/position orientation and the area (viewport) that the user is currently viewing may be delivered in the feedback process. The information may be delivered to the transmitting side or a service provider in the feedback process. According to an embodiment, the feedback process may be skipped.

The information about the user's position may be information about the user's head position, angle, movement, and movement distance, and the viewport that the user is viewing may be calculated based on the information.

Figure 7:
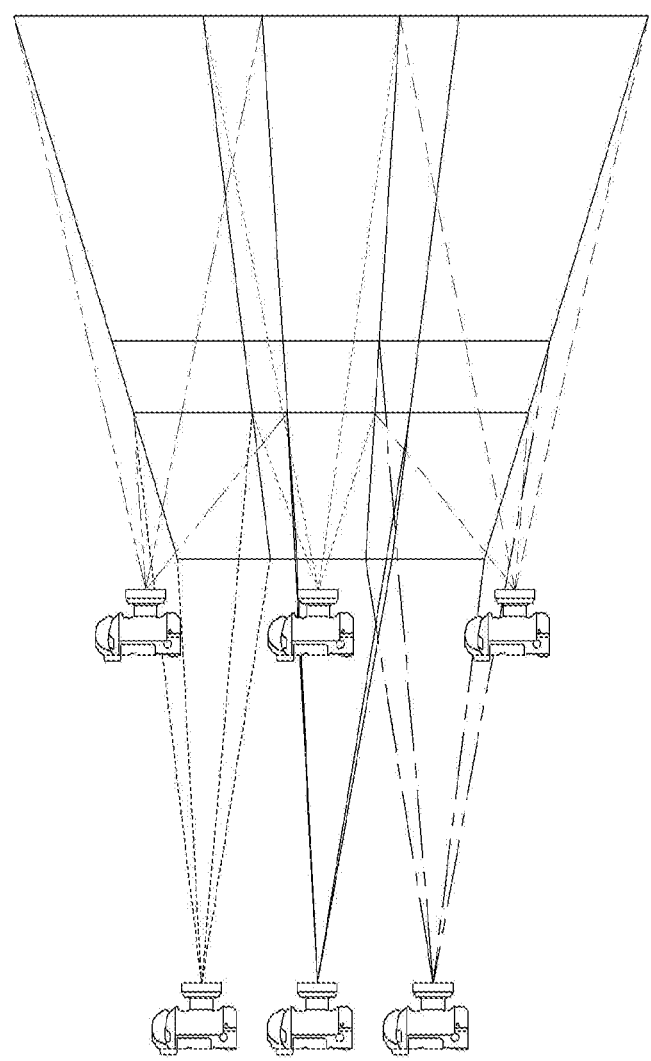
FIG. 7 exemplarily shows an example of stitching a 360-degree video to a panoramic image based on camera lens information and/or supplemental camera lens information according to the present disclosure.

FIG. 7 exemplarily shows an example of stitching a 360-degree video to a panoramic image based on camera lens information and/or supplemental camera lens information according to the present disclosure.

Figure 8A:
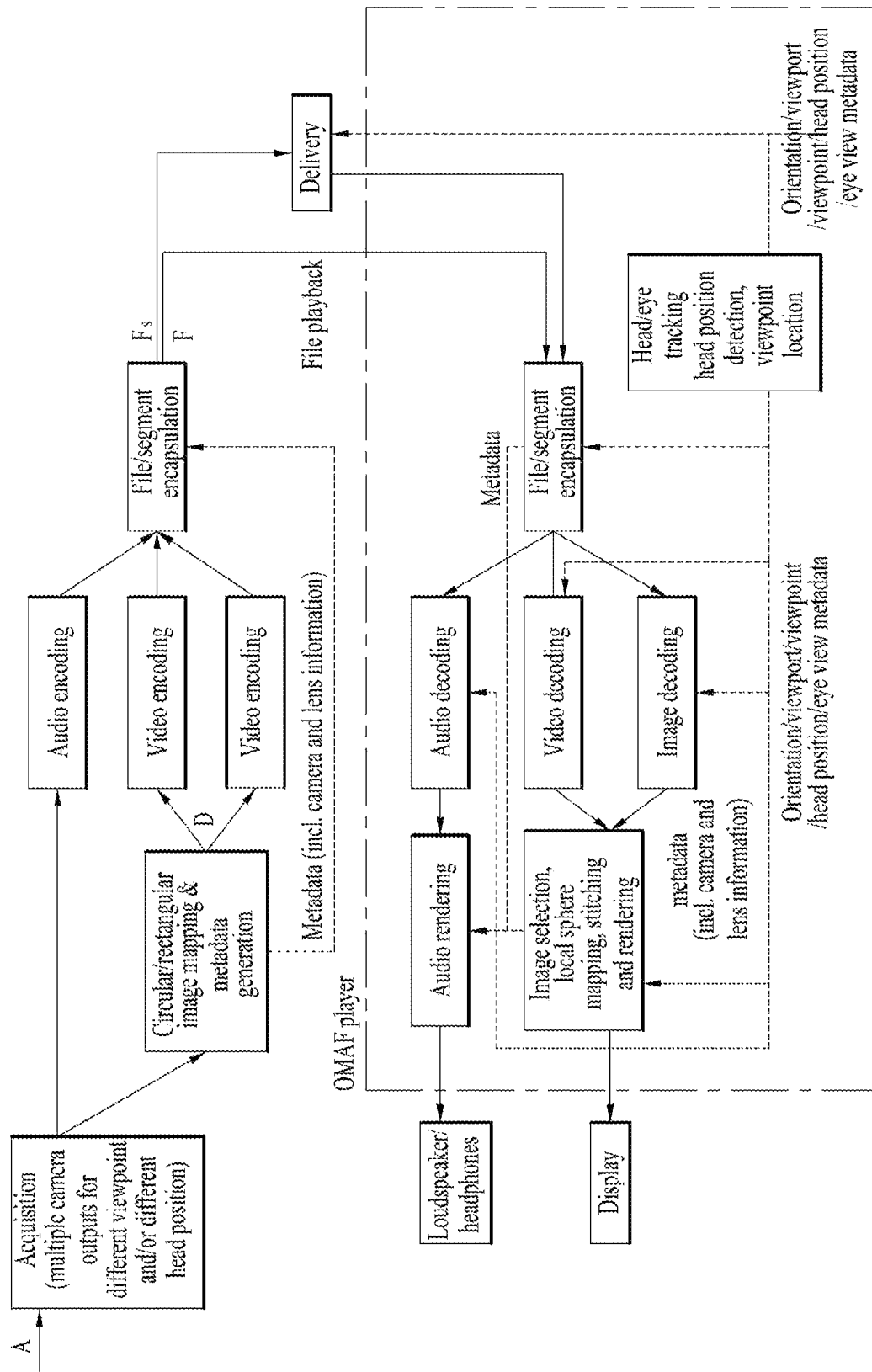
FIGS. 8A and 8B exemplarily show an overall architecture for provision of 360 content/3DoF+ content performed through a 360-degree video transmission apparatus/360-degree video reception apparatus.
Figure 8B:
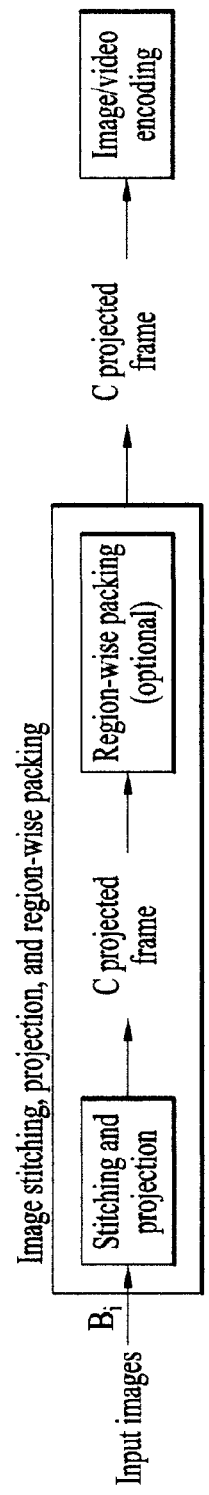

FIGS. 8A and 8B exemplarily show an overall architecture for provision of 360 content/3DoF+ content performed through a 360-degree video transmission apparatus/360-degree video reception apparatus.

360 content/3DoF+ content may be provided by an architecture as shown in FIGS. 8A and 8B. 3DoF+ content may be provided in the form of a file or in the form of a segment-based download or streaming service such as DASH.

Specifically, referring to FIG. 8A, 360-degree video data and/or 360-degree audio data of 3DoF+ content may be acquired as described above (Acquisition). That is, a 360-degree video may be captured through a 360 camera, and a 360-degree video transmission apparatus may acquire the 360-degree video data. Different pieces of information may be acquired simultaneously or sequentially by an element of the 360-degree video transmission apparatus that performs the information acquisition, according to the sensor orientation, the sensor position, and the information acquisition point of the sensor. In addition, in the case of an image, an element of the 360-degree video transmission apparatus that performs information acquisition may acquire image information simultaneously or sequentially according to a viewing orientation, a viewing position, and a viewpoint. In this case, the image information may include video, image, audio, and location information.

In addition, the 360-degree audio data may be processed through an audio pre-processing process and an audio encoding process. In these processes, audio-related metadata may be generated. The encoded audio and audio-related metadata may be subjected to processing (file/segment encapsulation) for transmission.

The 360 degree video data may go through the processes as described above. Referring to FIG. 8A, a stitcher of a 360-degree video transmission apparatus may perform stitching on 360-degree video data (Visual stitching). For example, the 360-degree video data may contain texture information and depth information. The 360-degree video transmission apparatus may acquire the texture information and the depth information, and perform different pre-processing on the texture information and the depth information according to the characteristics of each component. For example, in the case of the texture information, the 360-degree video transmission apparatus may configure a 360-degree omnidirectional image using the images of different orientations of the same viewing position acquired at the same viewpoint using the image sensor position information. To this end, the apparatus may perform an image stitching process. According to an embodiment, this process may be skipped and may be performed at the receiving side.

In addition, referring to FIG. 8A, the projection processor of the 360-degree video transmission apparatus may project the 360-degree video data onto a 2D image (Projection and mapping (packing)). The projection processor may receive 360-degree video data (Input Images). In this case, the processor may perform the stitching and projection processes. Specifically, in the projection process, the stitched 360-degree video data may be projected onto a 3D space, and the projected 360-degree video data may be arranged on a 2D image. In the present specification, this process may be expressed as projecting 360-degree video data onto a 2D image. Here, the 3D space may be a sphere or a cube. This 3D space may be the same as the 3D space used for re-projection at the receiving side.

The 2D image may be referred to as a projected frame or a projected picture. In addition, a region-wise packing process may be optionally performed on the 2D image. When the region-wise packing process is performed, regions on the 2D image may be mapped onto a packed frame by specifying the position, shape, and size of each region. The packed frame may be referred to as a packed picture. When the region-wise packing process is not performed on the projected frame, the projected frame may be the same as the packed frame. The regions will be described later. The projection process and the region-wise packing process may be expressed as projecting each region of 360-degree video data onto a 2D image. Depending on the design, the 360-degree video data may be directly transformed into a packed frame without intermediate processing.

Further, a depth image may be generally acquired through a depth camera. In this case, a depth image may be generated in the same form as a texture image. Alternatively, depth data may be generated based on separately measured data. After an image is generated component-wise, the 360-degree video transmission apparatus may perform a process (sub-picture generation) of performing additional transform (packing) into a video format for efficient compression or reconstructing the image by dividing the image into parts that are actually needed.

When video/audio/text information is additionally provided along with the acquired image data (or data for a main service), information for synthesizing the additionally provided information at the time of final playback may be generated and provided. For example, the composition generation terminal of the 360-degree video transmission apparatus may generate information for synthesizing, at the final playback terminal, media data (video/image information if the additionally provided information is video, audio/sound effect if the additionally provided information is sound, a subtitle if the additionally provided information is a text) externally generated based on the intention of the producer. The information may be transmitted through composition metadata.

Referring to FIG. 8A, a packed frame for 360-degree video data may be image-encoded or video-encoded. Even the same 3DoF+ content may have 360-degree video data for each viewpoint. In this case, the 360-degree video data for each viewpoint of the content may be encoded into different bit streams. The encoded 360-degree video data may be processed in a file format such as ISOBMFF by the encapsulation processor described above. Alternatively, the encapsulation processor may process the encoded 360-degree video data into segments. The segments may be included in individual tracks for DASH-based transmission.

Along with the processing of 360-degree video data, 360-degree video related metadata may be generated as described above. The metadata may be delivered in a video stream or file format. This metadata may also be used in processes such as encoding, file format encapsulation, and processing for transmission.

The 360 audio/video data may be processed for transmission according to a transport protocol, and then transmitted. The 360-degree video reception apparatus described above may receive the data over a broadcast network or broadband.

As illustrated in FIG. 8A, loudspeakers/headphones, a display, and a head/eye tracking component may be driven by an external device or a VR application of the 360-degree video reception apparatus. According to an embodiment, the 360-degree video reception apparatus may include all the loudspeakers/headphones, the display, and the head/eye tracking component. According to an embodiment, the head/eye tracking component may correspond to the above-described receiving-side feedback processor.

The 360-degree video reception apparatus may perform processing (file/segment decapsulation) for receiving 360 audio/video data. The 360 audio data may be provided to a user through the speakers/headphones after being processed through audio decoding and audio rendering.

The 360-degree video data may be provided to the user through the display after being processed through image decoding, video decoding, and visual rendering. Here, the display may be a VR supporting display or a typical display.

Specifically, as described above, in the rendering process, the 360-degree video data may be re-projected onto a 3D space, and the re-projected 360-degree video data may be rendered. The process may also be viewed as rendering the 360-degree video data in the 3D space.

The head/eye tracking component may acquire and process head orientation information, gaze information, and viewport information about the user. Related details may be the same as those described above.

A VR application communicating with the receiving-side processes described above may be provided at the receiving side may have.

FIG. 8B exemplarily shows a 2D image to which the region-wise packaging process is applied according to the processing process of 360-degree video and a projection scheme. The process illustrated in FIG. 8B may represent a process of processing input 360-degree video data. Specifically, referring to FIG. 8B, 360-degree video data of the input viewing position may be stitched and projected onto a 3D projection structure according to various projection schemes. The 360-degree video data projected onto the 3D projection structure may be represented as a 2D image. That is, the 360-degree video data may be stitched and projected onto the 2D image. The 2D image onto which the 360 degree video data is projected may be represented as a projected frame. In addition, the region-wise packing process described above may be performed on the projected frame. That is, processing such as dividing an area including the projected 360-degree video data on the projected frame into regions, rotating or rearranging each region, or changing the resolution of each region may be performed. In other words, the region-wise packing process may represent a process of mapping the projected frame to one or more packed frames. Performing the region-wise packing process may be optional. When the region-wise packing process is skipped, the packed frame may be identical to the projected frame. When the region-wise packing process is applied, each region of the projected frame may be mapped to a region of the packed frame, and metadata indicating the position, shape, and size of the region of the packed frame to which each region of the projected frame is mapped may be derived.

Figure 9:
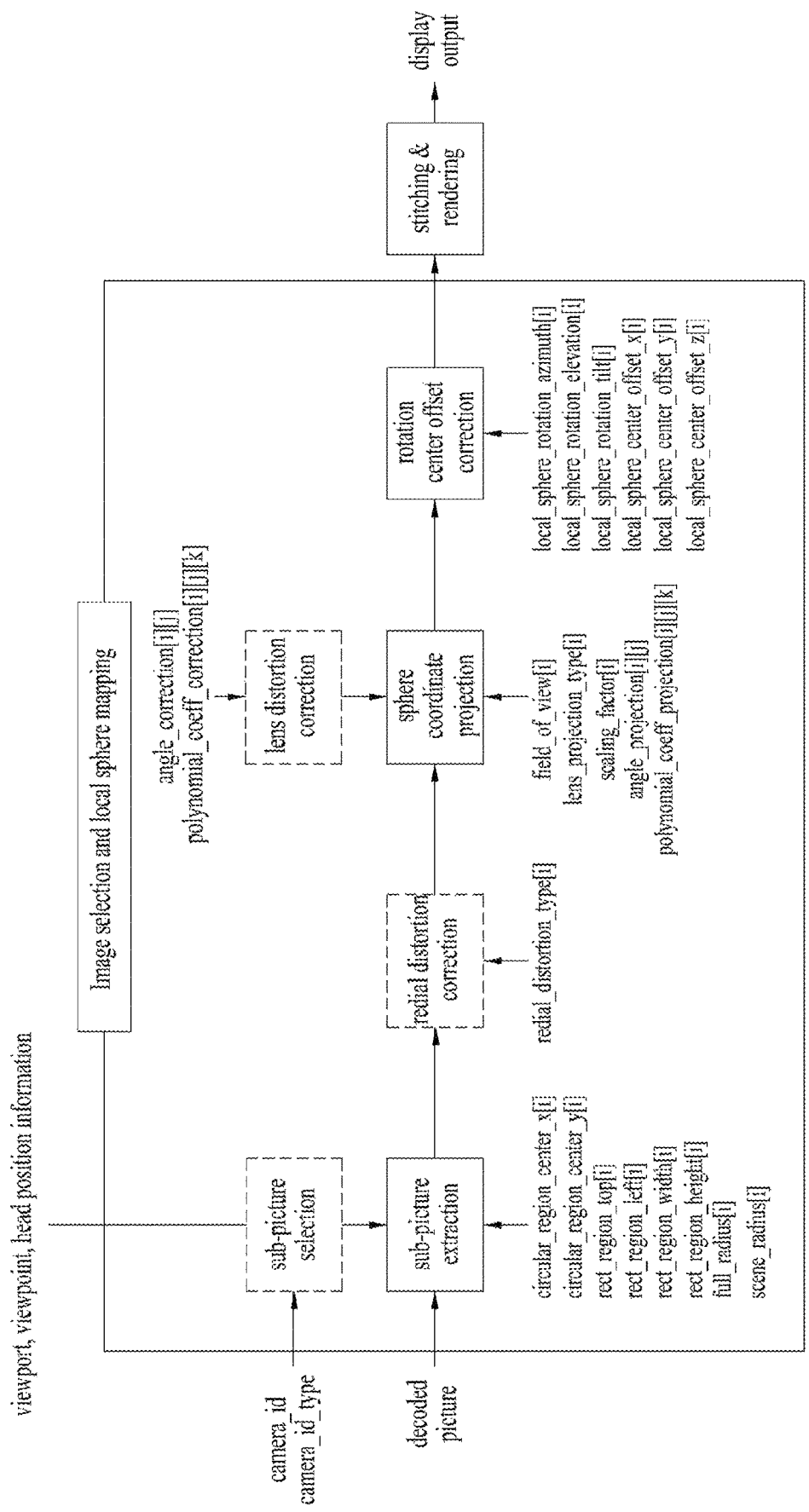
FIG. 9 illustrates an example of processing a 360-degree video by a 360-degree video reception apparatus based on camera lens information.

FIG. 9 illustrates an example of processing a 360-degree video by a 360-degree video reception apparatus based on camera lens information.

Referring to FIG. 9, a sphere image or sphere images may be generated from sub-pictures extracted from the decoded picture. A sphere image or sphere images are generated from sub-pictures extracted from the decoded picture.

For example, referring to FIG. 9, an active area corresponding to an intersection of a circular image and a rectangular region may be extracted as a sub-picture for generating a sphere image or sphere images. The sphere image and the rectangular region may be derived based on a circular_region_center_x[i] field, a circular_region_center_y[i] field, a rect_region_top[i] field, a rect_region_left[i] field, a rect_region_width[i] field, a rect_region_height[i] field, a full_radius[i] field, and a scene_radius[i] field. Details of the circular_region_center_x[i] field, the circular_region_center_y[i] field, the rect_region_top[i] field, the rect_region_left[i] field, the rect_region_width[i] field, the rect_region_height[i] field, the full_radius[i] field, and the scene_radius[i] field will be described later.

Referring to FIG. 9, redial distortion of the sub-picture caused by lens defects may be corrected based on a model derived based on a radial_distortion_type[i] field. Subsequently, the sub-picture may be mapped through a modeled projection equation derived based on the lens_projection_type[i] field, or a projection equation derived by coefficients of a polynomial that is a function of angles indicated by the angle_projection[i][j] field and the polynomial_coeff_projection[i][j][k] field. Details of the redial_distortion_type[i] field, the lens_projection_type[i] field, the angle_projection[i][j] field, and the polynomial_coeff_projection[i][j][k] field will be described later.

The lens distortion may be corrected based on given parameters (an angle_correction[i][j] field, and a polynomial_coeff_correction[i][j][k] field).

When there is rotation and offset for an image captured by a specific lens (i.e., the decoded picture), the mapped sphere image may be rotated relatively in the global spherical coordinate system based on a local_sphere_rotation_azimuth[i] field, a local_sphere_rotation_elevation[i] field, and a local_sphere_rotation_tilt[i] field. In addition, the sphere center offset may be corrected so as to match the sphere center corresponding to a lens constituting a unit sphere of the eye view of the head position of the viewpoint, based on the local_sphere_rotation_azimuth[i] field, the local_sphere_rotation_elevation[i] field, and the local_sphere_rotation_tilt[i] field. Details of the local_sphere_rotation_azimuth[i] field, the local_sphere_rotation_elevation[i] field, and the local_sphere_rotation_tilt[i] field will be described later.

As described above, the stitching process may be performed to form a sphere image. For example, when the decoded picture includes sub-pictures of different viewpoints and head positions, a camera_id[i] field, and a camera_id_type[i] field may be used to extract a sub-picture for a specific viewpoint, head position and/or eye view. For example, in the case of viewport dependent processing, sub-pictures that may increase efficiency in terms of reduction of processing time and delay may be selected based on the camera_id[i] field, the camera_id_type[i] field, the field of view (FOV) information, and/or the rotation information.

Figure 10:
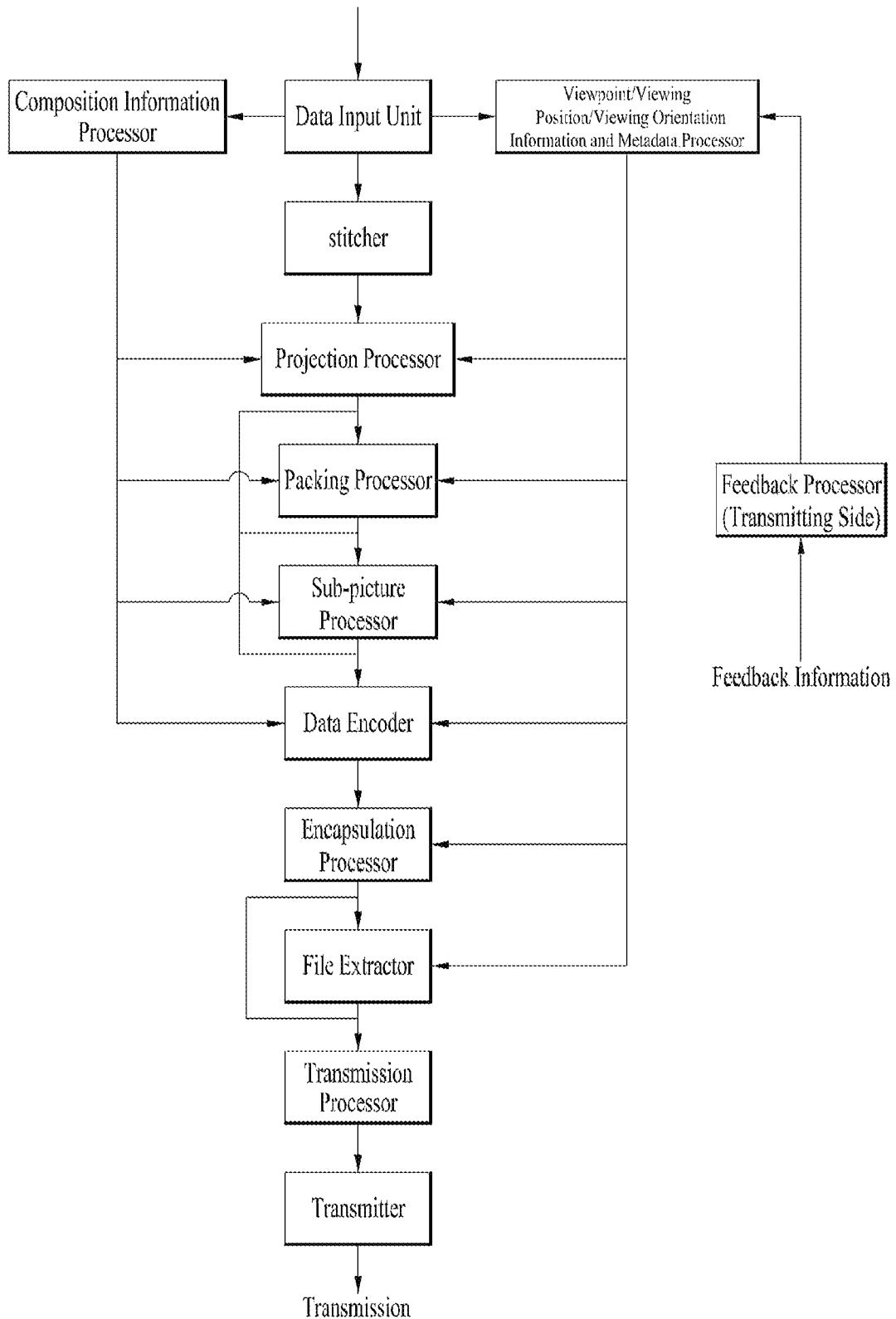
FIG. 10 is a diagram schematically illustrating a configuration of a 360-degree video transmission apparatus to which the present disclosure is applicable.

FIG. 10 is a diagram schematically illustrating a configuration of a 360-degree video transmission apparatus to which the present disclosure is applicable.

The 360-degree video transmission apparatus according to the present disclosure may perform operations related to the preparation process or transmission process described above. The 360-degree video transmission apparatus may include a data input unit, a composition information processor, a stitcher, a projection processor, a (region-wise) packing processor, a sub-picture processor, a data encoder, an encapsulation processor, a file extractor, a transmission processor, a transmitter, a viewpoint/viewing position/viewing orientation information and metadata processor, and/or a (transmitting-side) feedback processor as internal/external elements. When the input data is a camera output image, the 360-degree video transmission apparatus may perform stitching for construction of a sphere image (i.e., a 360-degree image rendered in a 3D space) for each viewpoint/viewing position/component. The viewpoint/viewing position/viewing orientation information and metadata processor may be referred to as a metadata processor.

The data input unit may receive images/videos for each captured viewpoint. These viewpoint-specific images/videos may be images/videos captured by one or more cameras. That is, the images/videos for each viewpoint may include images/videos for multiple viewing positions. The data input unit may also receive metadata generated during the capture process. The data input unit may deliver the input images/videos for each viewing position to the stitcher, and deliver the metadata of the capture process to the signaling processor.

The stitcher may perform stitching on the captured images/videos for each viewing position. The stitcher may deliver the stitched 360-degree video data to the projection processor. When necessary, the stitcher may receive necessary metadata from the metadata processor and use the same for stitching. The stitcher may deliver metadata generated in the stitching process to the metadata processor. The metadata of the stitching process may contain information such as an indication of whether stitching has been performed and a stitching type.

The projection processor may project the stitched 360-degree video data onto a 2D image. The projection processor may perform projection according to various schemes, which will be described later. The projection processor may perform mapping in consideration of a corresponding depth of 360-degree video data for each viewing position. When necessary, the projection processor may receive metadata necessary for projection from the metadata processor and use the same in the projection operation. The projection processor may deliver the metadata generated in the projection process to the metadata processor. The metadata of the projection processor may include a type of a projection scheme.

The (region-wise) packing processor may perform the above-described region-wise packing process. That is, the region-wise packing processor may perform processing such as dividing the projected 360-degree video data into regions, rotating or rearranging each region, or changing the resolution of each region. As described above, the region-wise packing process is optional. When region-wise packing is skipped, the region-wise packing processor may be omitted. When necessary, the region-wise packing processor may receive metadata necessary for region-wise packing from the metadata processor and use the same in the region-wise packing operation. The region-wise packing processor may deliver the metadata generated in the region-wise packing process to the metadata processor. The metadata of the region-wise packing processor may include a rotation degree and size of each region.

According to an embodiment, the stitcher, the projection processor and/or the region-wise packing processor described above may be implemented by one hardware component.

Depending on the application, the sub-picture processor may perform packing for creating an integrated image from multiple images or generate a sub-picture that divides the images into images of detailed regions. In addition, when the input data contains video/voice/text supplemental information, information on a method of adding the supplemental information to a central image and displaying the same may be generated, and may be transmitted together with the supplemental information.

The metadata processor may process metadata that may be generated in the capture process, stitching process, projection process, region-wise packing process, encoding process, encapsulation process, and/or transmission process. Using the metadata, the metadata processor may generate 360-degree video-related metadata. According to an embodiment, the metadata processor may generate 360-degree video-related metadata in the form of a signaling table. Depending on the signaling context, the 360-degree video-related metadata may be referred to as metadata or 360-degree video-related signaling information. The metadata processor may also deliver the acquired or generated metadata to internal elements of the 360-degree video transmission apparatus, as necessary. The metadata processor may transmit the 360-degree video-related metadata to the data encoder, the encapsulation processor and/or the transmission processor such that the metadata may be transmitted to the receiving side.

The data encoder may encode 360-degree video data projected onto a 2D image and/or 360-degree video data packed region-wise. The 360-degree video data may be encoded in various formats.

The encapsulation processor may encapsulate the encoded 360-degree video data and/or the 360-degree video-related metadata in the form of a file. Here, the 360-degree video-related metadata may be received from the metadata processor described above. The encapsulation processor may encapsulate the data in a file format such as ISOBMFF, or CFF, or process the data into DASH segments or the like. According to an embodiment, the encapsulation processor may include the 360-degree video-related metadata in a file format. The 360-related metadata may be included, for example, in various levels of boxes in the ISOBMFF, or included as data in separate tracks in the file. According to an embodiment, the encapsulation processor may encapsulate the 360-degree video-related metadata into a file. The transmission processor may process the encapsulated 360-degree video data according to the file format so as to be transmitted. The transmission processor may process the 360-degree video data according to any transport protocol. The processing for transmission may include processing for delivery over a broadcast network, and processing for delivery over a broadband. According to an embodiment, the transmission processor may receive not only the 360-degree video data, but also the 360-degree video-related metadata from the metadata processor, and may process the same so as to be transmitted.

The transmitter may transmit, over a broadcast network and/or a broadband, the 360-degree video data and/or 360-degree video-related metadata processed for transmission. The transmitter may include an element for transmission over a broadcast network and/or an element for transmission over a broadband.

According to an embodiment of the present disclosure, the 360-degree video transmission apparatus may further include a data storage unit (not shown) as an internal/external element. The data storage unit may store the encoded 360-degree video data and/or 360-degree video-related metadata before transmitting the same to the transmission processor. These data may be stored in a file format such as ISOBMFF. When a 360-degree video is transmitted in real time, the data storage unit may not be needed. However, when the video is transmitted on-demand, in NRT (Non Real Time), or over a broadband, the encapsulated 360-degree data may be stored in the data storage unit for a certain period of time and then transmitted.

According to another embodiment of the present disclosure, the 360-degree video transmission apparatus may further include a (transmitting-side) feedback processor and/or a network interface (not shown) as internal/external elements. The network interface may receive feedback information from the 360-degree video reception apparatus according to the present disclosure, and deliver the same to the transmitting-side feedback processor. The transmitting-side feedback processor may deliver the feedback information to the stitcher, the projection processor, the region-wise packing processor, the data encoder, the encapsulation processor, the metadata processor, and/or the transmission processor. According to an embodiment, after the feedback information is delivered to the metadata processor, it may in turn be delivered to each internal element. The internal elements that receive the feedback information may reflect the feedback information in subsequent processing of the 360-degree video data.

According to another embodiment of the 360-degree video transmission apparatus of the present disclosure, the region-wise packing processor may rotate each region and map the same onto a 2D image. In this operation, the respective regions may be rotated at different angles in different directions, and then mapped onto the 2D image. The rotation of the regions may be performed in consideration of a portion that neighbored the 360-degree video data on the spherical surface or was stitched before projection. Information about the rotation of the regions, that is, the rotation directions, angles, and the like, may be signaled by 360-degree video-related metadata. According to another embodiment of the 360-degree video transmission apparatus of the present disclosure, the data encoder may perform encoding differently for each region. The data encoder may encode a specific region with high quality and other regions with low quality. The transmitting-side feedback processor may deliver the feedback information received from the 360-degree video reception apparatus to the data encoder, such that the data encoder uses a differentiated encoding method for each region. For example, the transmitting-side feedback processor may deliver the viewport information received from the receiving side to the data encoder. The data encoder may encode regions including an area indicated by the viewport information with higher quality (UHD, etc.) than the other regions.

According to another embodiment of the 360-degree video transmission apparatus of the present disclosure, the transmission processor may perform processing for transmission differently for each region. The transmission processor may apply different transmission parameters (modulation order, code rate, etc.) for the respective regions, such that the data transmitted for each region may have different robustness.

Then, the transmitting-side feedback processor may deliver the feedback information received from the 360-degree video reception apparatus to the transmission processor, such that the transmission process performs the differentiated transmission processing for each region. For example, the transmitting-side feedback processor may deliver viewport information received from the receiving side to the transmission processor. The transmission processor may perform processing for transmission on regions including an area indicated by the viewport information, such that the regions may have higher robustness than the other regions.

The internal/external elements of the 360-degree video transmission apparatus according to the present disclosure described above may be hardware elements implemented in hardware. According to an embodiment, the internal/external elements may be changed, omitted, or replaced with other elements. According to an embodiment, supplemental elements may be added to the 360-degree video transmission apparatus.

Figure 11:
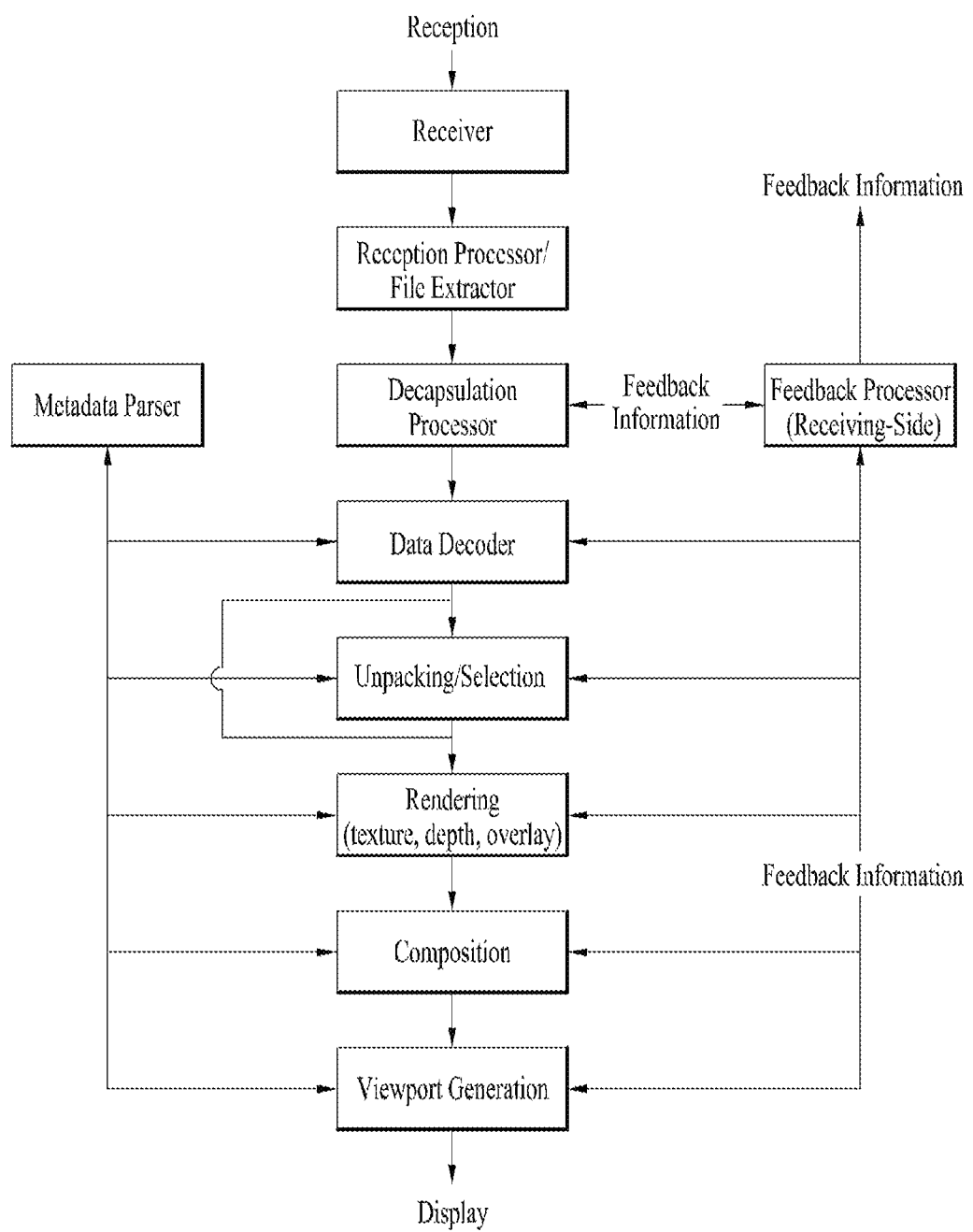
FIG. 11 is a diagram schematically illustrating a configuration of a 360-degree video reception apparatus to which the present disclosure is applicable.

FIG. 11 is a diagram schematically illustrating a configuration of a 360-degree video reception apparatus to which the present disclosure is applicable.

The 360-degree video reception apparatus according to the present disclosure may perform operations related to the processing process and/or the rendering process described above. The 360-degree video reception apparatus may include a receiver, a reception processor/file extractor, a decapsulation processor, a data decoder, a metadata parser, an unpacking/selection processor, a renderer, a composition processor, a (receiving-side) feedback processor, and/or a re-projection processor as internal/external elements. A signaling parser may be referred to as a metadata parser.

The receiver may receive 360-degree video data transmitted by the 360-degree video transmission apparatus according to the present disclosure. Depending on the transmission channel, the receiver may receive 360-degree video data over a broadcast network or a broadband. After receiving a bitstream delivered from the transmitter, the receiver may extract a necessary file.

The reception processor may process the received 360-degree video data according to a transport protocol. The reception processor may perform the reverse of the process of the above-described transmission processor such that the reverse process corresponds to the processing for transmission on the transmitting side. The reception processor may deliver the acquired 360-degree video data to the decapsulation processor, and deliver the acquired 360-degree video-related metadata to the metadata parser. The 360-degree video-related metadata acquired by the reception processor may be in the form of a signaling table.

The decapsulation processor may decapsulate the 360-degree video data received in the form of a file from the reception processor. The decapsulation processor may decapsulate the files according to ISOBMFF or the like to acquire the 360-degree video data or 360-degree video-related metadata. The decapsulation processor may select a video stream in the generated file format using the viewpoint/viewing position/viewing orientation information and the video metadata delivered from the feedback processor. The selected bitstream may be reconstructed into image information through the decoder. The acquired 360-degree video data may be delivered to the data decoder, and the acquired 360-degree video-related metadata may be delivered to the metadata parser. The 360-degree video-related metadata acquired by the decapsulation processor may be in the form of a box or track in the file format. When necessary, the decapsulation processor may receive metadata needed for decapsulation from the metadata parser.

The data decoder may decode the 360-degree video data. The data decoder may receive metadata needed for decoding from the metadata parser. The 360-degree video-related metadata acquired in the data decoding process may be delivered to the metadata parser.

For a packed image, the unpacking/selection processor may perform unpacking on the packed image based on the packing information delivered through the metadata. When necessary, the unpacking/selection processor may perform a process of selecting an image and necessary components suitable for the viewpoint/viewing position/viewing orientation delivered from the feedback processor.

The metadata parser may parse/decode the 360-degree video-related metadata. The metadata parser may deliver the acquired metadata to the data decapsulation processor, the data decoder, the re-projection processor, and/or the renderer.

The re-projection processor may re-project the decoded 360-degree video data. The re-projection processor may re-project the 360-degree video data onto a 3D space. The shape of the 3D space may depend on the employed 3D model. The re-projection processor may receive metadata needed for re-projection from the metadata parser. For example, the re-projection processor may receive information on the type of the employed 3D model and the corresponding detailed information from the metadata parser. According to an embodiment, the re-projection processor may re-project only 360-degree video data corresponding to a specific area in the 3D space onto the 3D space using the metadata needed for re-projection.

The renderer may render the re-projected 360 degree video data. As described above, the 360-degree video data may be rendered in the 3D space. In the case where the two processes occur at once as described above, the re-projection processor and the renderer may be integrated, and the processes may all be performed by the renderer. According to an embodiment, the renderer may render only a part that the user is viewing according to the viewing position information about the user.

In addition, the renderer may perform a rendering process of reconstructing the texture, depth, and overlay information about an image in a format suitable for playback. Before generating the final image, a composition process that integrates information of different layers may be performed, and an image suitable for a display viewport may be generated and played back.

The user may view some areas of the rendered 360-degree video through a VR display or the like. The VR display is a device that plays back the 360-degree video, and may be included in the 360-degree video reception apparatus (in a tethered state) or connected to the 360-degree video reception apparatus as a separate device (in an un-tethered state).

According to an embodiment of the present disclosure, the 360-degree video reception apparatus may further include a (receiving-side) feedback processor and/or a network interface (not shown) as internal/external elements. The receiving-side feedback processor may acquire feedback information from the renderer, the re-projection processor, the data decoder, the decapsulation processor, and/or the VR display, and process the same. The feedback information may include viewport information, head orientation information, and gaze information. The network interface may receive the feedback information from the receiving-side feedback processor and transmit the same to the 360-degree video transmission apparatus.

As described above, the feedback information may not only be delivered to the transmitting side, but also be consumed at the receiving side. The receiving-side feedback processor may deliver the acquired feedback information to internal elements of the 360-degree video reception apparatus such that the information may be reflected in processes such as rendering. The receiving-side feedback processor may deliver the feedback information to the renderer, the re-projection processor, the data decoder and/or the decapsulation processor. For example, the renderer may preferentially render an area viewed by a user based on the feedback information. The decapsulation processor and the data decoder may preferentially decapsulate and decode the area that the user is viewing or the area to be viewed by the user.

The internal/external elements of the 360-degree video reception apparatus according to the present disclosure described above may be hardware elements implemented in hardware. According to an embodiment, the internal/external elements may be changed, omitted, or replaced with other elements. According to an embodiment, supplemental elements may be added to the 360-degree video reception apparatus.

Another aspect of the disclosure may relate to a method of transmitting 360-degree video and a method of receiving 360-degree video. The method of transmitting/receiving a 360-degree video according to the present disclosure may be implemented by the above-described 360-degree video transmission/reception apparatuses according to the present disclosure or the embodiments of the apparatuses.

The embodiments of the 360-degree video transmission/reception apparatuses, the transmission/reception methods, and the internal/external elements thereof according to the present disclosure described above may be combined with each other. For example, the embodiments of the projection processor and the embodiments of the data encoder may be combined with each other to configure as many embodiments of the 360-degree video transmission apparatus as the combinations. The embodiments configured through such combinations are also within the scope of the present disclosure.

As described above, distortion may occur according to the characteristics of a camera and a lens for 360-degree video. In this case, the 360-degree video transmission apparatus and the 360-degree video reception apparatus may correct and process the distortion of the 360-degree video in order to improve image quality, or the like. For example, the 360-degree video transmission apparatus/360-degree video reception apparatus may correct the distortion of the 360-degree video and project the video onto a 2D image. Alternatively, the 360-degree video transmission apparatus/360-degree video reception apparatus may correct the distortion in the stitching process and/or rendering process for the 360-degree video.

To correct the distortion of the 360-degree video, information about the camera and/or lens for the 360-degree video is needed. Since the characteristics may differ among the cameras and/or lenses, correction may be performed in consideration of distortion that takes place according to the characteristics.

Accordingly, the present disclosure proposes a method of defining and signaling camera lens information for camera and lens parameters. According to an embodiment, the camera lens information may be delivered in the form of metadata of a video codec. It may be delivered in an SEI message of a video codec, such as High Efficiency Video Coding (HEVC) or Versatile Video Coding (VVC), or may be delivered in the form of VPS, SPS, or PPS. According to an embodiment, the camera lens information may be delivered through a digital wired/wireless interface, a system level file format, or the like.

For example, the camera lens information may be represented in an SEI message as shown in the table below.

TABLE 1

| | Descriptor |
|---|---|
| sei payload( payloadType, payloadSize ) { <br>   if( nal unit type = = PREFIX SEI NUT ) <br>     if( payloadType = = 0 ) <br>       buffering period( payloadSize ) <br>   ... <br>   else if( payloadType = = 182 ) <br>     camera lens information( payloadSize ) <br>   else if( payloadType = = 183 ) | |

TABLE 1-continued

| | Descriptor |
|---|---|
| supplemental camera lens information( payloadSize ) | |
| ... | |
|     else | |
|         reserved sei message( payloadSize ) | |
|   if( more data in payload( ) ) { | |
|     if( payload extension present( ) ) | |
|         reserved payload extension data | u(v) |
|     payload bit equal to one /* equal to 1 */ | f(1) |
|     while( !byte aligned( ) ) | |
|         payload bit equal to zero /* equal to 0 */ | f(1) |
|   } | |
| } | |

Referring to Table 1, the SEI message may include camera_lens_information corresponding to the camera lens information and/or supplemental_camera_lens_information corresponding to supplemental camera lens information. Camera_lens_information may be represented as a camera lens information SEI message, and supplemental_camera_lens_information may be represented as a supplemental camera lens information SEI message. The camera lens information may be represented as viewpoint, head position and/or eye view track information, and the supplemental camera lens information may be represented as supplemental viewpoint, head position and/or eye view track information.

Presence of the camera lens information SEI message in CLVS indicates that a coded video picture in CLVS includes multiple sub-pictures captured by a fisheye lens, multiple cameras, or a camera structure or camera array having multiple lenses including a combination of camera structures or camera arrays.

The 360-degree video reception apparatus may use the information contained in the camera lens information SEI message to more appropriately render the omnidirectional camera output for applications such as 3DoF, 3DoF+, 6DoF or panoramic images. The camera and lens information SEI message may be applied to the current CLVS including the SEI message. When the camera and lens information SEI message is included in the CVLS, the camera lens information SEI message should be present in the first access unit of the CLVS. It may be present in another access unit of the CLVS.

Camera_lens_information may be derived as shown in the table below.

TABLE 2

| | Descriptor |
|---|---|
| camera lens information ( payloadSize ) { | |
|   camera_lens_info_id | u(15) |
|   camera_lens_info_cancel_flag | u(1) |
|   if( !camera lens info cancel flag ) { | |
|     camera_lens_info_persistence_flag | u(1) |
|     supplemental_info_present_flag | u(1) |
|     view_dimension_idc_flag | u(1) |
|     if( view dimension idc flag ) | |
|       view_dimension_idc | u(3) |
|     num_camera_id_minus1 | u(8) |
|     for(i = 0 ; i <= num camera id minus1; i-- ) { | |
|       camera_id[ i ] | u(8) |
|       camera_id_type[ i ] | u(4) |
|       if( camera id type[ i ] = = 1 ) { | |
|         camera_location_per_viewpoint_x[ i ] | i(32) |
|         camera_location_per_viewpoint_y[ i ] | i(32) |
|         camera_location_per_viewpoint_z[ i ] | i(32) |
|         camera_rotation_per_viewpoint_yaw[ i ] | i(32) |
|         camera_rotation_per_viewpoint_pitch[ i ] | i(32) |
|         camera_rotation_per_viewpoint_roll[ i ] | i(32) |
|       } | |
|       else if( camera id type[ i ] = = 2 ) { | |
|         camera_location_per_head_position_x[ i ] | i(32) |
|         camera_location_per_head_position_y[ i ] | i(32) |
|         camera_location_per_head_position_z[ i ] | i(32) |
|         camera_rotation_per_head_position_yaw[ i ] | i(32) |
|         camera_rotation_per_head_position_pitch[ i ] | i(32) |
|         camera_rotation_per_head_position_roll[ i ] | i(32) |
|       } | |
|       else if( camera id type[ i ] = = 3) ( | |
|         left_eye_view_flag[ i ] | u(1) |
|         camera_location_per_eye_x[ i ] | i(32) |
|         camera_location_per_eye_y[ i ] | i(32) |
|         camera_location_per_eye_z[ i ] | i(32) |
|         camera_rotation_per_eye_yaw[ i ] | i(32) |
|         camera_rotation_per_eye_pitch[ i ] | i(32) |
|         camera_rotation_per_eye_roll[ i ] | i(32) |
|       } | |

TABLE 2-continued

| | Descriptor |
|---|---|
| num_subpicture_minus1 | u(8) |
| for( i = 0 ; i <= num subpicture minus 1; i-- ) { | |
|     scene_radius_flag[ i ] | u(1) |
|     local_sphere_center_offset_flag[ i ] | u(1) |
|     local_sphere_rotation_flag[ i ] | u(1) |
|     lens_distortion_correction_flag[ i ] | u(1) |
|     num_camera_idx_minus1 | u(4) |
|     for( j = 0 ; j <= num camera idx minus1; j++ ) { | |
|         camera_idx[ i ][ j ] | u(4) |
|     circular_region_center_x[ i ] | u(32) |
|     circular_region_center_y[ i ] | u(32) |
|     rect_region_top[ i ] | u(32) |
|     rect_region_left[ i ] | u(32) |
|     rect_region_width[ i ] | u(32) |
|     rect_region_height[ i ] | u(32) |
|     full_radius[ i ] | u(32) |
|     if( scene radius flag[ i ] ) | |
|         scene_radius[ i ] | u(32) |
|     if( local sphere rotation flag[ i ] ) { | |
|         local_sphere_rotation_azimuth[ i ] | i(32) |
|         local_sphere_rotation_elevation[ i ] | i(32) |
|         local_sphere_rotation_tilt[ i ] | i(32) |
|     } | |
|     if( local_sphere_center_offset_flag[ i ] ) { | |
|         local_sphere_center_offset_x[ i ] | u(32) |
|         local_sphere_center_offset_y[ i ] | u(32) |
|         local_sphere_center_offset_z[ i ] | u(32) |
|     } | |
|     field_of_view[ i ] | u(32) |
|     lens_projection_type[ i ] | u(8) |
|     if( lens_projection_type[ i ] >= 1 && lens_projection_type[ i ] <= 5 ) | |
|         scaling_factor[ i ] | u(16) |
|     else if( lens_projection_type[ i ] == 255 ) { | |
|         num_angle_projection_minus1[ i ] | u(16) |
|         for( j = 0 ; j = num_angle_projection_minus1[ i ]; j++ ) { | |
|             angle_projection[ i ][ j ] | u(16) |
|             num_polynomial_coeff_projection_minus1[ i ][ j ] | u(16) |
|             for( k = 0; k <= num polynomial coeff projection minus1[ i ][ j ]; k++ ) | |
|                 polynomial_coeff_projection[ i ][ j ][ k ] | u(32) |
|         } | |
|     } | |
|     if( lens_distortion_correction_flag[ i ] ) { | |
|         num_angle_correction_minus1[ i ] | u(16) |
|         for( j = 0 ; j < = num_angle_correction_minus1[ i ]; j-+ ) { | |
|             angle_correction[ i ][ j ] | u(16) |
|             num_polynomial_coeff_correction_minus1[ i ][ j ] | u(16) |
|             for( k = 0; k <= num polynomial coeff correction minus1[ i ][ j ]; k++ ) | |
|                 polynomial_coeff_correction[ i ][ j ][ k ] | u(32) |
|         } | |
|     } | |
|     redial_distortion_type[ i ] | u(8) |
|     } | |
| } | |
| } | |

Referring to Table 2, camera_lens_information may include a camera_lens_info_id field, and/or a camera_lens_info_cancel_flag field.

The camera_lens_info_id field may indicate an identifier for identifying the purpose of camera lens information. For example, the value of the camera_lens_info_id field may indicate a use case of the camera lens information of the SEI message. Alternatively, the value of the camera_lens_info_id field may be used to support receiver performance. Alternatively, the value of the camera_lens_info_id field may indicate a sub-picture that may be composed of a single image. For example, the single image may be a sphere image or a panoramic image.

As an example, when one or more pieces of camera lens information contain the camera_lens_info_id field having the same value, the fields included in the multiple pieces of camera lens information may be the same. There may be multiple pieces of camera lens information containing the camera_lens_info_id fields having different values. In this case, the camera_lens_info_id fields may indicate that the multiple pieces of camera lens information are for different purposes, or that cascading of correction or projection is sequentially applied based on the camera lens information. Here, the order may be specified according to the application program. The value of the camera_lens_info_id field may be in the range of 0 to $2^{15}-1$.

The camera_lens_info_cancel_flag field may indicate whether persistence of the previous camera lens information before the camera lens information is canceled according to an output order applied to the current layer. For example, when the value of the camera_lens_info_cancel_flag field is 1, the camera_lens_info_cancel_flag field may indicate that persistence of the previous camera lens information before the camera lens information is canceled. When the value of the camera_lens_info_cancel_flag field is 0, the camera_l- ens_info_cancel_flag field may indicate that persistence of the previous camera lens information before the camera lens information is not canceled.

Referring to Table 2, camera_lens_information may include a camera_lens_info_persistence_flag field, a supplemental_info_present_flag field, a view_dimension_idc_flag field, and/or a num_camera_id_minus1 field.

The camera_lens_info_persistence_flag field may indicate persistence of the camera lens information SEI message for the current layer. For example, when the value of the camera_lens_info_persistence_flag field is 0, the camera lens information may be applied only to the current decoded picture. When the value of the camera_lens_info_persistence_flag field is 1, the camera lens information may be maintained until any one of the conditions described below is satisfied according to the output order in the current layer. That is, the camera lens information may be applied until any one of the conditions described below is satisfied according to the output order in the current layer.

The conditions are as follows:
a new CLVS of the current layer starts;
the bitstream ends; and
the picture picB of the current layer of an access unit including camera lens information applicable to the current layer is output, and PicOrderCnt (picB) is greater than PicOrderCnt (picA).

Here, picA may represent the current picture, and PicOrderCnt (picB) may indicate the PicOrderCntVal value of the picB immediately after an invocation of the decoding process for the picture order count of picB. PicOrderCnt (picA) may indicate the value of PicOrderCntVal of picA immediately after an invocation of the decoding process for the picture order count of picB.

The supplemental_info_present_flag field may indicate whether supplemental information for the camera lens information is present outside the SEI message containing the camera lens information. For example, when the value of the supplemental_info_present_flag field is 1, the supplemental_info_present_flag field may indicate that the supplemental information for the camera lens information is included in camera lens information or supplemental information for a camera_lens_info_id field having a different value from the camera_lens_info_id field of the camera lens information. When the value of the supplemental_info_present_flag field is 0, the supplemental_info_present_flag field may indicate that there is no supplemental information for the camera lens information.

The view_dimension_idc_flag field may indicate whether a view_dimension_idc field is present in the camera lens information. For example, when the value of the view_dimension_idc_flag field is 1, the view_dimension_idc_flag field may indicate that a view_dimension_idc field is present in the camera lens information. When the value of the view_dimension_idc_flag field is 1, the view_dimension_idc_flag field may indicate that the view_dimension_idc field is absent from the camera lens information.

The view_dimension_idc field may indicate the alignment and viewing direction of fisheye lenses. For example, when the value of the view_dimension_idc field is 0, the view_dimension_idc field may indicate that the value of a num_circular_images field is 2, that the values of a camera_center_elevation field, a camera_center_tilt field, a camera_center_offset_x field, a camera_center_offset_y field, and a camera_center_offset_z field have values causing circular images to have aligned optical axes and face in opposite directions, and that the sum of the values of a field_of_view field is greater than or equal to $360*2^{16}$. Here, the num_circular_images field may indicate the number of circular images.

For example, when the value of the view_dimension_idc field is 1, the view_dimension_idc field may indicate that the value of the num_circular_images field is 2, and that the values of the camera_center_eltation field, the camera_center_tilt field, the camera_center_offset_x field, the camera_center_offset_y field, and the camera_center_offset_z field have values causing the circular images to have parallel optical axes orthogonal to a line intersecting the camera center points, and that the i-th camera is a left view when i is 0. That is, when the value of the view_dimension_idc field is 1, the 0-th camera may represent a camera for the left view.

For example, when the value of the view_dimension_idc field is 2, the view_dimension_idc field may indicate that the value of the num_circular_images field is 2, that the camera_center_eltation field, the camera_center_tilt field, the camera_center_offset_x field, the camera_center_offset_y field, and the camera_center_offset_z field have values causing the circular images to have parallel optical axes orthogonal to a line intersecting the camera center points, and that the i-th camera is a right view when i is 0. That is, when the value of the view_dimension_idc field is 2, the 0-th camera may represent a camera for the right view.

For example, when the value of the view_dimension_idc field is 7, the view_dimension_idc field may indicate that additional constraints on the syntax elements in the omnidirectional fisheye video SEI message are not implied.

For the view_dimension_idc field, the values from 3 to 6 are reserved for future use.

A value obtained by adding 1 to the value of the num_circular_images_minus1 field may indicate the number of camera identifiers (ids).

Referring to Table 2, camera_lens_information may include a camera_id[i] field, a camera_id_type[i] field, a camera_location_per_viewpoint_x[i] field, a camera_location_per_viewpoint_y[i] field, a camera_location_per_viewpoint_z[i] field, a camera_rotation_per_viewpoint_yaw[i] field, a camera_rotation_per_viewpoint_pitch[i] field, a camera_rotation_per_viewpoint_roll[i] field, a camera_location_per_head_position_x[i] field, a camera_location_per_head_position_y[i] field, a camera_location_per_head_position_z[i] field, a camera_rotation_per_head_position_yaw[i] field, a camera_rotation_per_head_position_pitch[i] field, a camera_rotation_per_head_position_roll[i] field, a left_eye_view_flag[i] field, a camera_location_per_eye_x[i] field, a camera_location_per_eye_y[i] field, a camera_location_per_eye_z[i] field, a camera_rotation_per_eye_yaw[i] field, a camera_rotation_per_eye_pitch[i] field, and/or camera_rotation_per_eye_roll[i] field.

The camera_id[i] field may indicate an identifying number used to identify a camera. That is, the camera_id[i] field may represent the identifier of the i-th camera. The value of the camera_id[i] field may be used to indicate the i-th camera composed of one or more lenses. In addition, the camera_id[i] field may be used to indicate a single image or multiple images for a specific purpose. The single image or multiple images may be an image or images corresponding to the i-th camera. For example, the camera_id[i] field may indicate a sub-picture corresponding to a specific camera location. Alternatively, the camera_id[i] field may indicate a sub-picture pair supporting binocular disparity of a viewpoint/head position. Alternatively, the camera_id[i] field may indicate a wavelength and/or color filter of a sensor corresponding to a specific lens.

The camera_id_type[i] field may indicate the type, use case, or purpose of the camera_id[i] field. That is, the camera_id_type[i] field may indicate the type, use case, or purpose of an image for the i-th camera indicated by the camera_id[i] field.

For example, when the value of the camera_id_type[i] field is 0, the camera_id_type[i] field may indicate that the type for a sub-picture corresponding to the camera_id[i] field (i.e., a sub-picture indicated by the camera_id[i] field) is not specified.

When the value of the camera_id_type[i] field is 1, the camera_id_type[i] field may indicate that the sub-picture corresponding to the camera_id[i] field should configure spheres of a viewpoint. In other words, when the value of the camera_id_type[i] field is 1, the camera_id_type[i] field may indicate that a sub-picture corresponding to the camera_id[i] field is a picture constituting a sphere of a viewpoint (e.g., a picture rendered on the sphere of the viewpoint). Here, the sphere of the viewpoint may represent a 3D space in the viewpoint. In this case, supplemental information such as a camera location and orientation corresponding to a center anchor of a viewing sphere of the viewpoint may be processed to indicate viewpoints different from the aforementioned viewpoint.

When the value of the camera_id_type[i] field is 2, the camera_id_type[i] field may indicate that the sub-picture corresponding to the camera_id[i] field should constitute spheres of the head position. In other words, when the value of the camera_id_type[i] field is 2, the camera_id_type[i] field may indicate that a sub-picture corresponding to the camera_id[i] field is a picture constituting a sphere of a head position (e.g., a picture rendered on the sphere of the head position). Here, the sphere of the head position may represent a 3D space at the head position. In this case, supplemental information such as the camera location and orientation corresponding to the center of the viewing sphere of the head position may be processed to indicate head positions different from the aforementioned head position.

When the value of the camera_id_type[i] field is 3, the camera_id_type[i] field may indicate that a sub-picture corresponding to the camera_id[i] field should constitute a stereoscopic video. In other words, when the value of the camera_id_type[i] field is 3, the camera_id_type[i] field may indicate that a sub-picture corresponding to the camera_id[i] field is a picture constituting a stereoscopic video. In this case, supplemental information such as an eye view, a camera location, and orientation corresponding to the center of the viewing sphere of the eye view may be processed to indicate an eye view different from the aforementioned eye view. The values from 4 to 15 for the camera_id_type[i] field are reserved for future use.

The camera_location_per_viewpoint_x[i] field, the camera_location_per_viewpoint_y[i] field, and the camera_location_per_viewpoint_z[i] field may indicate the position of a viewpoint for the camera_id[i] field in units of $2^{-16}$ millimeters. That is, the camera_location_per_viewpoint_x[i] field, the camera_location_per_viewpoint_y[i] field, and the camera_location_per_viewpoint_z[i] field may indicate the x component, y component, and z component of the viewpoint for the camera_id[i] field in units of $2^{-16}$ millimeters. The position of the viewpoint may correspond to the center position of the viewpoint anchor. For example, the center position of the viewpoint anchor may be a unit sphere center of the center head position. The values of the camera_location_per_viewpoint_x[i] field, the camera_location_per_viewpoint_y[i] field, and the camera_location_per_viewpoint_z[i] field may be in a range of $-32768*2^{16}-1$ (i.e., −2147483647) to $32768*2^{16}$ (i.e., 2147483648).

The camera_rotation_per_viewpoint_yaw[i] field, the camera_rotation_per_viewpoint_pitch[i] field, and the camera_rotation_per_viewpoint_roll[i] field may indicate the yaw, pitch, and roll angles for a viewpoint for the camera_id[i] field in units of $2^{-16}$ degrees. The yaw angle, the pitch angle, and the roll angle may be applied to a unit sphere of the viewpoint anchor for the camera_id[i] field, and coordinates on the unit sphere of the viewpoint anchor may be transformed from local coordinate axes to global coordinate axes. The value of the camera_rotation_per_viewpoint_yaw[i] field may be in the range of $-180*2^{16}$ (i.e., −11796480) to $180*2^{16}-1$ (i.e., 11796479). The value of the camera_rotation_per_viewpoint_pitch[i] field may be in the range of $-90*2^{16}$ (i.e., −5898240) to $90*2^{16}$ (i.e., 5898240). The value of the camera_rotation_per_viewpoint_roll[i] field may be in the range of $-180*2^{16}$ (i.e., −11796480) to $180*2^{16}-1$ (i.e., 11796479). The camera_rotation_per_viewpoint_yaw[i] field, the camera_rotation_per_viewpoint_pitch[i] field, and the camera_rotation_per_viewpoint_roll[i] field may indicate the azimuth, elevation, and tilt angles for the viewpoint for the camera_id[i] field in units of $2^{-16}$ degrees.

The camera_location_per_head_position_x[i] field, the camera_location_per_head_position_y[i] field, and the camera_location_per_head_position_z[i] field may indicate the location of the head position for the camera_id[i] field in units of $2^{-16}$ millimeters. That is, the camera_location_per_head_position_x[i] field, the camera_location_per_head_position_y[i] field, and the camera_location_per_head_position_z[i] field may indicate the x component, y component, and z component of the head position for the camera_id[i] field in units of $2^{-16}$ millimeters. The location of the head position may correspond to the center position of the head position anchor. For example, the center position of the head position anchor may be a unit sphere center of the center head position. The values of the camera_location_per_head_position_x[i] field, the camera_location_per_head_position_y[i] field, and the camera_location_per_head_position_z[i] field may be in the range of $-32768*2^{16}-1$ (i.e., −2147483647) to $32768*2^{16}$ (i.e., 2147483648).

The camera_rotation_per_head_position_yaw[i] field, the camera_rotation_per_head_position_pitch[i] field, and the camera_rotation_per_head_position_roll[i] field may indicate the yaw, pitch and roll angles for the head position for the camera_id[i] field in units of $2^{-16}$ degrees. The yaw angle, the pitch angle, and the roll angle may be applied to a unit sphere of a head position anchor for the camera_id[i] field, and coordinates on the unit sphere of the head position anchor may be transformed from local coordinate axes to global coordinate axes. The value of the camera_location_per_head_position_yaw[i] field may be in the range of $-180*2^{16}$ (i.e., −11796480) to $180*2^{16}-1$ (i.e., 11796479). The value of the camera_location_head_position_pitch[i] field may be in the range of $-90*2^{16}$ (i.e., −5898240) to $90*2^{16}$ (i.e., 5898240). The value of the camera_location_per_head_position_roll[i] field may be in the range of $-180*2^{16}$ (i.e., −11796480) to $180*2^{16}-1$ (i.e., 11796479). The camera_rotation_per_head_position_yaw[i] field, the camera_rotation_per_head_position_pitch[i] field, and the camera_rotation_per_head_position_roll[i] field may indicate the azimuth, elevation, and tilt angles for the viewpoint for the camera_id[i] field in units of $2^{-16}$ degrees.

The left_eye_view_flag[i] field may indicate whether a sub-picture corresponding to the camera_id[i] field is a left eye view or a right eye view. For example, when the value of the left_eye_view_flag[i] field is 1, the left_eye_view_flag[i] field may indicate that the sub-picture corresponding to the camera_id[i] field is a left eye view. When the value of the left_eye_view_flag[i] field is 0, the left_eye_view_flag[i] field may indicate that the sub-picture corresponding to the camera_id[i] field is a right eye view.

The camera_location_per_eye_x[i] field, the camera_location_per_eye_y[i] field, and the camera_location_per_eye_z[i] field may indicate the position of an eye view for the camera_id[i] field in units of $2^{-16}$ millimeters. That is, the camera_location_per_eye_x[i] field, the camera_location_per_eye_y[i] field, and the camera_location_per_eye_z[i] field may indicate the x component, y component, and z component of the eye view for the camera_id[i] field in units of $2^{-16}$ millimeters. The eye view may correspond to a unit sphere of the left eye or right eye. The values of the camera_location_per_eye_x[i] field, the camera_location_per_eye_y[i] field, and the camera_location_per_eye_z[i] field may be in the range of $-32768*2^{16}-1$ (i.e., $-2147483647$) to $32768*2^{16}$ (i.e., $2147483648$).

The camera_rotation_per_eye_yaw[i] field, the camera_rotation_per_eye_pitch[i] field, and the camera_rotation_per_eye_roll[i] field may indicate the yaw, pitch and roll angles for the eye view for the camera_id[i] field in units of $2^{-16}$ degrees. The yaw angle, the pitch angle, and the roll angle may be applied to a unit sphere of the eye view for the camera_id[i] field, and coordinates on the unit sphere of the eye view may be transformed from local coordinate axes to global coordinate axes. The value of the camera_rotation_per_eye_yaw[i] field may be in the range of $-180*2^{16}$ (i.e., $-11796480$) to $180*2^{16}-1$ (i.e., $11796479$). The value of the camera_rotation_eye_pitch[i] field may be in the range of $-90*2^{16}$ (i.e., $-5898240$) to $90*2^{16}$ (i.e., $5898240$). The value of the camera_rotation_per_eye_roll[i] field may be in the range of $-180*2^{16}$ (i.e., $-11796480$) L|[λ| $180*2^{16}-1$ (i.e., $11796479$). The camera_rotation_per_eye_yaw[i] field, the camera_rotation_per_eye_pitch[i] field, and the camera_rotation_per_eye_roll[i] field may indicate the azimuth, elevation, and tilt angles for the viewpoint for the camera_id[i] field in units of $2^{-16}$ degrees.

Referring to Table 2, the camera_lens_information may include a num_subpicture_minus1 field, a scene_radius_flag[i] field, a local_sphere_center_offset_flag[i] field, a local_sphere_rotation_flag[i] field, a lens_distortion_correction_flag[i] field, and/or a num_camera_idx_minus1 field.

A value obtained by adding 1 to the value of the num_subpicture_minus1 field may indicate the number of sub-pictures of a coded picture.

The scene_radius_flag[i] field, the local_sphere_center_offset_flag[i] field, the local_sphere_rotation_flag[i] field, and the lens_distortion_correction_flag[i] field may indicate whether there are fields for each field in the camera lens information.

Specifically, the scene_radius_flag[i] field may indicate whether information about a circular region for the (i+1)-th sub-picture is present in the camera lens information. In other words, the scene_radius_flag[i] field may indicate whether the scene_radius[i] field for the (i+1)-th sub-picture is present in the camera lens information. Here, the (i+1)-th sub-picture may be the (i+1)-th circular region in the coded picture. In addition, the circular region for the (i+1)-th circular region may represent a region where an obstacle such as a camera body is not visible in the (i+1)-th circular region. For example, when the value of the scene_radius_flag[i] field is 1, the scene_radius_flag[i] field may indicate that the scene_radius[i] field for the (i+1)-th circular region is present in the camera lens information. When the value of the scene_radius_flag[i] field is 0, the scene_radius_flag[i] field may indicate that the scene_radius[i] field for the (i+1)-th circular region is absent from the camera lens information. The scene_radius[i] field will be described in detail later.

The local_sphere_center_offset_flag[i] field may indicate whether offset information about a focal center of a camera lens for the i-th circular region is present in the camera lens information. In other words, the local_sphere_center_offset_flag[i] field may indicate whether a local_sphere_center_offset_x[i] field, a local_sphere_center_offset_y[i] field, and a local_sphere_center_offset_z[i] field for the (i+1)-th circular region are present in the camera lens information. For example, when the value of the local_sphere_center_offset_flag[i] field is 1, the local_sphere_center_offset_flag[i] field may indicate that the local_sphere_center_offset_x[i] field, the local_sphere_center_offset_y[i] field, and the local_sphere_center_offset_z[i] field for the (i+1)-th circular region are present in the camera lens information. When the value of the local_sphere_center_offset_flag[i] field is 0, the local_sphere_center_offset_flag[i] field may indicate that the local_sphere_center_offset_x[i] field, the local_sphere_center_offset_y[i] field, and the local_sphere_center_offset_z[i] field for the (i+1)-th circular region are absent from the camera lens information. The local_sphere_center_offset_x[i] field, the local_sphere_center_offset_y[i] field, and the local_sphere_center_offset_z[i] field will be described in detail later.

The local_sphere_rotation_flag[i] field may indicate whether information about spherical coordinates of a sphere region corresponding to a center point of the (i+1)-th circular region of a cropped output picture is present in the camera lens information. In other words, the local_sphere_rotation_flag[i] field may indicate whether the local_sphere_center_azimuth[i] field, the local_sphere_center_elevation[i] field, and the local_sphere_center_tilt[i] field for the (i+1)-th circular region are present in the camera lens information. For example, when the value of the local_sphere_rotation_flag[i] field is 1, the local_sphere_rotation_flag[i] field may indicate that the local_sphere_center_azimuth[i] field, the local_sphere_center_elevation[i] field, and the local_sphere_ center_tilt[i] field for the (i+1)-th circular region are present in the camera lens information. When the value of the local_sphere_rotation_flag[i] field is 0, the local_sphere_rotation_flag[i] field may indicate that the local_sphere_center_azimuth[i] field, the local_sphere_center_elevation[i] field, and the local_sphere_center_tilt[i] field for the (i+1)-th circular region are absent from the camera lens information. The local_sphere_center_azimuth[i] field, the local_sphere_center_elevation[i] field, and the local_sphere_ center_tilt[i] field will be described in detail later.

The lens_distortion_correction_flag[i] field may indicate whether camera lens distortion related information about the (i+1)-th circular region is present in the camera lens information. In other words, the lens_distortion_correction_flag[i] field may indicate whether a num_angle_correction_minus1[i] field, an angle_correction[i][j] field, a num_polynomial_coeff_correction_minus1[i][j] field, and a polynomial_coeff_correction[i][j][k] field for the (i+1)-th circular region are present in the camera lens information. For example, when the value of the lens_distortion_correction_flag[i] field is 1, the lens_distortion_correction_flag[i] field may indicate that the num_angle_correction_minus1[i] field, the angle_correction[i][j] field, the num_polynomial_coeff_correction_minus1[i][j] field, and the polynomial_coeff_correction[i][j][k] field for the (i+1)-th circular region are present in the camera lens information. When the value of the lens_distortion_correction_flag[i] field is 0, the lens_distortion_correction_flag[i] field may indicate that the num_angle_correction_minus1[i] field, the angle_correction [i][j] field, the num_polynomial_coeff_correction_minus1 [i][j] field, and the polynomial_coeff_correction[i][j][k] field for the (i+1)-th circular region are absent from the camera lens information. The num_angle_correction_minus1[i] field, the angle_correction[i][j] field, the num_polynomial_coeff_correction_minus1[i][j] field, and the polynomial_coeff_correction[i][j][k] field will be described in detail later.

A value obtained by adding 1 to the value of the num_camera_idx_minus1 field may indicate the number of camera indicators referring to the i-th sub-picture. Alternatively, the value obtained by adding 1 to the value of the num_camera_idx_minus1 field may indicate the number of camera indicators referring to the (i+1)-th sub-picture. Here, the (i+1)-th sub-picture may be the (i+1)-th circular region.

Referring to Table 2, the camera_lens_information may include a camera_idx[i][j] field, circular_region_center_x[i] field, a circular_region_center_y[i] field, a rect_region_top [i] field, a rect_region_left[i] field, a rect_region_width[i] field, a rect_region_height[i] field, a full_radius[i] field, a scene_radius[i] field, a local_sphere_rotation_azimuth[i] field, a local_sphere_rotation_elevation[i] field, a local_sphere_center_offset_x[i] field, a local_sphere_center_offset_y[i] field, a local_sphere_center_offset_z[i] field, a field_of_view[i] field, a lens_projection_type[i] field, a scaling_factor[i] field, a num_angle_projection_minus1[i] field, a angle_projection[i][j] field, a num_polynomial_coeff_projection_minus1[i][j] field, a polynomial_coeff_projection[i][j][k] field, a num_angle_correction_minus1[i] field, a angle_correction[i][j] field, a num_polynomial_coeff_correction_minus1[i][j] field, a polynomial_coeff_correction[i][j][k] field, and/or a radial_distortion_type[i] field.

The camera_idx[i][j] field may indicate the j-th camera indicator of the i-th sub-picture for camera_id which is present in the camera lens information SEI message. Alternatively, the camera_idx[i][j] field may indicate the (j+1)-th camera indicator of the (i+1)-th sub-picture for camera_id present in the camera lens information SEI message. Here, the (i+1)-th sub-picture may be the (i+1)-th circular region.

The circular_region_center_x[i] field and the circular_region_center_y[i] field may indicate the center point of the (i+1)-th circular region in a picture coded in units of $2^{-16}$ luma samples. That is, the circular_region_center_x[i] field and the circular_region_center_y[i] field may indicate the horizontal coordinate (x component) and the vertical coordinate (y component) of the center point of the (i+1)-th circular region in units of $2^{-16}$ luma samples. The values of the circular_region_center_x[i] field and the circular_region_center_y[i] field may be in the range of 0 to $65536*2^{16}-1$ (i.e., 4294967295).

The rect_region_top[i] field, the rect_region_left[i] field, the rect_region_width[i] field, and the rect_region_height[i] field may indicate the top left corner position (the position of the top left corner), the width and the height of the (i+1)-th rectangular region including the (i+1)-th circular region in units of luma samples. The rect_region_top[i] field, the rect_region_left[i] field, the rect_region_width[i] field, and the rect_region_height[i] field may indicate the horizontal coordinate (x component) and vertical coordinate (y component) of the top left corner position, and the width and height of the (i+1)-th rectangular region in units of luma samples.

The full_radius[i] field may indicate the radius of the (i+1)-th circular region. The radius of the (i+1)-th circular region may be defined as a length from the center point of the (i+1)-th circular region to the outermost sample boundary. The center point may be indicated by the circular_region_center_x[i] field and the circular_region_center_y[i] field in units of $2^{-16}$ luma samples. In addition, the radius of the (i+1)-th circular region may correspond to the maximum field of view of the (i+1)-th lens for the (i+1)-th circular region indicated by the field_of_view[i] field. Alternatively, the radius may correspond to the maximum field of view of the i-th lens for the i-th circular region indicated by the field_of_view[i] field. The value of the full_radius[i] field may be in the range of 0 to $65536*2^{16}-1$ (i.e., 4294967295).

The actual sample region of the (i+1)-th circular region may be defined as a region corresponding to the inner intersection of a rectangular region derived based on the rect_region_top[i] field, the rect_region_left[i] field, the rect_region_width[i] field, and the rect_region_height[i] field and a circular region derived based on the circular_region_center_x[i] field, the circular_region_center_y[i] field, and the full_radius[i] field.

The scene_radius[i] field may indicate the radius of a circular region in the (i+1)-th circular region. Here, the circular region in the (i+1)-th circular region may represent a region where an obstacle such as a camera body is not visible in the (i+1)-th circular region. The radius of the circular region in the (i+1)-th circular region may be indicated by the scene_radius[i] field in units of $2^{-16}$ luma samples. In addition, the value of the scene_radius[i] field may be less than or equal to the value of the full_radius[i] field, and may be in a range of 0 to $65536*2^{16}-1$ (i.e., 4294967295). The circular region may be a region proposed by a content provider so as to be used in the stitching process.

The local_sphere_rotation_azimuth[i] field and the local_sphere_rotation_elevation[i] field may indicate spherical coordinates of a sphere region corresponding to the center point of the (i+1)-th circular region of a cropped output picture. In other words, the local_sphere_rotation_azimuth [i] field may indicate an azimuth angle of the spherical coordinates of the sphere region corresponding to the center point of the (i+1)-th circular region, and the local_sphere_rotation_elevation[i] field may indicate an elevation angle of the spherical coordinates of the sphere region corresponding to the center point of the (i+1)-th circular region. Here, the local_sphere_rotation_azimuth[i] field and the local_sphere_rotation_elevation[i] field may indicate the azimuth angle and the elevation angle of the spherical coordinates of the sphere region corresponding to the center point in units of $2^{-16}$ degrees. The value of the local_sphere_rotation_azimuth[i] field may be in the range of $-180*2^{16}$ (i.e., −11796480) to $180*2^{16}-1$ (i.e., 11796479). In addition, the value of the local_sphere_rotation_elevation [i] field may be in the range of $-90*2^{16}$ (i.e., −5898240) to $90*2^{16}$ (i.e., 5898240).

The local_sphere_rotation_tilt[i] field may indicate a tilt angle of spherical coordinates of a sphere region corresponding to the center point of the (i+1)-th circular region. Here, the local_sphere_rotation_tilt[i] field may indicate the tilt angle of the spherical coordinates of the sphere region corresponding to the center point in units of $2^{-16}$ degrees. The value of the local_sphere_rotation_tilt[i] field may be in the range of $-180*2^{16}$ (i.e., −11796480) to $180*2^{16}-1$ (i.e., 11796479).

The local_sphere_center_offset_x[i] field, the local_sphere_center_offset_y[i] field, and the local_sphere_center_offset_z[i] field may indicate the offset of the focal center of the camera lens for the (i+1)-th circular region. The focal center of the camera lens may be indicated by the offset based on the focal center origin of the entire camera configuration. In other words, the local_sphere_center_offset_x [i] field may indicate the x offset of the focal center of the camera lens for the (i+1)-th circular region, and the local_sphere_center_offset_y[i] field may indicate the y offset of the focal center of the camera lens for the (i+1)-th circular region, and the local_sphere_center_offset_z[i] field may indicate the z offset of the focal center of the camera lens for the (i+1)-th circular region. Here, the local_sphere_center_offset_x[i] field, the local_sphere_center_offset_y[i] field, and the local_sphere_center_offset_z[i] field may indicate the x offset, y offset, and z offset of the focal center of the camera lens in units of $2^{-16}$ millimeters. The values of the local_sphere_center_offset_x[i] field, the local_sphere_center_offset_y[i] field, and the local_sphere_center_offset_z[i] field may be in the range of 0 to $65536*2^{16}-1$ (i.e., 4294967295).

In generating a 360-degree video, the local_sphere_center_offset_x[i] field, the local_sphere_center_offset_y[i] field, and the local_sphere_center_offset_z[i] field may indicate the xyz position of the sphere center of the unit sphere. The (i+1)-th sub-picture (the (i+1)-th circular region) may be mapped based on the sphere center of the unit sphere, and a 360-degree video stitched to the unit sphere may be provided. When the local_sphere_center_offset_x[i] field, the local_sphere_center_offset_y[i] field, and the local_sphere_center_offset_z[i] field are not present, the values of the local_sphere_center_offset_x[i] field, the local_sphere_center_offset_y[i] field, and the local_sphere_center_offset_z[i] field may be derived as 0.

The field_of_view[i] field may indicate a spherical domain coverage of the (i+1)-th circular region of a coded picture. Here, the field_of_view[i] field may indicate the spherical domain coverage in units of $2^{-16}$ degrees. The value of the field_of_view[i] field may be in the range of 0 to $360*2^{16}$.

The lens_projection_type[i] field may indicate the type of lens projection for the (i+1)-th circular region. For example, when the value of the lens_projection_type[i] field is 0, the lens_projection_type[i] field may indicate that the type of the lens projection for the (i+1)-th circular region is not specified. When the value of the lens_projection_type[i] field is 1, the lens_projection_type[i] field may indicate that the type of the lens projection for the (i+1)-th circular region is perspective projection. When the value of the lens_projection_type[i] field is 2, the lens_projection_type[i] field may indicate that the type of the lens projection for the (i+1)-th circular region is stereographic projection. When the value of the lens_projection_type[i] field is 3, the lens_projection_type[i] field may indicate that the type of the lens projection for the (i+1)-th circular region is equidistance projection. When the value of the lens_projection_type[i] field is 4, the lens_projection_type[i] field may indicate that the type of the lens projection for the (i+1)-th circular region is sine-law projection. When the value of the lens_projection_type[i] field is 5, the lens_projection_type[i] field may indicate that the type of the lens projection for the (i+1)-th circular region is equi-solid projection. When the value of the lens_projection_type[i] field is 255, the lens_projection_type[i] field may indicate that the type of the lens projection for the (i+1)-th circular region is angular polynomial projection. The values from 6 to 254 for the lens_projection_type[i] field are reserved for future use.

Figure 12:
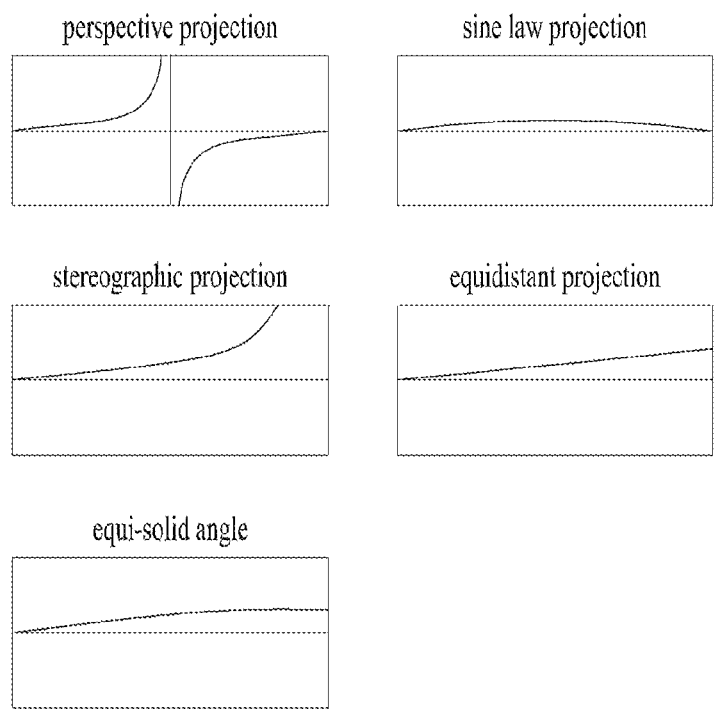
FIG. 12 exemplarily shows radial projection functions.

FIG. 12 exemplarily shows radial projection functions. The radial projection functions may represent the types of lens projection described above.

The scaling_factor[i] field may indicate a scaling factor of the (i+1)-th lens projection type in units of $2^{-8}$. The (i+1)-th lens projection type may indicate a lens projection type for the (i+1)-th circular region. The value of the field_of_view [i] field may be in the range of 0 to $256*2^{-8}-1$.

A value obtained by adding 1 to the value of the num_angle_projection_minus1[i] field may indicate the number of angular values indicating the angular directions of the projection function of the (i+1)-th circular region. When the value of the num_angle_projection_minus1[i] field is 0, the num_angle_projection_minus1[i] field may indicate that the luma samples in a circular region for the sphere coordinate projection function of the (i+1)-th circular region are assumed to be symmetric with respect to all angular values.

The angle_projection[i][j] field may indicate an angular value indicating the direction of the (j+1)-th polynomial function of the (i+1)-th circular region. That is, the angle_projection[i][j] field may indicate the (j+1)-th angular value of the (i+1)-th circular region. Here, the angle_projection[i][j] field may indicate the angular value in units of $2^{-7}$ degrees. The value of the angle_projection[i][j] field may be in the range of 0 to $360*2^7-1$.

A value obtained by adding 1 to the value of the num_polynomial_coeff_projection_minus1[i][j] field may indicate the number of polynomial coefficients of the (j+1)-th lens distortion correction function corresponding to the (j+1)-th angular value in the (i+1)-th circular region. Here, the (j+1)-th lens distortion correction function may represent the (j+1)-th polynomial function. The polynomial function may be represented as angular curve function transformation.

The polynomial_coeff_projection[i][j][k] field indicate the value of the k-th polynomial coefficient of the (j+1)-th angler curve function transformation of the radial distance between a luma sample and the center point in the (i+1)-th circular region. Alternatively, the polynomial_coeff_projection[i][j][k] field may indicate the value of the (k+1)-th polynomial coefficient of the (j+1)-th angler curve function transformation of the radial distance between the luma sample and the center point in the (i+1)-th circular region. The value of the (k+1)-th polynomial coefficient may be a value normalized based on the full_radius[i] field, and may be an angular value between vectors corresponding to the luma sample and the center point. Further, the luma sample and the center point may be represented by spherical coordinates having an origin corresponding to a focal point of the lens in the (i+1)-th circular region. The value of the polynomial_coeff_projection[i][j][k] field may be in the range of $-128*2^{24}$ (i.e., 2147483648) to $128*2^{24}-1$ (i.e., 2147483647).

A value obtained by adding 1 to the value of the num_angle_correction_minus1[i] field may indicate the number of angular values indicating the angular directions of the lens distortion correction function of the (i+1)-th circular region. When the value of the num_angle_correction_minus1[i] field is 0, the num_angle_correction_minus1 [i] field may indicate the luma sample in a circular region for the lens distortion correction function of the (i+1)-th circular region is assumed to be symmetric with respect to all angular values.

The angle_correction[i][j] field may indicate an angular value representing a direction from the center point of the (i+1)-th circular region of the (j+1)-th lens distortion correction function of the (i+1)-th circular region to a boundary.

That is, the angle_correction[i][j] field may indicate the (j+1)-th angular value of the (i+1)-th circular region. Here, the angle_correction[i][j] field may indicate an angular value in units of $2^{-7}$ degrees. The value of the angle_correction [i][j] field may be in the range of 0 to $360*2^7-1$.

A value obtained by adding 1 to the value of the num_polynomial_coeff_correction_minus1[i][j] field may indicate the number of polynomial coefficients of the (j+1)-th lens distortion correction function corresponding to the (j+1)-th angular value in the (i+1)-th circular region.

The polynomial_coeff_correction[i][j][k] field may indicate the value of the k-th polynomial coefficient of the (j+1)-th lens distortion correction function of the (i+1)-th circular region in units of $2^{-24}$ luma samples. Alternatively, the polynomial_coeff_correction[i][j][k] field may indicate the value of the (k+1)-th polynomial coefficient of the (j+1)-th lens distortion correction function of the (i+1)-th circular region in units of $2^{-24}$ luma samples. The value of the polynomial_coeff_correction[i][j][k] field may be in the range of $-128*2^{24}$ (i.e., 2147483648) to $128*2^{24}-1$ (i.e., 2147483647).

The radial_distortion_type[i] field may indicate the type of lens radial distortion for the (i+1)-th circular region. For example, when the value of the radial_distortion_type[i] field is 0, the radial_distortion_type[i] field may indicate that the type of the lens radial distortion for the (i+1)-th circular region is not specified. When the value of the radial_distortion_type[i] field is 1, the radial_distortion_type[i] field may indicate that the type of the lens radial distortion for the (i+1)-th circular region is barrel distortion. When the value of the radial_distortion_type[i] field is 2, the radial_distortion_type[i] field may indicate that the type of the lens radial distortion for the (i+1)-th circular region is pincushion distortion. When the value of the radial_distortion_type[i] field is 3, the radial_distortion_type[i] field may indicate that the type of the lens radial distortion for the (i+1)-th circular region is mustache distortion. Values from 4 to 254 for the radial_distortion_type[i] field are reserved for future use.

FIG. 13 exemplarily shows various types of radial distortion. Different types of radial distortion may occur in a circular image depending on the lens used for capture, and FIG. 10 may show various types of radial distortion. FIG. 13(a) may show barrel distortion, FIG. 13(b) may show pincushion distortion, and FIG. 13(c) may show mustache distortion.

The radial distortion of the circular image may be corrected based on the Brown's distortion model or the Brow-Conrady model. Further, based on the Brow-Conrady model, the radial distortion and the tangential distortion, which is caused by imperfect alignment of physical elements of the lens, may be corrected. The tangential distortion may also be referred to as decentering distortion.

The process of correcting the radial distortion of the circular image may be derived as the following equation.

$$x_u = x_d + (x_d - x_c)(K_1 r^2 + K_2 r^4 + \ldots) + (P_1(r^2 + 2(x_d - x_c)^2) + 2P_2(x_d - x_c)(y_d - y_c))(1 + P_3 r^2 + P_4 r^4 \ldots)$$

$$y_u = y_d + (y_d - y_c)(K_1 r^2 + K_2 r^4 + \ldots) + (2P_1(x_d - x_c)(y_d - y_c) + 2P_2(r^2 + 2(y_d - y_c)^3))(1 + P_3 r^2 + P_4 r^4 \ldots),$$

Equation 1

Through the process of correcting the distortion, a sample of coordinates $(x_d, y_d)$ of the circular image may be shifted to coordinates $(x_u, y_u)$, which is derived based on the equation. Thereby, distortion of the circular image may be eliminated.

Here, r may denote a distance between a distorted image point and a distortion center, and $x_d$ and $y_d$ may denote the x and y components of the distorted image point of a picture onto which a 360-degree video is projected using a designated lens. Here, $x_u$ and $y_u$ may denote the x and y components of an undistorted image point of a picture onto which the 360-degree video is projected using an ideal pinhole camera. In addition, $x_c$ and $y_c$ may denote the x and y components of the distortion center. The distortion center may be assumed to be a principal point. $K_n$ may denote the n-th radial distortion coefficient, and $P_n$ may denote the n-th tangential distortion coefficient. The radial distortion coefficient and the tangential distortion coefficient may be derived based on the type of radial distortion of the circular image.

Here, r may be derived by the following equation.

$$r = \sqrt{(x_d - x_c)^2 + (y_d - y_c)^2}$$

Equation 2

The radial distortion-related information described above may be used to correct distortion of a 2D domain when there is an image not mapped to spherical coordinates.

The process of transforming a sample position of the circular region to sphere coordinates for global coordinate axes will be described later. The transformation process which will be described later may be sequentially applied to circular regions from a circular region having i equal to 0 to a circular region having i equal to the value of the num_subpictures_minus1 field. Alternatively, the transformation process may be sequentially applied to circular regions from a circular region having i equal to 0 to a circular region having i equal to a specific value. The specific value may be the number of circular regions corresponding to a subpicture indicated by the camera_idx[i][j] field.

Inputs of the transformation process may be as follows:

Sample position (x, y) in units of luma samples;

Center point position $(x_c, y_c)$ of the i-th image (or the (i+1)-th circular region) derived based on the circular_region_center_x[i] field and the circular_region_center_y[i] field in units of $2^{-16}$ luma samples, and radius $r_c$ of the i-th circular image (or the (i+1)-th circular region) derived based on the full_radius[i] field;

FOV (Field of View) $\theta_v$ of a lens corresponding to the i-th circular region (or the (i+1)-th circular region) derived based on the field_of_view[i] field in units of $2^{-16}$ degrees;

Rotation parameters $\alpha_c$, $\beta_c$, and $\gamma_c$ derived based on the local_sphere_center_azimuth[i] field, the local_sphere_center_elevation[i] field, and the local_sphere_center_tilt[i] field in units of $2^{-16}$ degrees; and Number of polynomial coefficients n, lens projection type m, scale factor $\sigma$, and polynomial coefficient $p_k(\omega_j)$ of the (i+1)-th circular region in units of $2^{-24}$ degrees for angular direction $\omega_j$.

Outputs of the transformation process may be as follows:

Sphere coordinate position $(\varphi, \theta)$ for global coordinate axes for a sample position (x, y);

The process of transforming the sample position in the (i+1)-th circular region into a position in the sphere coordinate system may be performed as shown in the following table. The transformation process may be represented as a process of mapping the (i+1)-th circular region to sphere coordinates.

TABLE 3

$\theta' = \text{Atan2}( y - y_c * 2^{-16}, x - x_c * 2^{-16} )$
$x_1 = \text{Cos}(\varphi')$
$y_1 = \text{Sin}(\varphi') * \text{Cos}(\theta')$
$z_1 = \text{Sin}(\varphi') * \text{Sin}(\theta')$
$\alpha = ( \alpha_c * 2^{-16} ) * \pi \div 180$
$\beta = ( \beta_c * 2^{-16} ) * \pi \div 180$
$\gamma = ( \gamma_c * 2^{-16} ) * \pi \div 180$
$x_2 = \text{Cos}(\beta) * \text{Cos}(\gamma) * x_1 - \text{Cos}(\beta) * \text{Sin}(\gamma) * y_1 + \text{Sin}(\beta) * z_1$
$y_2 = ( \text{Cos}(\alpha) * \text{Sin}(\gamma) + \text{Sin}(\alpha) * \text{Sin}(\beta) * \text{Cos}(\gamma) ) * x_1 + ( \text{Cos}(\alpha) * \text{Cos}(\gamma) - \text{Sin}(\alpha) * \text{Sin}(\beta) * \text{Sin}(\gamma) ) * y_1 - \text{Sin}(\alpha) * \text{Cos}(\beta) * z_1$ TABLE 3-continued $z_2 = ( \text{Sin}(\alpha) * \text{Sin}(\gamma) - \text{Cos}(\alpha) * \text{Sin}(\beta) * \text{Cos}(\gamma) ) * x_1 + ( \text{Sin}(\alpha) * \text{Cos}(\gamma) + \text{Cos}(\alpha) * \text{Sin}(\beta) * \text{Sin}(\gamma) ) * y_1 + \text{Cos}(\alpha) * \text{Cos}(\beta) * z_1$
$\varphi = \text{Atan2}( y_2, x_2 ) * 180 \div \pi$
$\theta = \text{Asin}( z_2 ) * 180 \div \pi$ Here, the equation for $\varphi'$ may be derived based on the lens_projection_type[i] field as shown in the table below.

TABLE 4 if(m==1)
$\varphi' = \text{Atan}(\text{Sqrt}((x-x_c*2^{-16})^2 + (y-y_c*2^{-16})^2) \div (r_c*2^{-16}) \div \sigma) * (\theta_v*2^{-16}*\pi \div 180) \div 2$
else if(m==2)
$\varphi' = \text{Atan}(\text{Sqrt}((x-x_c*2^{-16})^2 + (y-y_c*2^{-16})^2) \div (r_c*2^{-16}) \div \sigma) * (\theta_v*2^{-16}*\pi \div 180)$
else if(m==3 || m ==255 && n==0)
$\varphi' = (\text{Sqrt}((x-x_c*2^{-16})^2 + (y-y_c*2^{-16})^2) \div (r_c*2^{-16}) \div \sigma) * (\theta_v*2^{-16}*\pi \div 180) \div 2$
else if(m==4)
$\varphi' = \text{Asin}(\text{Sqrt}((x-x_c*2^{-16})^2 + (y-y_c*2^{-16})^2) \div (r_c*2^{-16}) \div \sigma) * (\theta_v*2^{-16}*\pi \div 180) \div 2$
else if(m==5)
$\varphi' = \text{Asin}(\text{Sqrt}((x-x_c*2^{-16})^2 + (y-y_c*2^{-16})^2) \div (r_c*2^{-16}) \div \sigma) * (\theta_v*2^{-16}*\pi \div 180)$
else if(m==255)
if ( $\omega == \theta'$ )
$\varphi' = \Sigma_{j=0}^{n-1}((p_j(\omega_j)*2^{24}) * (\text{Sqrt}((x-x_c*2^{16})^2 + (y-y_c*2^{16})^2) \div (r_c*2^{16})^j )$ Alternatively, $\varphi'$ may be derived from the angular direction $\theta'$ for $\varphi'$ and the nearest angular directions based on an interpolation function F as follows:

$$\varphi'=F(\varphi'(\omega_j),\varphi'(\omega_{j-1})) \quad \text{Equation 3}$$

$\omega_j$ and $\omega_{j+1}$ may denote the nearest angular directions of the angular direction $\theta'$, and $\theta'$ may be greater than $\omega_j$ and less than $\omega_{j+1}$.

Referring to Table 1 above, the SEI message may include supplemental_camera_lens_information corresponding to the supplemental camera lens information.

The supplemental_camera_lens_information may be derived as shown in the table below.

TABLE 5

| | Descriptor |
|---|---|
| supplemental camera lens information ( payloadSize ) { | |
|   num subpictures | u(8) |
|   for(i-0; i< num subpictures; i++ ) { | |
|     num camera idx minus1 | u(4) |
|     for( j - 0 ; j <-num camera idx minus1; j++ ) { | |
|       camera idx[ i ][ j ] | u(4) |
|     image flip[ i ] | u(2) |
|     image scale axis angle[ i ] | u(32) |
|     image scale x[ i ] | u(32) |
|     image scale y[ i ] | u(32) |
|     num angle for displaying fov[ i ] | u(16) |
|     for(j-0; j<num angle for displaying fov[ i ]; j++ ) { | |
|       displayed fov[ i ][ j ] | u(32) |
|       overlapped fov[ i ][ j ] | u(32) |
|     } | |
|     num local fov region[ i ] | u(16) |
|     for(j-0; j<num local fov region[ i ]; j++ ) { | |
|       start radius[ i ][ j ] | u(32) |
|       end radius[ i ][ j ] | u(32) |
|       start angle[ i ][ j ] | i(32) |
|       end angle[ i ][ j ] | i(32) |
|       radius delta[ i ][ j ] | u(32) |
|       angle delta[ i ][ j ] | i(32) |
|       for(k-0; k<= numRadius; k++) | |
|         for(l=0; l<= numAngle; l-+) | |
|           local fov weight[ i ][ j ][ k ][ l ] | u(32) |
|     } | |
|     num polynomial coefficients lsc[ i ] | u(16) |
|     for(j-0; j< num polynomial coefficients lsc[ i ]; j++ ) { | |
|       polynomial coefficient K lsc R[ i ][ j ] | u(32) |

TABLE 5-continued

| | Descriptor |
|---|---|
|         polynomial coefficient K lsc G[ i ][ j ] | u(32) |
|         polynomial coefficient K lsc B[ i ][ j ] | u(32) |
|       } | |
|   } | |
|   num deadzones | u(8) |
|   for(i=0; i< num deadzones; i++ ) { | |
|         deadzone left horizontal offset[ i ] | u(16) |
|         deadzone top vertical offset[ i ] | u(16) |
|         deadzone width[ i ] | u(16) |
|         deadzone height[ i ] | u(16) |
|   } | |
| } | |

Referring to Table 5, the supplemental_camera_lens_information may include a num_circular_images field.

The num_circular_images field may indicate the number of circular images of a coded picture to which the supplemental_camera_lens_information is applied. For example, the value of the num_circular_images field may be 2. Alternatively, the value of the num_circular_images field may be a non-zero value except 2. Here, the num_circular_images field may be referred to as a num_subpictures field, and the circular image may be referred to as a circular region or a sub-picture.

Referring to Table 5, the information may include a num_camera_idx_minus1 field, a camera_idx[i][j] field, an image_flip[i] field, an image_scale_axis_angle[i] field, a image_scale_x[i] field, an image_scale_y[i] field, a num_angle_for_displaying_fov[i] field, a displayed_fov[i][j] field, a overlapped_fov[i][j] field, a num_local_fov_region[i] field, a start_radius[i][j] field, an end_radius[i][j] field, a start_angle[i][j] field, an end_angle[i][j] field, a radius_delta[i][j] field, an angle_delta[i][j] field, a local_fov_weight[i][j][k][l] field, a num_polynomial_coefficients_lsc[i] field, a polynomial_coefficient_K_lsc_R[i][j] field, a polynomial_coefficient_K_lsc_G[i][j] field, a polynomial_coefficient_K_lsc_B[i][j] field, a num_deadzones field, a deadzone_left_horizontal_offset[i] field, a deadzone_top_vertical_offset[i] field, a deadzone_width[i] field, and/or a deadzone_height[i] field.

A value obtained by adding 1 to the value of the num_camera_idx_minus1 field may indicate the number of camera indicators referring to the i-th sub-picture. Alternatively, the value obtained by adding 1 to the value of the num_camera_idx_minus1 field may indicate the number of camera indicators referring to the (i+1)-th sub-picture. Here, the (i+1)-th sub-picture may be the (i+1)-th circular region.

The camera_idx[i][j] field may indicate the j-th camera indicator of the i-th sub-picture for camera_id present in the camera lens information SEI message. Alternatively, the camera_idx[i][j] field may indicate the (j+1)-th camera indicator of the (i+1)-th sub-picture for camera_id present in the camera lens information SEI message. Here, the (i+1)-th sub-picture may be the (i+1)-th circular region.

The image_flip[i] field may indicate whether the (i+1)-th circular region is flipped and how it is flipped. Accordingly, the image_flip[i] field may indicate whether a reverse flipping operation should be applied to the (i+1)-th circular region in the stitching process and/or the rendering process. For example, when the value of the image_flip[i] field is 0, the image_flip[i] field may indicate that the (i+1)-th circular region is not flipped. When the value of the image_flip[i] field is 1, the image_flip[i] field may indicate that the (i+1)-th circular region is flipped vertically. When the value of the image_flip[i] field is 2, the image_flip[i] field may indicate that the (i+1)-th circular region is flipped horizontally. When the value of the image_flip[i] field is 3, the image_flip[i] field may indicate that the (i+1)-th circular region is flipped vertically and horizontally.

The image_scale_axis_angle[i] field, the image_scale_x[i] field, and the image_scale_y[i] field may indicate whether and how the size of the (i+1)-th circular region is scaled along a specific axis. The values of the image_scale_axis_angle[i] field, the image_scale_x[i] field, and the image_scale_y[i] field may be fixed-point 16. The image_scale_axis_angle[i] field, the image_scale_x[i] field, and the image_scale_y[i] field may be used to take into account natural errors in camera-mirror settings. The specific axis may be defined as a single angle indicated by the value of the image_scale_axis_angle[i] field. The unit of the single angle may be a degree. For example, when the single angle is 0, this may indicate that the horizontal vector may be perfectly horizontal, and the vertical vector may be perfectly vertical. The image_scale_x[i] field and the image_scale_y[i] field may indicate scaling. The image_scale_axis_angle[i] field, the image_scale_x[i] field, and the image_scale_y[i] field may be referred to as affine parameters and may satisfy the following equation.

$$\begin{bmatrix} u \\ v \end{bmatrix} = \begin{bmatrix} c & d \\ e & 1 \end{bmatrix} \begin{bmatrix} u_N \\ v_N \end{bmatrix} + \begin{bmatrix} c_x \\ c_y \end{bmatrix} \quad \text{Equation 4}$$

Equation 4 is a mathematical expression representing the relationship between actual sample coordinates (u, v) and ideal sample coordinates ($u_N$, $v_N$), where $c_x$ and $c_y$ denote the values of the image_center_x[i] field and the image_center_y[i] field, respectively. In addition, c, d, and e denote the values of the image_scale_x[i] field, the image_scale_axis_angle[i] field, and the image_scale_y[i] field, respectively.

The num_angle_for_displaying_fov[i] field may indicate the number of angles that define a displayed region and an overlapped region. Based on the value of the num_angle_for_displaying_fov[i] field, values of the displayed_fov[i][j] field and the overlapped_fov[i][j] field may be defined at constant intervals. The values of the displayed_fov[i][j] field, and overlapped_fov[i][j] field may be defined to start at 12 o'clock and increase clockwise.

The displayed_fov[i][j] field may indicate a region recommended to be displayed without blending with adjacent circular regions in the (i+1)-th circular region.

The overlapped_fov[i][j] field may indicate a field of view (FOV) overlapping with adjacent circular regions on a spherical surface of the (i+1)-th circular region. The FOV indicated by the overlapped_fov[i][j] field may specify one of the adjacent circular region and the FOV that is to be displayed, or a region recommended to be displayed by blending with the adjacent circular region.

The num_local_fov_region[i] field may indicate the number of local fitting regions of the (i+1)-th circular region that have different fields of view (FOV).

The start_radius[i][j] field, the end_radius[i][j] field, the start_angle[i][j] field, and the end_angle[i][j] field may indicate the (j+1)-th region for local fitting/warping. The local fitting/warping may indicate changing the actual FOV for displaying locally. The values of the start_radius[i][j] field, and the end_radius[i][j] field may be fixed-point 16. The start_radius[i][j] field may indicate the minimum radius value of the (j+1)-th region, and the end_radius[i][j] field may indicate the maximum radius value of the (j+1)-th region. The start_angle[i][j] field and the end_angle[i][j] field may indicate the minimum and maximum angular values that start at 12 o'clock of the (j+1)-th region and increase clockwise. Here, the start_angle[i][j] field and the end_angle[i][j] field may indicate the angle values in units of $2^{-16}$ degrees. The values of the start_angle[i][j] field and the end_angle[i][j] fields may be in the range of $-180*2^{16}$ to $180*2^{16}-1$.

The radius_delta[i][j] field may indicate a delta radius value representing a different FOV for each radius. The radius_delta[i][j] field may be fixed-point 16.

The angle_delta[i][j] field may indicate a delta angle value for representing a different FOV for each angle. The start_angle[i][j] field and the angle_delta[i][j] field may indicate the delta angle value in units of $2^{-16}$ degrees.

The local_fov_weight[i][j][k][l] field may indicate a weighting value for the FOV of the position specified by the angle index i and the radius index j, that is, the FOV of the position derived based on the start_radius[i][j] field, the end_radius[i][j] field, the start_angle[i][j] field, and the end_angle[i][j] field. The value of the local_fov_weight[i][j][k][l] field may be in an 8.24 fixed point form. A positive value of the local_fov_weight[i][j][k][l] field may indicate expansion of the FOV, while a negative value of the local_fov_weight[i][j][k][l] field may indicate contraction of the FOV.

The num_polynomial_coefficients_lsc[i] field may indicate the number of polynomial coefficients of the lens shading compensation (LSC) parameters of the (i+1)-th circular region.

The polynomial_coefficient_K_lsc_R[i][j] field, the polynomial_coefficient_K_lsc_G[i][j] field, and the polynomial_coefficient_K_lsc_B[i][j] field may indicate LSC parameters for compensation for the shading artifact of a lens (e.g., a fisheye lens) that suppresses the color in the radial direction (shading compensation). The values of the polynomial_coefficient_K_lsc_R[i][j] field, the polynomial_coefficient_K_lsc_G[i][j] field, and the polynomial_coefficient_K_lsc_B[i][j] field may be in the 8.24 fixed point format. The compensating weight by which the original color is to be multiplied may be approximated by a curve function. The curve function representing the compensating weight may be derived using the following equation.

$$w = \sum_{i=1}^{N} p_{i-1} \cdot r^{i-1}$$ Equation 5

Here, r may denote a normalized radius. In other words, r may denote the radius at the center of the (i+1)-th circular region normalized based on the full_radius[i] field.

P may denote an LSC parameter. Here, the polynomial_coefficient_K_lsc_R[i][j] field, the polynomial_coefficient_K_lsc_G[i][j] field, and the polynomial_coefficient_K_lsc_B[i][j] field may indicate an LSC parameter for red, an LSC parameter for green, and an LSC parameter for blue, respectively. In this case, a weighting factor for red, a weighting factor for green, and a weighting factor for blue may be calculated, respectively.

N may be derived as a value of the num_polynomial_coefficients_lsc[i] field. That is, N may indicate the number of polynomial coefficients of the LSC parameter of the (i+1)-th circular region.

Values of the displayed_fov[i][j] field and the overlapped_fov[i][j] field may be less than or equal to the value of the field_of_view[i] field. The value of the field_of_view[i] field may be determined by the physical property of each lens, while the values of the displayed_fov[i][j] field and the overlapped_fov[i][j] field may be determined by the configuration of multiple lenses. For example, when the value of the num_circular_images field is 2 and the two lenses are symmetrically positioned, the values of the displayed_fov[i][j] field and the overlapped_fov[i][j] field may be set to 180 and 190 by default, respectively. However, the values of the displayed_fov[i][j] field and the overlapped_fov[i][j] field may be changed depending on the configuration of the lens and characteristics of the 360-degree video content. For example, if the stitching quality with values of displayed_fov (e.g., 170 for the left camera lens and 190 for the right camera) and values of overlapped_fov (e.g., 185 for the left camera and 190 for the right camera) is better than the quality with the default values of displayed_fov and overlapped_fov (i.e., 180 and 190), or if the physical configuration of cameras is asymmetric, unequal values of the display_fov field and the overlapped_fov field may be derived. In addition, in the case of N (N>2) images (i.e., circular regions), the exact area of each image may not be specified by a single value of the displayed_fov field. That is, the displayed_fov field may vary according to the direction. Accordingly, in order to control N images, the num_angle_for_displaying_fov[i] field described above may be introduced. For example, when the value of the num_angle_for_displaying_fov[i] field is 12, the image may be divided into 12 sectors. The angle of each sector may be 30 degrees.

The num_deadzones field may indicate the number of dead zones in a coded picture. A dead zone may refer to a rectangular area containing unused samples of the coded picture, that is, a rectangular area to which the 360-degree video is not mapped.

The deadzone_left_horizontal_offset[i] field and the deadzone_top_vertical_offset[i] field may indicate the top left position (the position of the top left point) of the corresponding dead zone. The deadzone_width[i] field may indicate the width of the dead zone, and the deadzone_height[i] field may indicate the height of the dead zone. To reduce the bit amount for the 360-degree video, all samples in the dead zone may be set to the same sample value. For example, all samples in the dead zone may be set to a sample value indicating black.

Camera intrinsic parameters, such as the focal length ($f_x$, $f_y$), the principal point ($c_x$, $c_y$), and the skew coefficient skew_c of the camera or lens, and camera extrinsic parameters, such as rotation and translation parameters, may also be defined in the camera lens information SEI message or supplemental camera lens information SEI message described above.

FIG. 14 illustrates an example of capturing a 360-degree video through a camera lens. Referring to FIGS. 14(a) and 14(b), a captured 360-degree video may be derived according to the focal length of the camera or lens. A sample at the coordinates (Xc, Yc, Zc) may be captured at a position (fxXc/Zc, fyYc/Zc) of the image plane, and the position of a standardized sample may be derived as (Xc/Zc, Yc/Zc) obtained by dividing the position of the image plane by the focal length. The standardized image plane may represent an image plane at a position at a focal length of 1 from the focal point of the camera or lens.

FIG. 14(c) may illustrate a sample of a 360-degree video captured obliquely at a specific angle. The specific angle representing the degree of obliqueness may be derived based on the skew coefficient skew_c described above. For example, the skew coefficient may be derived using the following equation.

$$A = \begin{bmatrix} a & skew\_c & u \\ 0 & b & v \\ 0 & 0 & 1 \end{bmatrix}$$ Equation 6

The camera lens information and/or supplemental camera lens information described above may be delivered in the form of a box in an ISOBMFF file as described above. The 360 video data may be stored and transmitted based on the ISOBMFF file, and the camera lens information and/or the supplemental camera lens information may be delivered in the form of a box in the ISOBMFF file.

According to an embodiment, the box for the camera lens information and/or the supplemental camera lens information may be signaled for 360-degree video data stored/delivered through a corresponding video track (stream), sample, sample group, or the like. According to an embodiment, the box for the camera lens information and/or the supplemental camera lens information may be arranged under a visual sample entry of a track in which the corresponding 360-degree video data is stored/transmitted. According to an embodiment, the video information may be delivered through a format such as CFF.

As an example, the box for the camera lens information and/or the supplemental camera lens information may include an SEI NAL unit. In addition, as an example, the box for the camera lens information and/or the supplemental camera lens information may be included in VisualSampleEntry, AVCSampleEntry, MVCSampleEntry, SVCSampleEntry, HEVCSampleEntry, or the like associated with the corresponding 360-degree video information.

According to an embodiment, the box for the camera lens information and/or the supplemental camera lens information may be included in SEI or Video Usability Information (VUI) that provides related information according to a region. Accordingly, different signaling information may be provided for each region for a video frame included in the file format.

According to an embodiment, the box for the camera lens information and/or the supplemental camera lens information may be delivered in timed metadata.

When the content of the camera lens information and/or the supplemental camera lens information delivered in th timed metadata are identically applied to all video samples, the box for the camera lens information and/or the supplemental camera lens information may be included in the sample entry in the header (such as a moov or moof box) of the timed metadata track.

Alternatively, when the content of the camera lens information and/or the supplemental camera lens information delivered through timed metadata needs to be applied differently according to a video sample, the box for the camera lens information and/or the supplemental camera lens information may be included in the timed metadata sample. In this case, fields of the box for the camera lens information and/or the supplemental camera lens information may be applied to a corresponding video sample.

Alternatively, when the content of the camera lens information and/or the supplemental camera lens information delivered through the timed metadata should be applied to the entire video sequence, the box for the camera lens information and/or the supplemental camera lens information may be included in the sample entry of the timed metadata track as described above, but the information (fields) of the box may be applied to the entire video sequence.

The camera lens information and/or the supplemental camera lens information may be delivered according to DASH.

A DASH-based descriptor may include a @schemeIdUri field, a @value field, and/or a @id field. The @schemeIdUri field may provide a URI for identifying the scheme of the descriptor. The @value field may have values whose meaning is defined by the scheme indicated by the @schemeIdUri field. That is, the @value field may have values of descriptor elements, which may be called parameters, according to the scheme. These parameters may be separated from each other by ",". @id may indicate the identifier of the descriptor. When the same identifier is given, the same scheme ID, value, and parameter may be included.

When the camera lens information and/or the supplemental camera lens information are delivered according to DASH, the camera lens information and/or the supplemental camera lens information may be described in the form of a DASH descriptor, and be included in the MPD or the like and delivered to the receiving side. The descriptors for the camera lens information and/or the supplemental camera lens information may be delivered in the form of the above-described essential property descriptor and/or supplemental property descriptor. These descriptors may be delivered in the adaptation set, representation, sub-representation, and the like of the MPD.

The camera lens information and/or the supplemental camera lens information according to all the above-described embodiments may also be described in the form of a DASH-based descriptor. That is, for all the above-described embodiments of the camera lens information and/or the supplemental camera lens information, the information may be described by replacing each signaling field with a parameter of @value.

The above-described embodiments of the camera lens information and/or the supplemental camera lens information according to the present disclosure may be combined with each other. In embodiments of the 360-degree video transmission apparatus and/or the 360-degree video reception apparatus according to the present disclosure, camera lens information and/or supplemental camera lens information may be the camera lens information and/or the supplemental camera lens information according to the above-described embodiments.

Figure 15:
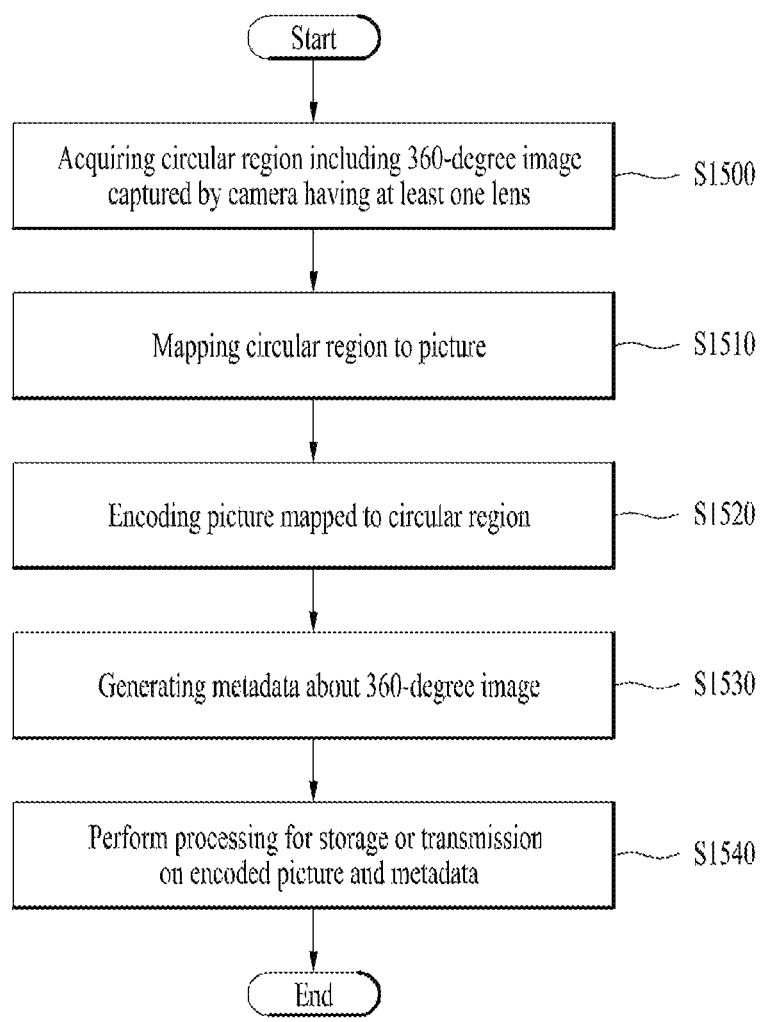
FIG. 15 schematically illustrates a method of processing 360-degree video data by a 360-degree video transmission apparatus according to the present disclosure.

FIG. 15 schematically illustrates a method of processing 360-degree video data by a 360-degree video transmission apparatus according to the present disclosure. The method disclosed in FIG. 15 may be performed by the 360 degree video transmission apparatus disclosed in FIG. 10. Specifically, as an example, S1500 in FIG. 15 may be performed by the data input unit of the 360-degree video transmission apparatus, S1510 may be performed by the projection processor of the 360-degree video transmission apparatus, and S1520 may be performed by the data encoder of the 360-degree video transmission apparatus. S1530 may be performed by the metadata processor of the 360-degree video transmission apparatus, and S1540 may be performed by the transmission processor of the 360-degree video transmission apparatus. The transmission processor may be included in the transmitter.

The 360-degree video transmission apparatus acquires a target circular region including a 360-degree image captured by a camera having at least one lens (S1500). The 360-degree video transmission apparatus may acquire a target circular region including a 360-degree image captured by a camera having at least one lens. For example, the lens may be a fish eye lens. Here, the 360-degree image may be a 360-degree image for 3DoF+ content. The 360-degree image for 3DoF+ content may represent a 360-degree image for multiple viewpoints, multiple head positions, and/or multiple eye views.

The 360-degree video transmission apparatus maps the target circular region to a picture (S1510). The 360-degree video transmission apparatus may map the target circular region to a rectangular area of the picture. The 360-degree video transmission apparatus may acquire multiple circular regions, and the picture may include at least one rectangular area. In this case, the 360-degree video transmission apparatus may map at least one of the multiple circular regions to the rectangular area.

In addition, the 360-degree video transmission apparatus may perform processing such as rotating, rearranging, or changing the resolution of the rectangular area of the picture. The processing may be referred to as region-wise packing or frame packing.

In addition, the 360-degree video transmission apparatus may correct distortion of the target circular region of the picture. Thereby, the 360-degree video transmission apparatus may derive a corrected picture.

The 360-degree video transmission apparatus encodes the picture to which the target circular region is mapped (S1520). The 360-degree video transmission apparatus may encode the picture. In addition, the 360-degree video transmission apparatus may encode metadata for the target circular region.

The 360-degree video transmission apparatus generates metadata for the 360-degree image (S1530).

The metadata may include camera lens information.

The camera lens information may include a camera_lens_info_id field, a camera_lens_info_cancel_flag field, a camera_lens_info_persistence_flag field, a supplemental_info_present_flag field, a view_dimension_idc_flag field, a view_dimension_idc field, a num_camera_id_minus1 field, a camera_id[i] field, a camera_id_type[i] field, a camera_location_per_viewpoint_x[i] field, a camera_location_per_viewpoint_y[i] field, a camera_location_per_viewpoint_z[i] field, a camera_rotation_per_viewpoint_yaw[i] field, a camera_rotation_per_viewpoint_pitch[i] field, a camera_rotation_per_viewpoint_roll[i] field, a camera_location_per_head_position_x[i] field, a camera_location_per_head_position_y[i] field, a camera_location_per_head_position_z[i] field, a camera_rotation_per_head_position_yaw[i] field, a camera_rotation_per_head_position_pitch[i] field, a camera_rotation_per_head_position_roll[i] field, a left_eye_view_flag[i] field, a camera_location_per_eye_x[i] field, a camera_location_per_eye_y[i] field, a camera_location_per_eye_z[i] field, a camera_rotation_per_eye_yaw[i] field, a camera_rotation_per_eye_pitch[i] field, a camera_rotation_per_eye_roll[i] field, a num_subpicture_minus1 field, a scene_radius_flag[i] field, a local_sphere_center_offset_flag[i] field, a local_sphere_rotation_flag[i] field, a lens_distortion_correction_flag[i] field, a num_camera_idx_minus1 field, a camera_idx[i][j] field, a circular_region_center_x[i] field, a circular_region_center_y[i] field, a rect_region_top[i] field, a rect_region_left[i] field, a rect_region_width[i] field, a rect_region_height[i] field, a full_radius[i] field, a scene_radius[i] field, a local_sphere_rotation_azimuth[i] field, a local_sphere_rotation_elevation[i] field, a local_sphere_center_offset_x[i] field, a local_sphere_center_offset_y[i] field, a local_sphere_center_offset_z[i] field, a field_of_view[i] field, a lens_projection_type[i] field, a scaling_factor[i] field, a num_angle_projection_minus1[i] field, a angle_projection[i][j] field, a num_polynomial_coeff_projection_minus1[i][j] field, a polynomial_coeff_projection[i][j][k] field, a num_angle_correction_minus1[i] field, a angle_correction[i][j] field, a num_polynomial_coeff_correction_minus1[i][j] field, a polynomial_coeff_correction[i][j][k] field, and/or a redial_distortion_type[i] field, as described above.

The fields have meanings as described above.

Specifically, as an example, the camera lens information may include information indicating a camera type for the target circular region. The camera type may be one of viewpoint, head position, and eye view.

For example, when the value of the information indicating the camera type is 1, the camera type for the target circular region may be derived as the viewpoint. When the value of the information indicating the camera type is 2, the camera type for the target circular region may be derived as the head position. When the value of the information indicating the camera type is 3, the camera type for the target circular region may be derived as the eye view.

The target circular region may be an image for a camera type indicated by the information indicating the camera type. The camera lens information may include camera type related information about the target circular region. The information indicating the camera type may represent the camera_id_type[i] field.

For example, the camera lens information may include information indicating the x component, y component, and z component of the target viewpoint for the target circular region. That is, the camera lens information may include information indicating the position of the target viewpoint for the target circular region. The information indicating the x component, y component, and z component of the target viewpoint for the target circular region may represent the camera_location_per_viewpoint_x[i] field, the camera_location_per_viewpoint_y[i] field, and the camera_location_per_viewpoint_z[i] field. The camera lens information may include information indicating a yaw angle, a pitch angle, and a roll angle of the target viewpoint for the target circular region. That is, the camera lens information may include information indicating rotation angles of the target viewpoint for the target circular region. The information indicating the yaw angle, pitch angle, and roll angle of the target viewpoint for the target circular region may represent the camera_rotation_per_viewpoint_yaw[i] field, the camera_rotation_per_viewpoint_pitch[i] field, the camera_rotation_per_viewpoint_roll[i] field. In this case, for example, the value of the information indicating the camera type may be 1. That is, the camera type for the target circular region indicated by the information indicating the camera type may be the viewpoint.

Alternatively, the camera lens information may include, for example, information indicating the x component, y component, and z component of a target head position for the target circular region. That is, the camera lens information may include information indicating the target head position for the target circular region. The information indicating the x component, y component, and z component of the target head position for the target circular region may represent the camera_location_per_head_position_x[i] field, the camera_location_per_head_position_y[i] field, and the camera_location_per_head_position_z[i] field. The camera lens information may include information indicating a yaw angle, a pitch angle, and a roll angle of the target head position for the target circular region. That is, the camera lens information may include information indicating the rotation angles of the target head position for the target circular region. The information indicating the yaw angle, pitch angle, and roll angle of the target head position for the target circular region may represent the camera_rotation_per_head_position_yaw[i] field, the camera_rotation_per_head_position_pitch[i] field, the camera_rotation_per_head_ position_roll[i] field. In this case, for example, the value of information indicating the camera type may be 2. That is, the camera type for the target circular region indicated by the information indicating the camera type may be the head position.

Alternatively, the camera lens information may include, for example, information indicating the x component, y component, and z component of a target eye view for the target circular region. That is, the camera lens information may include information indicating the position of the target eye view for the target circular region. The information indicating the x component, y component, and z component of the target eye view for the target circular region may represent the camera_location_per_eye_x[i] field, the camera_location_per_eye_y[i] field, and the camera_location_per_eye_z[i] field. The camera lens information may include information indicating a yaw angle, a pitch angle, and a roll angle of the target eye view for the target circular region. That is, the camera lens information may include information indicating the rotation angles of the target eye view for the target circular region. The information indicating the yaw angle, pitch angle, and roll angle of the target eye view for the target circular region may represent the camera_rotation_per_eye_yaw[i] field, the camera_rotation_per_eye_pitch[i] field, the camera_rotation_per_eye_roll[i] field. The camera lens information may include a flag indicating whether the target eye view for the target circular region is a left eye view. When the value of the flag is 1, the target eye view may be the left eye view. When the value of the flag is 0, the target eye view may be a right eye view. The flag may represent the left_eye_view_flag[i] field. In this case, for example, the value of the information indicating the camera type may be 3. That is, the camera type for the target circular region indicated by the information indicating the camera type may be the eye view.

As another example, the camera lens information may include information indicating a lens projection type of the target circular region. The lens projection type may be one of perspective projection, stereographic projection, equidistance projection, sine-law projection, equisolid projection, and angular polynomial projection.

For example, when the value of the information indicating the lens projection type is 1, the lens projection type of the target circular region may be derived as the perspective projection. When the value of the information indicating the lens projection type is 2, the lens projection type of the target circular region may be derived as the stereographic projection. When the value of information indicating the lens projection type is 3, the lens projection type of the target circular region may be derived as the equidistance projection. When the value of the information indicating the lens projection type is 4, the lens projection type of the target circular region may be derived as the sine-law projection. When the value of the information indicating the lens projection type is 5, the lens projection type of the target circular region may be derived as the equisolid projection. When the value of the information indicating the lens projection type is 255, the lens projection type of the target circular region may be derived as the angular polynomial projection. When the value of the information indicating the lens projection type is 0, the lens projection type of the target circular region may not be specified. The information indicating the lens projection type may represent the lens_projection_type[i] field.

As an example, when the lens projection type of the target circular region is the perspective projection, the stereographic projection, the equidistance projection, the sine-law projection, or the equisolid projection, the camera lens information may include information indicating a scaling factor for the target circular region. That is, when the value of the information indicating the lens projection type is greater than or equal to 1 and less than or equal to 5, the camera lens information may include information indicating a scaling factor for the target circular region. The information indicating the scaling factor for the target circular region may represent the scaling_factor[i] field.

As another example, the camera lens information may include projection function related information. The projection function related information may include information indicating the number of projection functions for the target circular region. The information indicating the number of projection functions may represent the num_angle_projection_minus1[i][j] field.

The projection function related information may include information indicating an angle at which a projection function for the target circular region is applied. The information indicating the angle at which the projection function is applied may represent the angle_projection[i][j] field.

The projection function related information may include information indicating the number of coefficients of the projection function for the target circular region. The information indicating the number of coefficients of the projection function may represent the num_polynomial_coeff_projection_minus1[i][j] field.

The projection function related information may include information indicating the coefficients of the projection function for the target circular region. The information indicating the coefficients of the projection function may represent the polynomial_coeff_projection[i][j][k] field.

As another example, the camera lens information may include a flag indicating whether information related to a distortion correction function for correcting distortion of the target circular region is present. For example, when the value of the flag is 1, the camera lens information may include the distortion correction function related information. When the value of the flag is 0, the camera lens information may not include the distortion correction function related information. The flag may represent the lens_distortion_correction_flag[i] field.

The distortion correction function related information may include information indicating the number of distortion correction functions for the target circular region. The information indicating the number of distortion correction functions may represent the num_angle_correction_minus1 [i][j] field.

The distortion correction function related information may include information indicating an angle at which a distortion correction function for the target circular region is applied. The information indicating the angle at which the distortion correction function is applied may represent the angle_correction[i][j] field.

The distortion correction function related information may include information indicating the number of coefficients of the distortion correction function for the target circular region. The information indicating the number of coefficients of the distortion correction function may represent the num_polynomial_coeff_correction_minus1[i][j] field.

The distortion correction function related information may include information indicating the coefficients of the distortion correction function for the target circular region. The information indicating the coefficients of the distortion correction function may represent the polynomial_coeff_correction[i][j][k] field.

A polynomial function for correcting distortion of the target circular region may be derived based on the projection function related information and/or the distortion correction function related information, and distortion of the target circular region may be corrected based on the polynomial function.

As another example, the camera lens information may include information indicating a radial distortion type of the target circular region. The radial distortion type may be one of barrel distortion, pincushion distortion, and mustache distortion.

For example, when the value of the information indicating the radial distortion type is 1, the radial distortion type of the target circular region may be derived as the barrel distortion. When the value of the information indicating the radial distortion type is 2, the radial distortion type of the target circular region may be derived as the pincushion distortion. When the value of the information indicating the radial distortion type is 3, the radial distortion type of the target circular region may be derived as the mustache distortion.

The radial distortion of the target circular region may be corrected based on Equation 1 described above. In this case, the radial distortion coefficient and the tangential distortion coefficient of Equation 1 may be derived based on the radial distortion type of the target circular region.

Further, the metadata may include supplemental camera lens information.

The supplemental camera lens information may include a num_subpictures field, a num_camera_idx_minus1 field, a camera_idx[i][j] field, an image_flip[i] field, a image_scale_axis_angle[i] field, an image_scale_x[i] field, an image_scale_y[i] field, a num_angle_for_displaying_fov[i] field, a displayed_fov[i][j] field, an overlapped_fov[i][j] field, a num_local_fov_region[i] field, a start_radius[i][j] field, a end_radius[i][j] field, a start_angle[i][j] field, an end_angle [i][j] field, a radius_delta[i][j] field, an angle_delta[i][j] field, a local_fov_weight[i][j][k][l] field, a num_polynomial_coefficients_lsc[i] field, a polynomial_coefficient_K_lsc_R[i][j] field, a polynomial_coefficient_K_lsc_G[i][j] field, a polynomial_coefficient_K_lsc_B[i][j] field, a num_deadzones field, a deadzone_left_horizontal_offset[i] field, a deadzone_top_vertical_offset[i] field, a deadzone_width[i] field, and/or a deadzone_height[i] field, as described above.

The fields have meanings as described above.

The metadata may be transmitted through an SEI message. In addition, the metadata may be included in AdaptationSet, Representation, or SubRepresentation of the media presentation description (MPD). For example, the fisheye video information may be transmitted in the form of the Dynamic Adaptive Streaming over HTTP (DASH) descriptor included in the MPD. Here, the SEI message may be used to assist in decoding a 2D image or displaying the 2D image in a 3D space.

The 360-degree video transmission apparatus performs processing on the encoded picture and the metadata so as to be stored or transmitted (S1540). The 360-degree video transmission apparatus may encapsulate the encoded 360-degree video data and/or the metadata in the form of a file or the like. The 360-degree video transmission apparatus may encapsulate the encoded 360-degree video data and/or the metadata in a file format such as ISOBMFF, CFF or other DASH segments. The 360-degree video transmission apparatus may include the metadata in the file format. For example, the metadata may be included in various levels of boxes in the ISOBMFF file format, or may be included as data in separate tracks in the file. The 360-degree video transmission apparatus may encapsulate the metadata as a file. The 360-degree video transmission apparatus may perform processing for transmission on the 360-degree video data encapsulated according to the file format. The 360-degree video transmission apparatus may process the 360-degree video data according to any transport protocol. The processing for transmission may include processing for delivery over a broadcasting network, or processing for transmission over a communication network such as broadband. In addition, the 360-degree video transmission apparatus may perform processing for transmission on the metadata. The 360-degree video transmission apparatus may transmit the processed 360-degree video data and metadata over a broadcasting network and/or broadband.

According to the present disclosure, a circular region for a target viewpoint, a target head position, and/or a target eye view may be derived from 360-degree image data for 3DoF+ content based on camera lens information and rendered. Thereby, an interactive experience may be provided for the user in consuming 3DoF+ content.

Further, according to the present disclosure, a polynomial function may be derived by reflecting characteristics of a lens based on the projection function related information and/or the distortion correction function related information included in the camera lens information. In addition, based on the polynomial function, a method of more accurately mapping the 360-degree image data onto a 3D space by correcting distortion occurring in a picture onto which a 360-degree image is projected may be provided.

Figure 16:
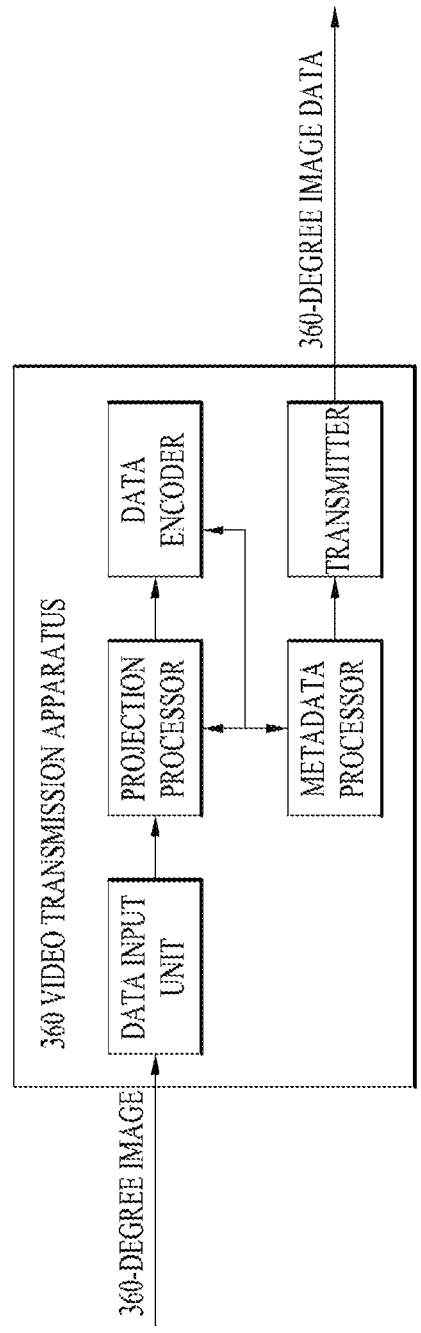
FIG. 16 schematically illustrates a 360-degree video transmission apparatus configured to carry out the 360-degree image data processing method according to the present disclosure.

FIG. 16 schematically illustrates a 360-degree video transmission apparatus configured to carry out the 360-degree image data processing method according to the present disclosure. The method disclosed in FIG. 15 may be performed by the 360 degree video transmission apparatus disclosed in FIG. 16. Specifically, for example, the data input unit of the 360-degree video transmission apparatus of FIG. 16 may perform S1500 of FIG. 15, and the projection processor of the 360-degree video transmission apparatus of FIG. 16 may perform S1510 of FIG. 15. The data encoder of the 360-degree video transmission apparatus of FIG. 16 may perform S1520 of FIG. 15, and the metadata processor of the 360-degree video transmission apparatus of FIG. 16 may perform S1530 of FIG. 15. The transmission processor of the 360-degree video transmission apparatus of FIG. 16 may perform S1540 of FIG. 15. The transmission processor may be included in the transmitter.

Figure 17:
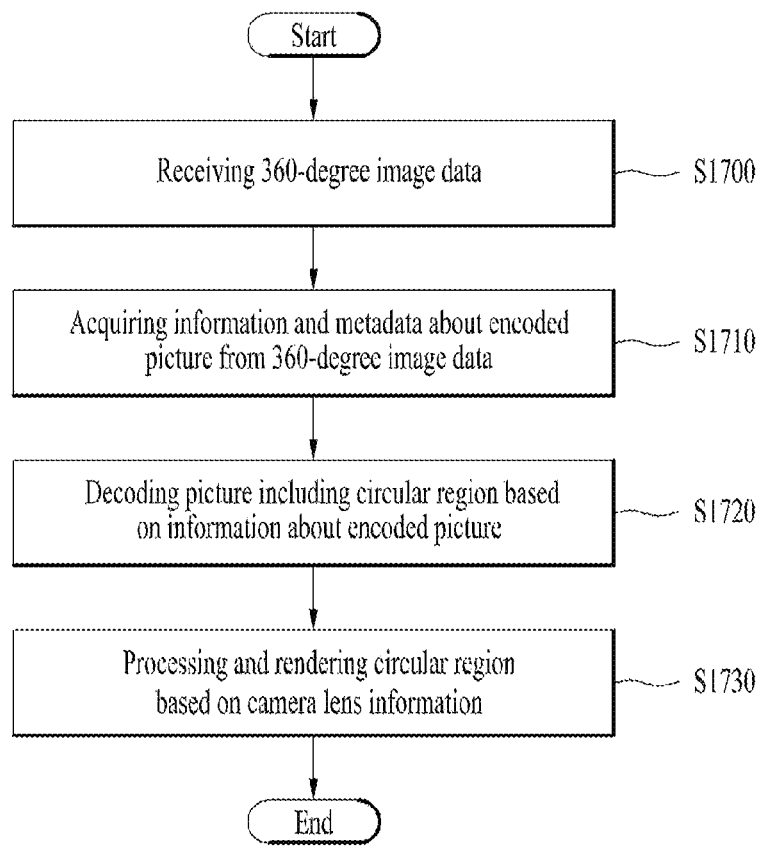
FIG. 17 schematically illustrates a method of processing 360-degree video data by a 360-degree video reception apparatus according to the present disclosure.

FIG. 17 schematically illustrates a method of processing 360-degree video data by a 360-degree video reception apparatus according to the present disclosure. The method disclosed in FIG. 17 may be performed by the 360-degree video reception apparatus disclosed in FIG. 11. Specifically, for example, S1700 of FIG. 17 may be performed by the receiver of the 360-degree video reception apparatus, and S1710 may be performed by the reception processor of the 360-degree video reception apparatus. S1720 of the 360-degree video may be performed by the data decoder of the reception apparatus, and S1730 may be performed by the renderer of the 360-degree video reception apparatus.

The 360-degree video reception apparatus receives 360-degree image data (S1700). The 360-degree video reception apparatus may receive the 360-degree video data signaled from the 360-degree video transmission apparatus over a broadcasting network. In addition, the 360-degree video reception apparatus may receive the 360-degree video data through a communication network, such as broadband, or a storage medium. Here, the 360-degree video data may be 360-degree video data for 3DoF+ content. The 360-degree video data for 3DoF+ content may represent 360-degree image data for multiple viewpoints, multiple head positions, and/or multiple eye views.

The 360-degree video reception apparatus acquires information and metadata about an encoded picture from the 360-degree video data (S1710). The 360-degree video reception apparatus may process the received 360-degree video data according to the transport protocol, and acquire information about the encoded picture and the metadata from the 360-degree video data. In addition, the 360-degree video reception apparatus may perform a reverse of the process of the processing of the 360-degree video transmission apparatus for transmission.

The metadata may include camera lens information.

The camera lens information may include a camera_lens_info_id field, a camera_lens_info_cancel_flag field, a camera_lens_info_persistence_flag field, a supplemental_info_present_flag field, a view_dimension_idc_flag field, a view_dimension_idc field, a num_camera_id_minus1 field, a camera_id[i] field, a camera_id_type[i] field, a camera_location_per_viewpoint_x[i] field, a camera_location_per_viewpoint_y[i] field, a camera_location_per_viewpoint_z[i] field, a camera_rotation_per_viewpoint_yaw[i] field, a camera_rotation_per_viewpoint_pitch[i] field, a camera_rotation_per_viewpoint_roll[i] field, a camera_location_per_head_position_x[i] field, a camera_location_per_head_position_y[i] field, a camera_location_per_head_position_z[i] field, a camera_rotation_per_head_position_yaw[i] field, a camera_rotation_per_head_position_pitch[i] field, a camera_rotation_per_head_position_roll[i] field, a left_eye_view_flag[i] field, a camera_location_per_eye_x[i] field, a camera_location_per_eye_y[i] field, a camera_location_per_eye_z[i] field, a camera_rotation_per_eye_yaw[i] field, a camera_rotation_per_eye_pitch[i] field, a camera_rotation_per_eye_roll[i] field, a num_subpicture_minus1 field, a scene_radius_flag[i] field, a local_sphere_center_offset_flag[i] field, a local_sphere_rotation_flag[i] field, a lens_distortion_correction_flag[i] field, a num_camera_idx_minus1 field, a camera_idx[i][j] field, a circular_region_center_x[i] field, a circular_region_center_y[i] field, a rect_region_top[i] field, a rect_region_left[i] field, a rect_region_width[i] field, a rect_region_height[i] field, a full_radius[i] field, a scene_radius[i] field, a local_sphere_rotation_azimuth[i] field, a local_sphere_rotation_elevation[i] field, a local_sphere_center_offset_x[i] field, a local_sphere_center_offset_y[i] field, a local_sphere_center_offset_z[i] field, a field_of_view[i] field, a lens_projection_type[i] field, a scaling_factor[i] field, a num_angle_projection_minus1[i] field, a angle_projection[i][j] field, a num_polynomial_coeff_projection_minus1[i][j] field, a polynomial_coeff_projection[i][j][k] field, a num_angle_correction_minus1[i] field, a angle_correction[i][j] field, a num_polynomial_coeff_correction_minus1[i][j] field, a polynomial_coeff_correction[i][j][k] field, and/or a redial_distortion_type[i] field, as described above.

The fields have meanings as described above.

Specifically, as an example, the camera lens information may include information indicating a camera type for the target circular region. The camera type may be one of viewpoint, head position, and eye view.

For example, when the value of the information indicating the camera type is 1, the camera type for the target circular region may be derived as the viewpoint. When the value of the information indicating the camera type is 2, the camera type for the target circular region may be derived as the head position. When the value of the information indicating the camera type is 3, the camera type for the target circular region may be derived as the eye view.

The target circular region may be an image for a camera type indicated by the information indicating the camera type. The camera lens information may include camera type related information about the target circular region. The information indicating the camera type may represent the camera_id_type[i] field.

For example, the camera lens information may include information indicating the x component, y component, and z component of the target viewpoint for the target circular region. That is, the camera lens information may include information indicating the position of the target viewpoint for the target circular region. The information indicating the x component, y component, and z component of the target viewpoint for the target circular region may represent the camera_location_per_viewpoint_x[i] field, the camera_location_per_viewpoint_y[i] field, and the camera_location_per_viewpoint_z[i] field. The camera lens information may include information indicating a yaw angle, a pitch angle, and a roll angle of the target viewpoint for the target circular region. That is, the camera lens information may include information indicating rotation angles of the target viewpoint for the target circular region. The information indicating the yaw angle, pitch angle, and roll angle of the target viewpoint for the target circular region may represent the camera_rotation_per_viewpoint_yaw[i] field, the camera_rotation_per_viewpoint_pitch[i] field, the camera_rotation_per_viewpoint_roll[i] field. In this case, for example, the value of the information indicating the camera type may be 1. That is, the camera type for the target circular region indicated by the information indicating the camera type may be the viewpoint.

Alternatively, the camera lens information may include, for example, information indicating the x component, y component, and z component of a target head position for the target circular region. That is, the camera lens information may include information indicating the target head position for the target circular region. The information indicating the x component, y component, and z component of the target head position for the target circular region may represent the camera_location_per_head_position_x[i] field, the camera_location_per_head_position_y[i] field, and the camera_location_per_head_position_z[i] field. The camera lens information may include information indicating a yaw angle, a pitch angle, and a roll angle of the target head position for the target circular region. That is, the camera lens information may include information indicating the rotation angles of the target head position for the target circular region. The information indicating the yaw angle, pitch angle, and roll angle of the target head position for the target circular region may represent the camera_rotation_per_head_position_yaw[i] field, the camera_rotation_per_head_position_pitch[i] field, the camera_rotation_per_head_ position_roll[i] field. In this case, for example, the value of information indicating the camera type may be 2. That is, the camera type for the target circular region indicated by the information indicating the camera type may be the head position.

Alternatively, the camera lens information may include, for example, information indicating the x component, y component, and z component of a target eye view for the target circular region. That is, the camera lens information may include information indicating the position of the target eye view for the target circular region. The information indicating the x component, y component, and z component of the target eye view for the target circular region may represent the camera_location_per_eye_x[i] field, the camera_location_per_eye_y[i] field, and the camera_location_per_eye_z[i] field. The camera lens information may include information indicating a yaw angle, a pitch angle, and a roll angle of the target eye view for the target circular region. That is, the camera lens information may include information indicating the rotation angles of the target eye view for the target circular region. The information indicating the yaw angle, pitch angle, and roll angle of the target eye view for the target circular region may represent the camera_rotation_per_eye_yaw[i] field, the camera_rotation_per_eye_pitch[i] field, the camera_rotation_per_eye_roll[i] field. The camera lens information may include a flag indicating whether the target eye view for the target circular region is a left eye view. When the value of the flag is 1, the target eye view may be the left eye view. When the value of the flag is 0, the target eye view may be a right eye view. The flag may represent the left_eye_view_flag[i] field. In this case, for example, the value of the information indicating the camera type may be 3. That is, the camera type for the target circular region indicated by the information indicating the camera type may be the eye view.

As another example, the camera lens information may include information indicating a lens projection type of the target circular region. The lens projection type may be one of perspective projection, stereographic projection, equidistance projection, sine-law projection, equisolid projection, and angular polynomial projection.

For example, when the value of the information indicating the lens projection type is 1, the lens projection type of the target circular region may be derived as the perspective projection. When the value of the information indicating the lens projection type is 2, the lens projection type of the target circular region may be derived as the stereographic projection. When the value of information indicating the lens projection type is 3, the lens projection type of the target circular region may be derived as the equidistance projection. When the value of the information indicating the lens projection type is 4, the lens projection type of the target circular region may be derived as the sine-law projection. When the value of the information indicating the lens projection type is 5, the lens projection type of the target circular region may be derived as the equisolid projection. When the value of the information indicating the lens projection type is 255, the lens projection type of the target circular region may be derived as the angular polynomial projection. When the value of the information indicating the lens projection type is 0, the lens projection type of the target circular region may not be specified. The information indicating the lens projection type may represent the lens_projection_type[i] field.

As an example, when the lens projection type of the target circular region is the perspective projection, the stereographic projection, the equidistance projection, the sine-law projection, or the equisolid projection, the camera lens information may include information indicating a scaling factor for the target circular region. That is, when the value of the information indicating the lens projection type is greater than or equal to 1 and less than or equal to 5, the camera lens information may include information indicating a scaling factor for the target circular region. The information indicating the scaling factor for the target circular region may represent the scaling_factor[i] field.

As another example, the camera lens information may include projection function related information. The projection function related information may include information indicating the number of projection functions for the target circular region. The information indicating the number of projection functions may represent the num_angle_projection_minus1[i][j] field.

The projection function related information may include information indicating an angle at which a projection function for the target circular region is applied. The information indicating the angle at which the projection function is applied may represent the angle_projection[i][j] field.

The projection function related information may include information indicating the number of coefficients of the projection function for the target circular region. The information indicating the number of coefficients of the projection function may represent the num_polynomial_coeff_projection_minus1[i][j] field.

The projection function related information may include information indicating the coefficients of the projection function for the target circular region. The information indicating the coefficients of the projection function may represent the polynomial_coeff_projection[i][j][k] field.

As another example, the camera lens information may include a flag indicating whether information related to a distortion correction function for correcting distortion of the target circular region is present. For example, when the value of the flag is 1, the camera lens information may include the distortion correction function related information. When the value of the flag is 0, the camera lens information may not include the distortion correction function related information. The flag may represent the lens_distortion_correction_flag[i] field.

The distortion correction function related information may include information indicating the number of distortion correction functions for the target circular region. The information indicating the number of distortion correction functions may represent the num_angle_correction_minus1[i][j] field.

The distortion correction function related information may include information indicating an angle at which a distortion correction function for the target circular region is applied. The information indicating the angle at which the distortion correction function is applied may represent the angle_correction[i][j] field.

The distortion correction function related information may include information indicating the number of coefficients of the distortion correction function for the target circular region. The information indicating the number of coefficients of the distortion correction function may represent the num_polynomial_coeff_correction_minus1[i][j] field.

The distortion correction function related information may include information indicating the coefficients of the distortion correction function for the target circular region. The information indicating the coefficients of the distortion correction function may represent the polynomial_coeff_correction[i][j][k] field.

The 360-degree video reception apparatus may derive a distortion correction function for correcting distortion of the target circular region based on the distortion correction function related information, and correct distortion of the target circular region based on the distortion correction function.

As another example, the camera lens information may include information indicating a radial distortion type of the target circular region. The radial distortion type may be one of barrel distortion, pincushion distortion, and mustache distortion.

For example, when the value of the information indicating the radial distortion type is 1, the radial distortion type of the target circular region may be derived as the barrel distortion. When the value of the information indicating the radial distortion type is 2, the radial distortion type of the target circular region may be derived as the pincushion distortion. When the value of the information indicating the radial distortion type is 3, the radial distortion type of the target circular region may be derived as the mustache distortion.

The 360-degree video reception apparatus may correct the radial distortion of the target circular region based on Equation 1 described above. In this case, the radial distortion coefficient and the tangential distortion coefficient of Equation 1 may be derived based on the radial distortion type of the target circular region.

Further, the metadata may include supplemental camera lens information.

The supplemental camera lens information may include a num_subpictures field, a num_camera_idx_minus1 field, a camera_idx[i][j] field, an image_flip[i] field, a image_scale_axis_angle[i] field, an image_scale_x[i] field, an image_scale_y[i] field, a num_angle_for_displaying_fov[i] field, a displayed_fov[i][j] field, an overlapped_fov[i][j] field, a num_local_fov_region[i] field, a start_radius[i][j] field, a end_radius[i][j] field, a start_angle[i][j] field, an end_angle[i][j] field, a radius_delta[i][j] field, an angle_delta[i][j] field, a local_fov_weight[i][j][k][l] field, a num_polynomial_coefficients_lsc[i] field, a polynomial_coefficient_K_lsc_R[i][j] field, a polynomial_coefficient_K_lsc_G[i][j] field, a polynomial_coefficient_K_lsc_B[i][j] field, a num_deadzones field, a deadzone_left_horizontal_offset[i] field, a deadzone_top_vertical_offset[i] field, a deadzone_width[i] field, and/or a deadzone_height[i] field, as described above.

The fields have meanings as described above.

The metadata may be received through an SEI message. In addition, the metadata may be included in AdaptationSet, Representation, or SubRepresentation of the media presentation description (MPD). For example, the fisheye video information may be received in the form of the Dynamic Adaptive Streaming over HTTP (DASH) descriptor included in the MPD. Here, the SEI message may be used to assist in decoding a 2D image or displaying the 2D image in a 3D space.

The 360-degree video reception apparatus decodes a picture including a target circular region based on the information about the encoded picture (S1720). The 360-degree video reception apparatus may decode the picture including the target circular region based on the information about the encoded picture. The target circular region may be a region including the 360-degree image.

The 360-degree video reception apparatus processes and renders the target circular region based on the camera lens information (S1730).

For example, the 360-degree video reception apparatus may derive the target circular region from the picture based on the camera lens information. As an example, the 360-degree video reception apparatus may derive the target viewpoint for a specific position based on the camera lens information, and derive the target circular region for the target viewpoint. As another example, the 360-degree video reception apparatus may derive the target head position for a specific position based on the camera lens information, and derive the target circular region for the target head position. As another example, the 360-degree video reception apparatus may derive the target eye view for a specific position based on the camera lens information, and derive the target circular region for the target eye view. Here, the specific position may be a position and/or a rotation angle indicated through at least one of a local coordinate system and a global coordinate system. The specific position may be a position and/or a rotation angle selected by a user. Further, the local coordinate system may be a coordinate system in which coordinates are indicated by an x component, y component, and a z component, and the global coordinate system may be a coordinate system in which coordinates are indicated by a yaw angle, a pitch angle, and a roll angle.

As an example, the camera lens information of the metadata may include information describing the target circular region and information describing a rectangular area to which the target circular region is mapped. The 360-degree video reception apparatus may derive the rectangular area based on the information describing the rectangular area, and derive the target circular region mapped to the rectangular area based on the information describing the target circular region. In this case, an area corresponding to the inner intersection of the rectangular area and the area to which the target circular region is mapped may be actual 360-degree image data. The remaining invalid areas may be marked in black so as to be identified. According to an embodiment, the 360-degree video reception apparatus may derive the area corresponding to the intersection of the rectangular area and the area to which the target circular regions are mapped.

As an example, the camera lens information may include information about a dead zone to which the 360 degree image data is not mapped. The 360-degree video reception apparatus may derive a dead zone to which the 360-degree image data is not mapped based on the information about the dead zone to which the 360-degree image data is not mapped.

The camera lens information may include information indicating the lens projection type, and the 360 video reception apparatus may map the target circular region to a 3D space based on a spherical coordinate mapping equation derived based on the lens projection type. Specifically, for example, the 360 video reception apparatus may project the target circular region onto a plane based on the spherical coordinate mapping equation derived based on the lens projection type (Projection). Here, the plane may be an equirectangular projection (ERP) plane. This projection process may be an intermediate step for re-projecting the target circular region onto a 3D space such as a spherical coordinate system.

The camera lens information may include the projection function related information and/or the distortion correction function related information. The 360 video reception apparatus may derive a polynomial function for distortion correction of the target circular region based on the projection function related information and/or the distortion correction function related information, and distortion of the target circular region may be corrected based on the polynomial function.

The camera lens information may include information indicating a radial distortion type of the target circular region, and the 360 video reception apparatus may correct the radial distortion of the target circular region based on Equation 1 described above.

The 360 video reception apparatus may perform rendering based on the finally synthesized ERP plane (picture) to generate a corresponding viewport.

According to the present disclosure, a circular region for a target viewpoint, a target head position, and/or a target eye view may be derived from 360-degree image data for 3DoF+ content based on the camera lens information, and rendered. Thereby, the user may be provided with an interactive experience in consuming 3DoF+ content.

Further, according to the present disclosure, a polynomial function may be derived by reflecting characteristics of a lens based on the projection function related information and/or the distortion correction function related information included in the camera lens information. In addition, based on the polynomial function, a method of more accurately mapping the 360-degree image data onto a 3D space by correcting distortion occurring in a picture onto which a 360-degree image is projected may be provided.

Figure 18:
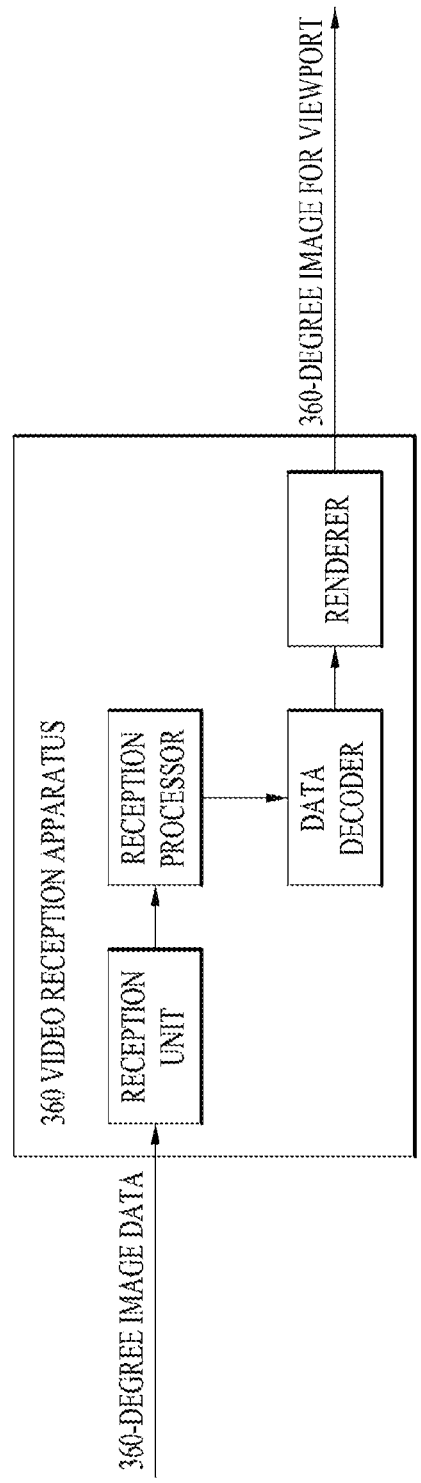
FIG. 18 schematically illustrates a 360-degree video reception apparatus configured to carry out the 360-degree image data processing method according to the present disclosure.

FIG. 18 schematically illustrates a 360-degree video reception apparatus configured to carry out the 360-degree image data processing method according to the present disclosure. The method disclosed in FIG. 17 may be performed by the 360-degree video reception apparatus disclosed in FIG. 18. Specifically, for example, the receiver of the 360-degree video reception apparatus of FIG. 18 may perform S1700 of FIG. 17, and the reception processor of the 360-degree video reception apparatus of FIG. 18 may perform S1710 of FIG. 17. The data decoder of the 360-degree video reception apparatus of FIG. 18 may perform S1720 of FIG. 17, and the renderer of the 360-degree video reception apparatus of FIG. 18 may perform S1730 of FIG. 17.

The above-described steps may be skipped or replaced by other steps of performing similar/same operations according to an embodiment.

According to an embodiment of the present disclosure, the 360-degree video transmission apparatus may include a data input unit, a stitcher, a signaling processor, a projection processor, a data encoder, a transmission processor, and/or a transmitter, as described above. The internal components are configured as described above. According to an embodiment of the present disclosure, the 360-degree video transmission apparatus and the internal components thereof may perform the above-described embodiments of the method of transmitting a 360-degree video according to the present disclosure.

According to an embodiment of the present disclosure, the 360-degree video reception apparatus may include a receiver, a reception processor, a data decoder, a signaling parser, a re-projection processor, and/or a renderer, as described above. The internal components are configured as described above. According to an embodiment of the present disclosure, the 360-degree video reception apparatus and the internal components thereof may perform the above-described embodiments of the method of receiving a 360-degree video according to the present disclosure.

The internal components of the above-described device may be processors configured to execute successive processes stored in the memory, or may be other hardware components. These components may be positioned inside/outside the device.

According to embodiments, the above-described modules may be omitted or replaced by other modules configured to perform similar/same operations.

Each part, module, or unit described above may be a processor or hardware part that executes successive procedures stored in a memory (or storage unit). Each of the steps described in the above-described embodiment may be performed by processors or hardware parts. Each module/block/unit described in the above-described embodiment may operate as a hardware element/processor. In addition, the methods described in the present disclosure may be executed as code. The code may be written in a recoding medium readable by a processor, and thus may be read by the processor provided by the apparatus.

While the methods in the above-described embodiment are described based on a flowchart of a series of steps or blocks, the present disclosure is not limited to the order of the steps. Some steps may take place in a different order or simultaneously. It will be understood by those skilled in the art that the steps shown in the flowchart are not exclusive, and other steps may be included or one or more of the steps in the flowchart may be deleted within the scope of the present disclosure.

When embodiments of the present disclosure are implemented in software, the above-described method may be implemented as a module (process, function, etc.) configured to perform the above-described functions. The module may be stored in a memory and may be executed by a processor. The memory may be inside or outside the processor, and may be connected to the processor by various well-known means. The processor may include application-specific integrated circuits (ASICs), other chipsets, logic circuits, and/or data processing devices. The memory may include a read-only memory (ROM), a random access memory (RAM), a flash memory, a memory card, a storage medium, and/or other storage devices.

The invention claimed is:

1. A method of processing 360-degree image data by a 360-degree video reception apparatus, the method comprising:

receiving 360-degree image data and metadata,
wherein the 360-degree image data includes a picture including circular images,
wherein the metadata includes lens projection type information for the circular images,
wherein the lens projection type information represents lens projection model information for the circular images,
wherein the metadata further includes viewpoint information representing x-axis position information, y-axis position information, and z-axis position information of a viewpoint for the 360-degree image data,
wherein the metadata further includes offset information representing x-offset, y-offset, z-offset of a focal center for the circular images;
decoding the 360-degree image data; and
rendering the circular images based on the metadata.

2. The method of claim 1, wherein the viewpoint information includes information representing a yaw angle, a pitch angle, and a roll angle of viewpoint for the 360-degree image data.

3. The method of claim 2, further comprising:
deriving a viewpoint for a specific position based on the metadata; and
deriving the circular image for the derived viewpoint,
wherein the specific position is a position represented through at least one of a local coordinate system and a global coordinate system.

4. The method of claim 1, wherein the lens projection model information is one of perspective projection, stereographic projection, equidistance projection, sine-law projection, equisolid angle projection or angular polynomial projection.

5. A method of processing 360-degree image data by a 360-degree video transmission apparatus, the method comprising:
acquiring a 360-degree image data captured by a camera having lenses,
wherein the 360-degree image data includes circular images;
preprocessing the 360-degree image data into a picture including the circular images and generating a metadata;
encoding the 360-degree image data;
transmitting the 360-degree image data and the metadata,
wherein the metadata includes lens projection type information for the circular images,
wherein the lens projection type information represents lens projection model information for the circular images,
wherein the metadata further includes viewpoint information representing x-axis position information, y-axis position information, and z-axis position information of a viewpoint for the 360-degree image data,
wherein the metadata further includes offset information representing x-offset, y-offset, z-offset of a focal center for the circular images.

6. The method of claim 5, wherein the viewpoint information includes information representing a yaw angle, a pitch angle, and a roll angle of viewpoint for the 360-degree image data.

7. The method of claim 5, wherein the lens projection model information is one of perspective projection, stereographic projection, equidistance projection, sine-law projection, equisolid angle projection or angular polynomial projection.

8. A 360-degree video reception apparatus, the apparatus comprising:
a receiver configured to receive 360-degree image data and metadata,
wherein the 360-degree video data includes a picture including circular images,
wherein the metadata includes lens projection type information for the circular images,
wherein the lens projection type information represents lens projection model information for the circular images,
wherein the metadata further includes viewpoint information representing x-axis position information, y-axis position information, and z-axis position information of a viewpoint for the 360-degree image data;
wherein the metadata further includes offset information representing x-offset, y-offset, z-offset of a focal center for the circular images;
a decoder configured to decode the 360-degree image data; and
a renderer configured to render the circular images based on the metadata.

9. A 360-degree video transmission apparatus, the apparatus comprising:
a processor configured to acquire a 360-degree image data captured by a camera having lenses,
wherein the 360-degree image data includes circular images;
a processor configured to process the 360-degree image data into a picture including the circular images and generate a metadata;
an encoder configured to encode the 360-degree image data; and
a transmitter configured to transmit the 360-degree image data and the metadata,
wherein the metadata includes lens projection type information for the circular images,
wherein the lens projection type information represents lens projection model information for the circular images,
wherein the metadata further includes viewpoint information representing x-axis position information, y-axis position information, and z-axis position information of a viewpoint for the 360-degree image data,
wherein the metadata further includes offset information representing x-offset, y-offset, z-offset of a focal center for the circular images.

* * * * *